(12) United States Patent
Wnek et al.

(10) Patent No.: US 8,534,460 B2
(45) Date of Patent: Sep. 17, 2013

(54) NESTABLE CONTAINER WITH UNIFORM STACKING FEATURES

(75) Inventors: Patrick H. Wnek, Sherwood, WI (US);
Ronald P. Marx, Fremont, WI (US);
James Kluz, Clintonville, WI (US);
Brian R. O'Hagan, Appleton, WI (US);
Scott W. Middleton, Oshkosh, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 2907 days.

(21) Appl. No.: 10/986,621

(22) Filed: Nov. 12, 2004

(65) Prior Publication Data
US 2005/0109653 A1   May 26, 2005

Related U.S. Application Data

(60) Provisional application No. 60/518,908, filed on Nov. 11, 2003, provisional application No. 60/599,892, filed on Aug. 9, 2004, provisional application No. 60/564,045, filed on Apr. 20, 2004, provisional application No. 60/564,443, filed on Apr. 21, 2004.

(51) Int. Cl.
*B65D 21/032* (2006.01)
*B65D 21/00* (2006.01)

(52) U.S. Cl.
USPC .................... 206/519; 206/515; 206/518

(58) Field of Classification Search
USPC .................... 206/515, 518, 519
See application file for complete search history.

(56) References Cited

U.S. PATENT DOCUMENTS

| | | | |
|---|---|---|---|
| 1,022,882 A * | 4/1912 | Schwenn | 206/519 |
| 3,033,434 A | 5/1962 | Carson | |
| 3,195,770 A * | 7/1965 | Robertson | 220/23.6 |
| 3,220,631 A | 11/1965 | Reifers | |
| 3,229,886 A | 1/1966 | Grogel | |
| 3,530,917 A | 9/1970 | Donovan | |
| 3,669,305 A | 6/1972 | Kinney et al. | |
| 3,850,340 A | 11/1974 | Siemonsen et al. | |
| 3,968,921 A * | 7/1976 | Jewell | 229/406 |
| 4,051,707 A | 10/1977 | Valek et al. | |
| 4,096,947 A * | 6/1978 | Morse | 206/519 |
| 4,202,464 A | 5/1980 | Mohs et al. | |

(Continued)

FOREIGN PATENT DOCUMENTS

DE   509 065   4/1969
DE   80 11 020   9/1980

(Continued)

OTHER PUBLICATIONS

European Search Report for EP 10011372.9, dated Feb. 1, 2011.

(Continued)

*Primary Examiner* — Mickey Yu
*Assistant Examiner* — Niki Eloshway
(74) *Attorney, Agent, or Firm* — Womble Carlyle Sandridge & Rice, LLP

(57) ABSTRACT

Various embodiments of flanged containers that can be stacked in a nested relationship are disclosed so as to provide uniform spacing between the containers to facilitate reliable denesting thereof. The flanges and/or sidewalls of the containers may be provided with features that facilitate alignment and uniform spacing of the nested containers so that a denesting apparatus can reliably denest the containers. Other containers include sidewalls divided into two sections that serve to stabilize stacked container.

10 Claims, 44 Drawing Sheets

(56) References Cited

U.S. PATENT DOCUMENTS

| | | | |
|---|---|---|---|
| 4,721,499 A | | 1/1988 | Marx et al. |
| 4,967,908 A | * | 11/1990 | Kessler ............... 206/518 |
| 5,617,972 A | * | 4/1997 | Morano et al. ........... 221/33 |
| 5,782,376 A | | 7/1998 | Brauner et al. |
| 5,938,112 A | | 8/1999 | Sandstrom |
| 6,093,460 A | | 7/2000 | Iwaya |
| 6,213,301 B1 | * | 4/2001 | Landis et al. ........... 206/519 |
| 6,325,213 B1 | * | 12/2001 | Landis, II ............. 206/519 |
| 6,415,945 B1 | * | 7/2002 | Zank et al. ............ 220/657 |
| 6,568,534 B2 | * | 5/2003 | Zank ................... 206/508 |
| 2002/0092791 A1 | | 7/2002 | Wnek |
| 2003/0205319 A1 | | 11/2003 | Bengtsson et al. |
| 2007/0267374 A1 | * | 11/2007 | Middleton et al. ...... 211/126.1 |

FOREIGN PATENT DOCUMENTS

| | | |
|---|---|---|
| DE | 87 13 290.7 | 1/1988 |
| DE | 37 37 052 A1 | 5/1989 |
| DE | 296 02 348 U1 | 5/1996 |
| DE | 101 49 143 A1 | 4/2003 |
| FR | 2 266 638 | 10/1975 |
| FR | 2 599 002 | 11/1987 |
| GB | 1 264 484 | 2/1972 |
| GB | 1 376 603 | 12/1974 |
| JP | 3031361 | 9/1996 |
| JP | 8-337234 | 12/1996 |
| JP | 2000-517260 | 12/2000 |
| WO | WO 96/11142 | 4/1996 |
| WO | WO 98/09812 | 3/1998 |
| WO | WO 03/078012 A1 | 9/2003 |

OTHER PUBLICATIONS

Office Action dated Sep. 6, 2010 from Japanese Patent Application No. 2006-539886 and partial English Translation.

* cited by examiner

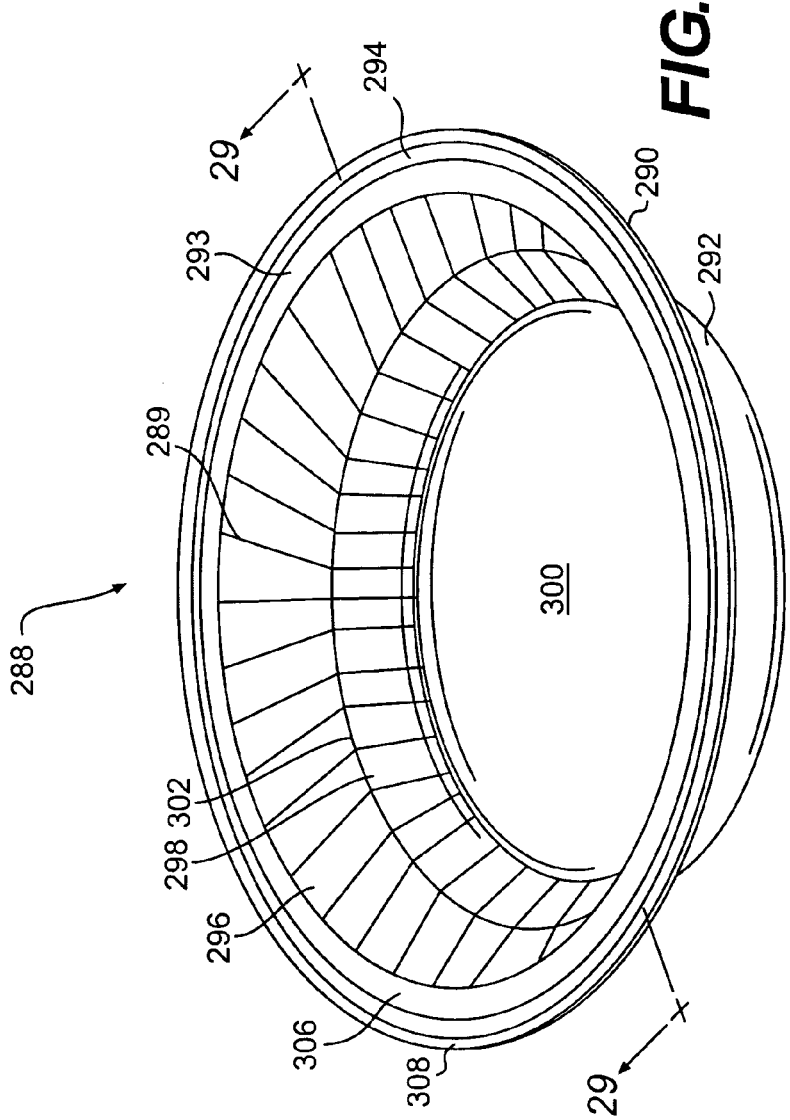
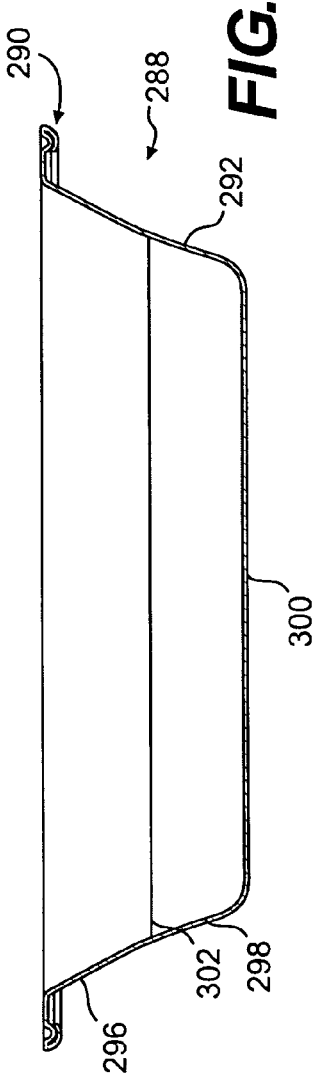

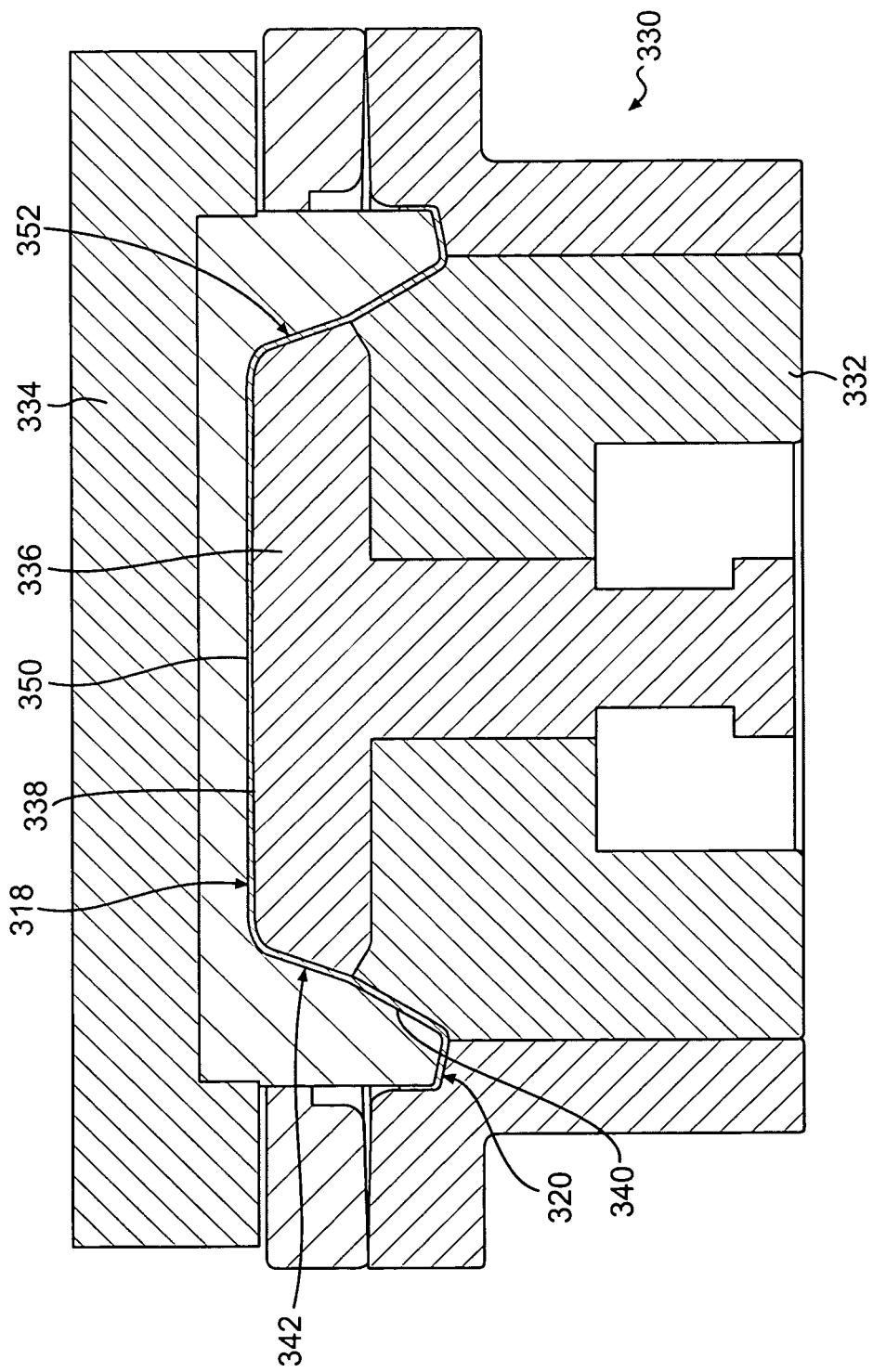

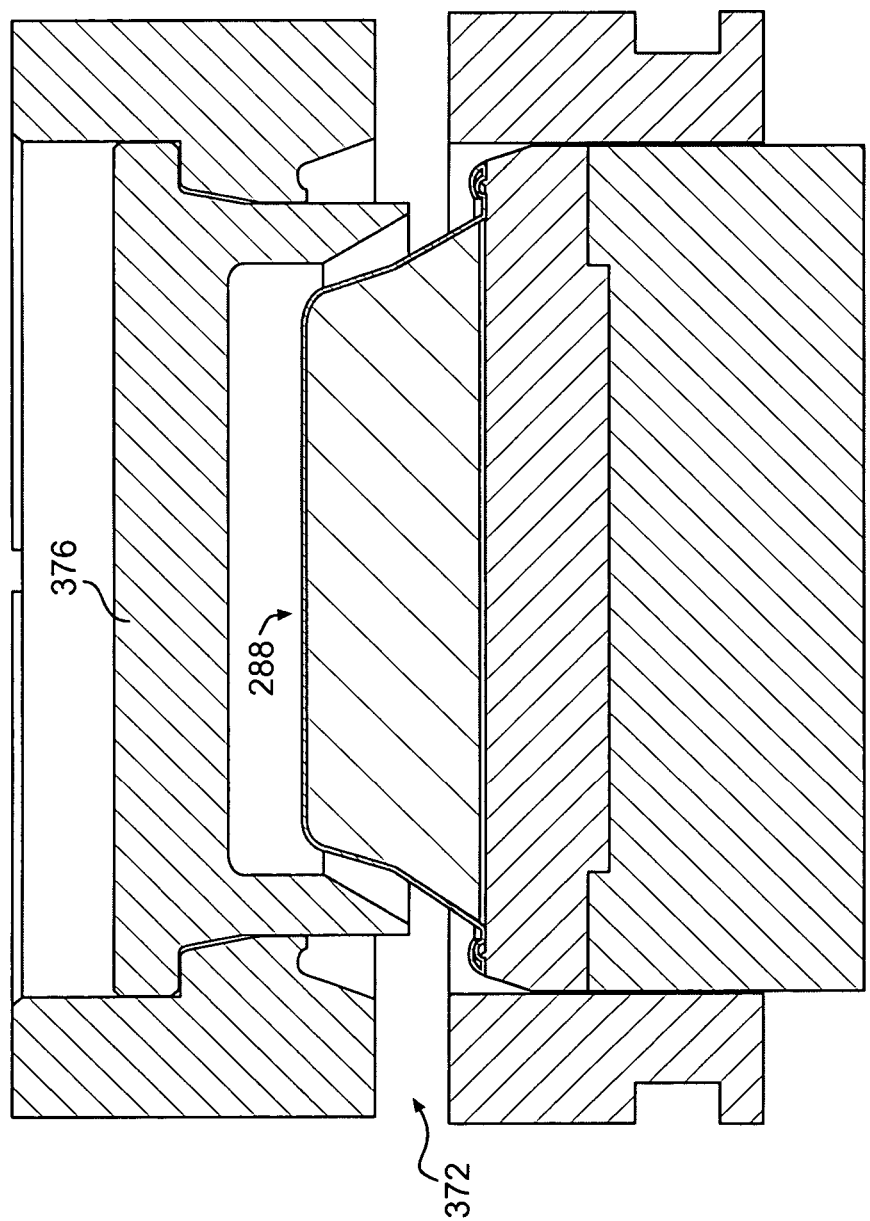

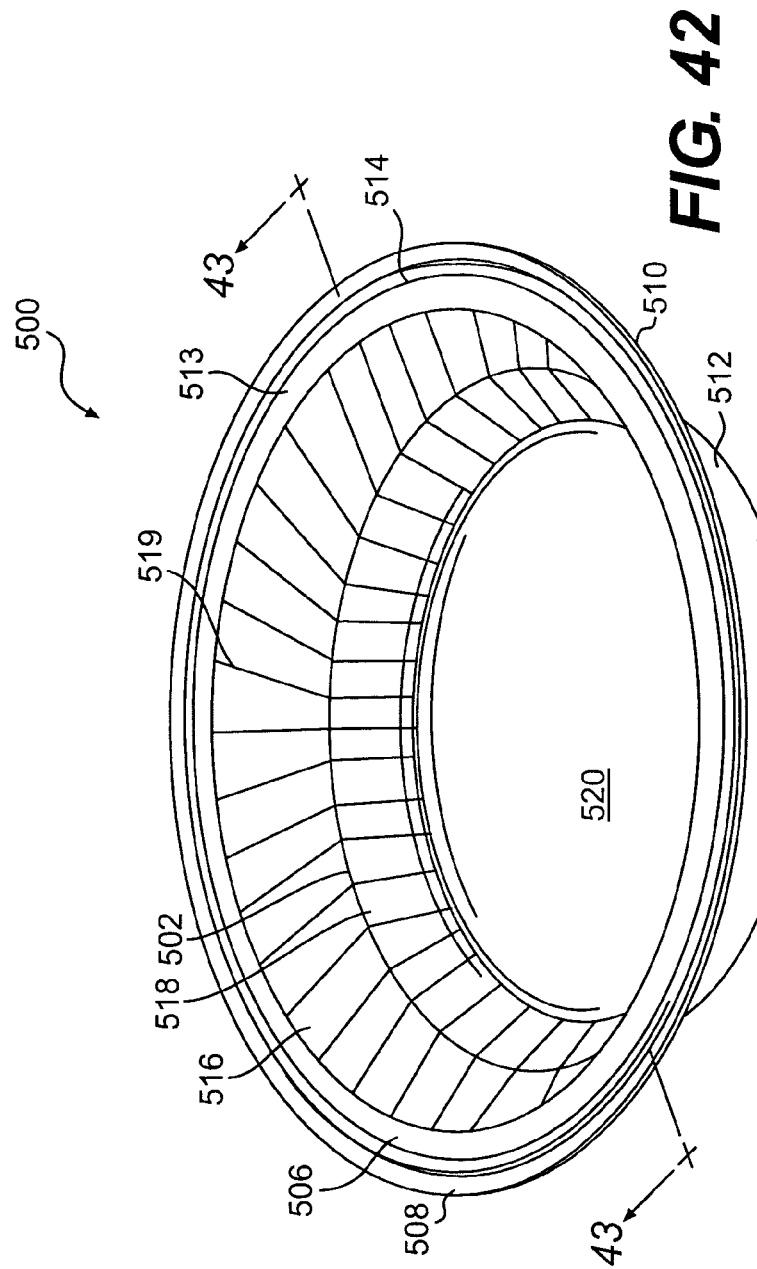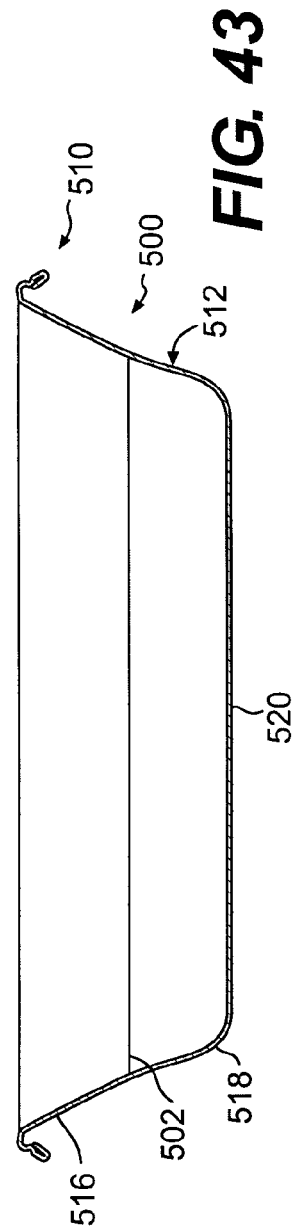
FIG. 42
FIG. 43

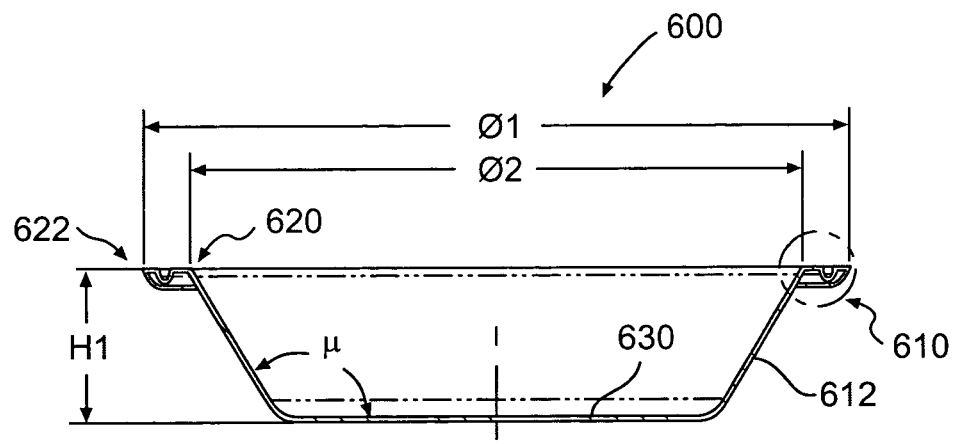
FIG. 52A
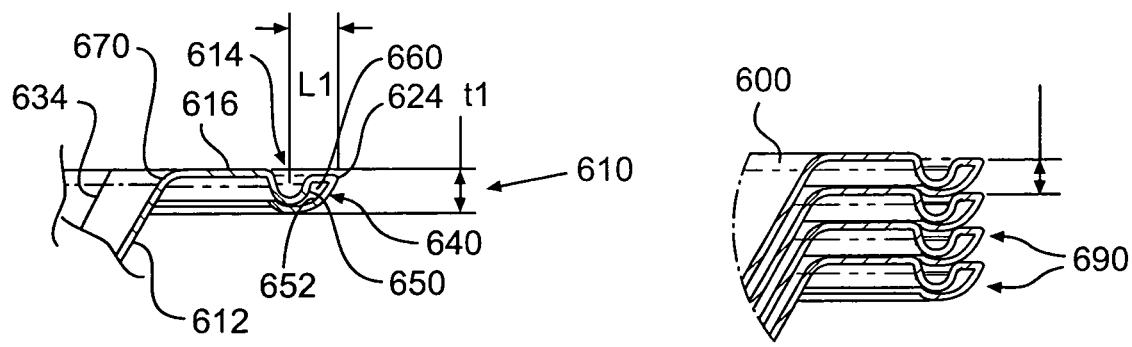
FIG. 52B          FIG. 52C

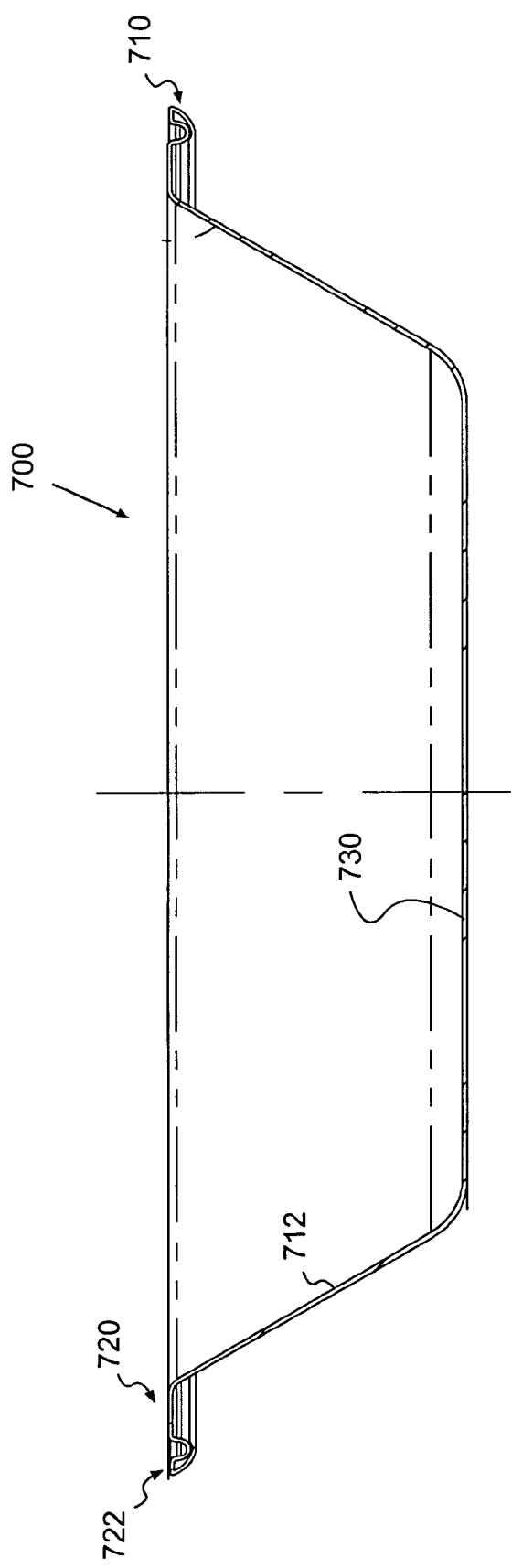
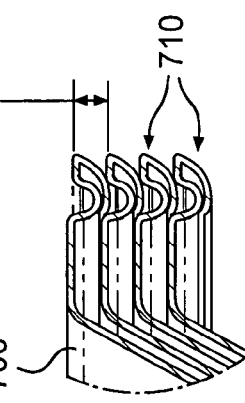
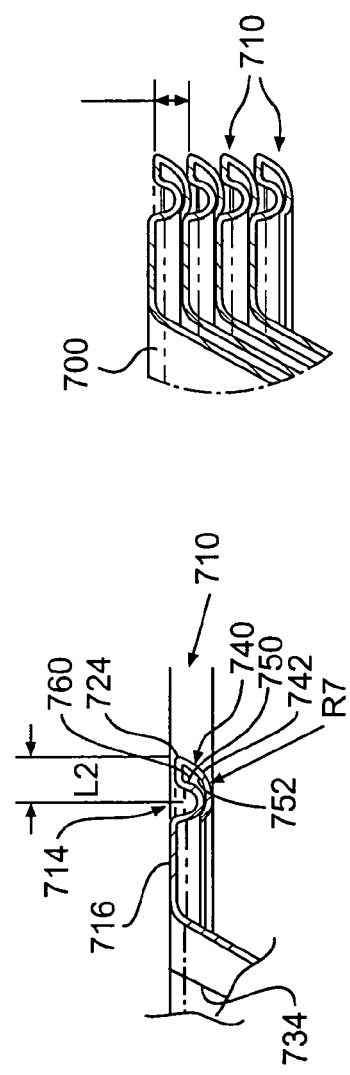
*FIG. 53A*
*FIG. 53B*
*FIG. 53C*

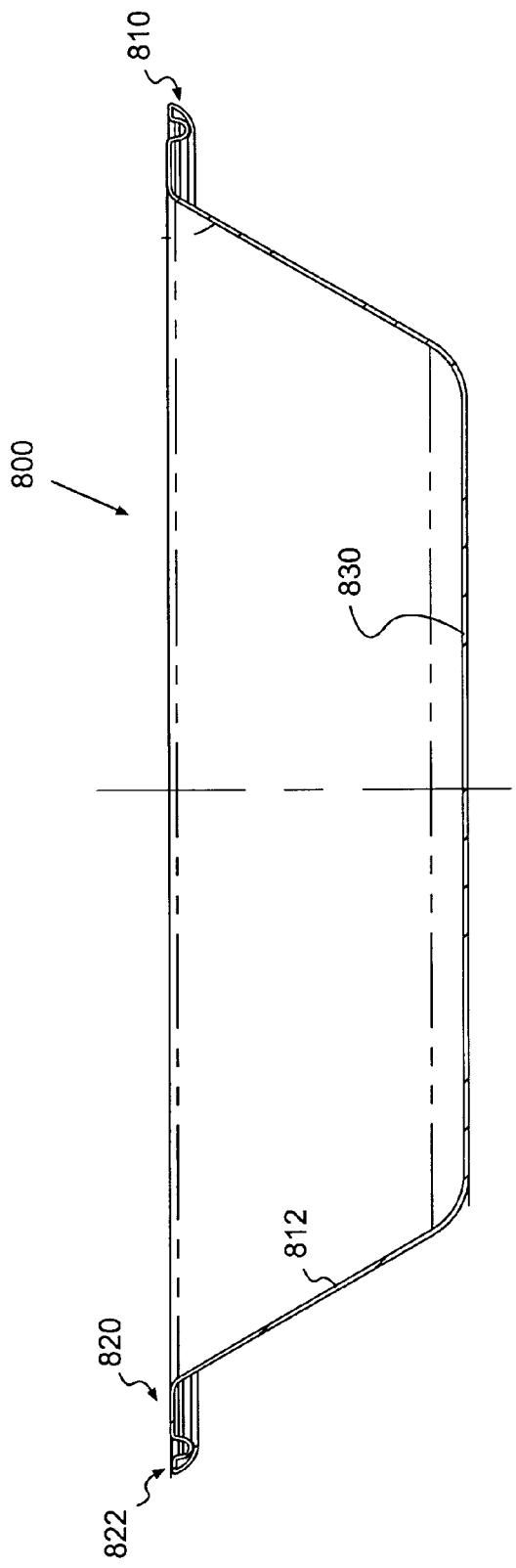
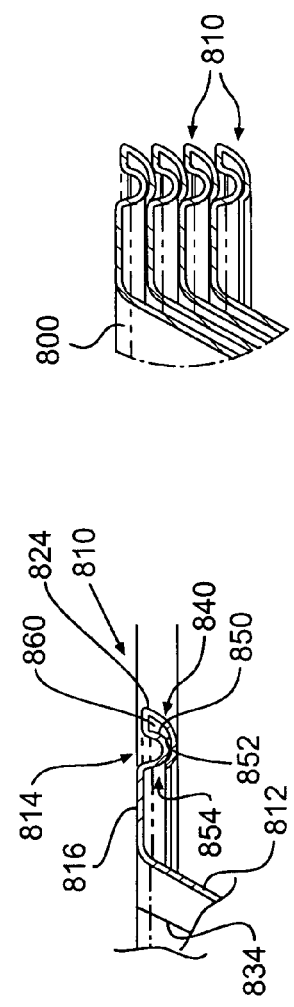
FIG. 54A
FIG. 54B
FIG. 54C

NESTABLE CONTAINER WITH UNIFORM STACKING FEATURES

RELATED APPLICATIONS

This application claims priority under 35 U.S.C. §119(e) to U.S. provisional application No. 60/518,908, filed Nov. 11, 2003, U.S. provisional application No. 60/564,045, filed Apr. 20, 2004, U.S. provisional application No. 60/564,443, filed Apr. 21, 2004, and U.S. provisional application No. 60/599,892, filed Aug. 9, 2004, all entitled "Nestable Container with Uniform Stacking Features," the entire contents of each application being hereby incorporated by reference.

BACKGROUND

1. Technical Field

The technical field relates generally to containers which are pressed into a predetermined formation with a punch and die, and more particularly to containers having desirable denesting characteristics.

2. Related Art

Pressed containers have been used in numerous environments for many years, with the containers having a common configuration that allows nested stacking of the containers. Conventional plates or trays, for example, may have a downwardly and inwardly converging sidewall that is continuous with a flat bottom wall, and with a radially extending rim along its top edge. This configuration allows pressed plates or trays to be nested in a stack of trays of the same configuration.

Conventional pressed paperboard trays and plate containers, however, typically do not have uniform rim spacing and/or thickness, which leads to non-uniform stacking. Non-uniformly stacked containers are difficult to denest, or manually separate, which adds cost and time to use of the containers. Other aspects of conventional containers may also hinder denesting.

It would therefore be desirable to provide a container that is capable of stacking in a nested relationship with other like containers and that is capable of reliable denesting.

SUMMARY

In accordance with a first embodiment, a pressed container has a downwardly convergent peripheral sidewall connected integrally along a lower edge to a base and along a top edge to a peripheral rim that projects radially outwardly, and features are incorporated into the container that encourage nested stacking in a substantially uniform spaced relationship.

In one embodiment, the flange is divided into a relatively thick radially inner portion and a relatively thin radially outer portion so that the thick portion uniformly engages the corresponding thick portion of adjacent containers in a nested stack, and the relatively thin portions of adjacent containers are thereby spaced to facilitate reliable denesting.

In another embodiment, the flange is divided into two portions with an upstanding portion along the radially inner edge of the flange and a radially extending portion along a radially outer portion. The upstanding portions of containers in a nested stack engage, and thereby separate, adjacent containers to allow the radially outer portion of the flanges to be uniformly spaced to facilitate reliable denesting.

In still another embodiment, the flange of each container includes a plurality of protrusions on the flange that engage the flange of an adjacent container in a nested stack of containers. The protrusions provide spacing of the outer peripheral edge of each flange.

In still other embodiments, a rolled or folded peripheral edge of each flange increases the effective thickness of the flange so that the remainder of the flanges of adjacent containers in a nested stack are spaced to facilitate reliable denesting. The fold or roll in the peripheral edge of the flange of each container may define a curved cam-like surface that facilitates separation of the nested containers.

In yet other embodiments, a flange may be formed with a groove or depression extending along the circumference of the flange. A rolled or folded peripheral edge may extend from the outer rim of the flange and at least partially underneath the depression to facilitate denesting of stacked containers and to increase the effective thickness of the flange.

In yet other embodiments, a container may be formed with a multi-angled sidewall. The container sidewall may be formed of a lower sidewall extending from a container base at a first angle, and an upper sidewall extending from a plane parallel to the container base at a second, greater angle. A ridge is defined where the upper and lower sidewalls meet. The ridge and the multi-angled sidewall may increase the container's resistance to forces applied perpendicular to the container base, and thus minimize deformation. Further, the sidewall angles may minimize lateral movement of individual containers in a stack and provide enhanced nesting/denesting capabilities.

In an additional embodiment, a method is used to form a paperboard container with a rolled downturned flange. Optionally, the flange can include a circumferential depression or groove. The flange of this embodiment generally includes a downwardly sloping shape to help resist bending and a folded-under rolled section to increase strength and to convey a perception of a stronger, thicker flange. The presence of a groove increases the flange thickness and aids in the removal of containers from a stack. The groove and flange in combination may also help seal lids to the container.

These and other aspects, features, and details of the present invention can be more completely understood by reference to the following detailed description of a preferred embodiment, taken in conjunction with the drawings and from the appended claims.

BRIEF DESCRIPTION OF THE FIGURES

FIG. 28 is an isometric view of a container according to a sixth embodiment.

FIG. 29 is a cross-sectional view of the container of FIG. 28, taken along line 29-29 in FIG. 28.

FIG. 32 is a cross-sectional view of a die set used to form an intermediate tray form from a circular blank.

FIG. 39 is a cross-sectional view of the second die set of FIG. 36 with the flange formation element and the die retracted.

FIG. 42 is an isometric view of a container according to a ninth embodiment.

FIG. 43 is a cross-sectional view of the container of FIG. 42, taken along line 43-43 of FIG. 42.

FIG. 52A is a sectional view of a container according to a tenth embodiment.

FIG. 52B is an enlarged fragmentary section of the flange of the container of FIG. 52A.

FIG. 52C illustrates the flanges of stacked containers according to the tenth embodiment.

FIG. 53A is a sectional view of a container according to an eleventh embodiment.

FIG. 53B is an enlarged fragmentary section of the flange of the container of FIG. 53A.

FIG. 53C illustrates the flanges of stacked containers according to the eleventh embodiment.

FIG. 54A is a sectional view of a container according to a twelfth embodiment.

FIG. 54B is an enlarged fragmentary section of the flange of the container of FIG. 54A.

FIG. 54C illustrates the flanges of stacked containers according to the twelfth embodiment.

DETAILED DESCRIPTION

Generally, embodiments of the present invention are stackable, denestable trays, plates or other containers having features that facilitate denesting or manual separation of the containers when stacked. The embodiments described in this specification are generally referred to as "containers," which includes trays, plates, and other stackable products. The containers are typically formed from paperboard, although alternate embodiments may include containers formed from a variety of other materials. Suitable materials include, for example, microwave susceptor laminated paperboard, dual ovenable coated or laminated paperboard, acrylic release coated paperboard, and polymer extrusion coated paperboard.

According to the exemplary embodiments, a plurality of similar paperboard containers can be produced having relatively uniform flange thicknesses and outside diameters. The uniform dimensions provide the paperboard containers with characteristics generally seen only in metal or possibly plastic injection-molded or thermoformed containers. For example, when multiple containers according to the present embodiments are stacked, the relatively small variations in flange dimensions and sidewall angles minimize tray movement in the X and Y directions, or directions generally parallel with the bases of the containers. These characteristics and other characteristics of the present embodiments also facilitate denesting, as is described in detail below.

Flange thickness may be enhanced by rolling a segment of paperboard beneath a flange top surface, dimpling or recessing a section of the flange, or by increasing flange thickness by other methods. Flange width, or outside diameter, and thickness may be substantially uniform between containers. In one embodiment, flange thickness varies by +/−0.007 inches, and outer diameter varies by +/−0.015 inches.

Figure 1:
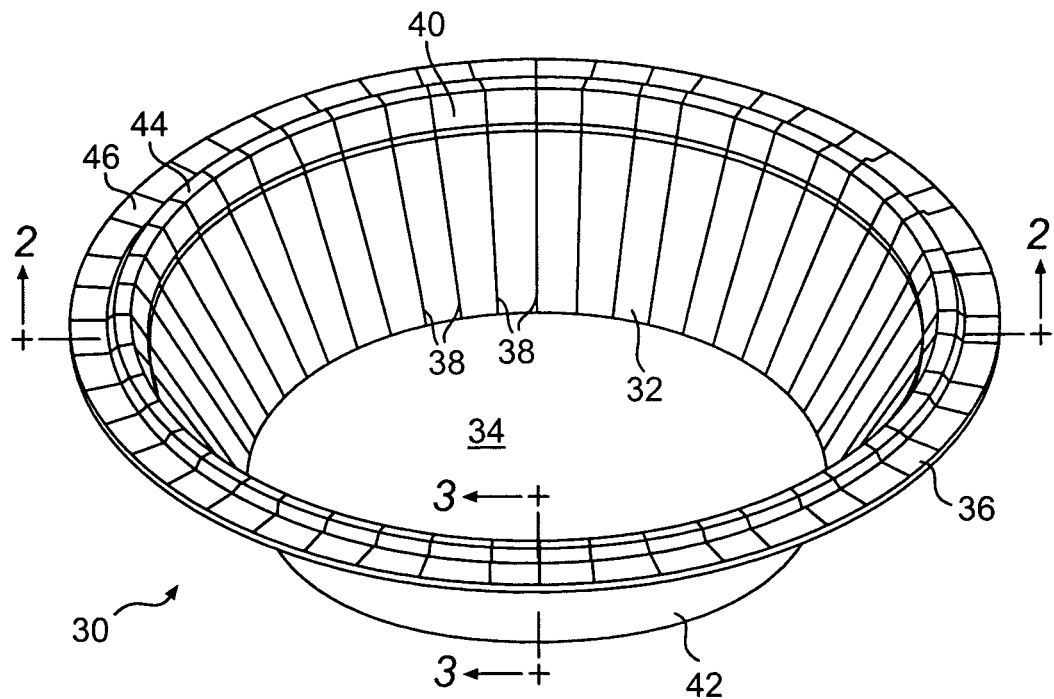
FIG. 1 is an isometric view looking downwardly on the open top of a nestable container in accordance with a first embodiment.
Figure 2:
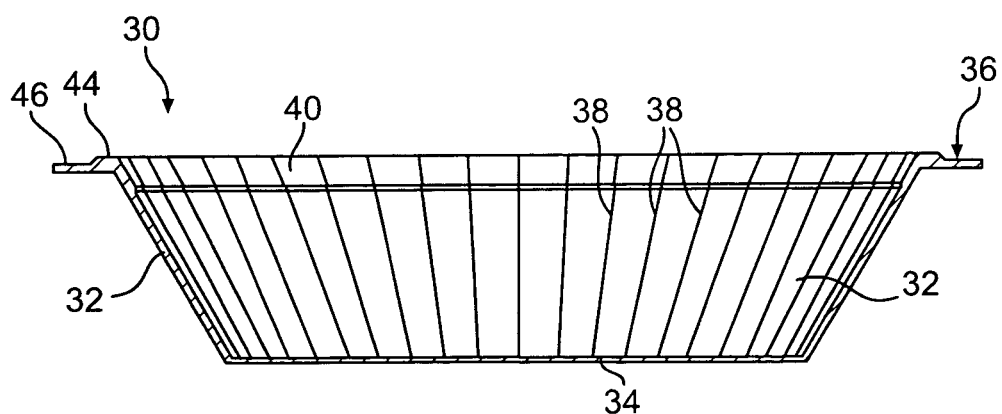
FIG. 2 is a section view taken along line 2-2 of FIG. 1.
Figure 3:
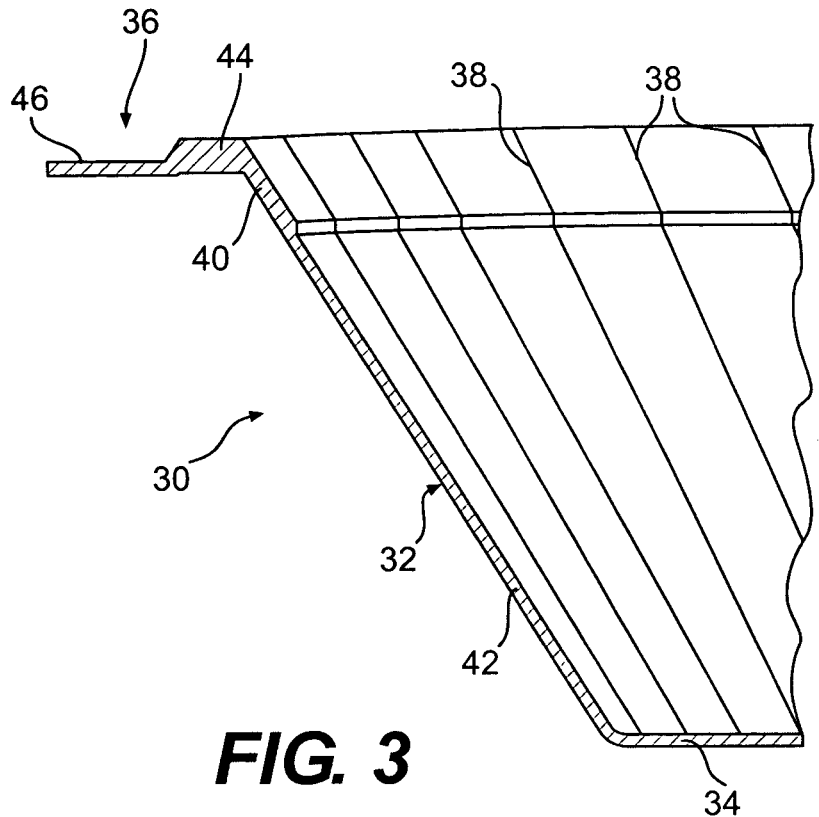
FIG. 3 is an enlarged fragmentary section taken along line 3-3 of FIG. 1.

FIGS. 1-3 illustrate a first embodiment of a container 30 having a downwardly tapering frustoconical sidewall 32 that is integrally continuous along its bottom edge with a flat circular bottom wall 34, and along its top edge with a radially outwardly directed horizontal flange 36. The sidewall 32 and the flange 35 have a plurality of radially directed pleats 38. As will be explained in more detail below, an upper peripheral area 40 of the sidewall 32 is relatively thick in comparison to the remaining lower portion 42 of the sidewall 32 to facilitate alignment of nested containers of the same construction. Similarly, the flange 36 has a relatively thick radially inner peripheral portion 44 and a relatively thin radially outer peripheral portion 46.

The container 30 may be formed from a flat circular blank (not shown) of material, such as paperboard, with the circular blank of material having a plurality of radially directed uniformly spaced score lines formed therein, with the score lines radiating from the peripheral edge of a central portion of the blank. During a die-forming process to be described in more detail below, the sidewall 32 and the flange 36 are reduced in radius and correspondingly in surface area, and the score lines are simultaneously compressed to establish the pleats 38 of gathered paperboard material.

Figure 4:
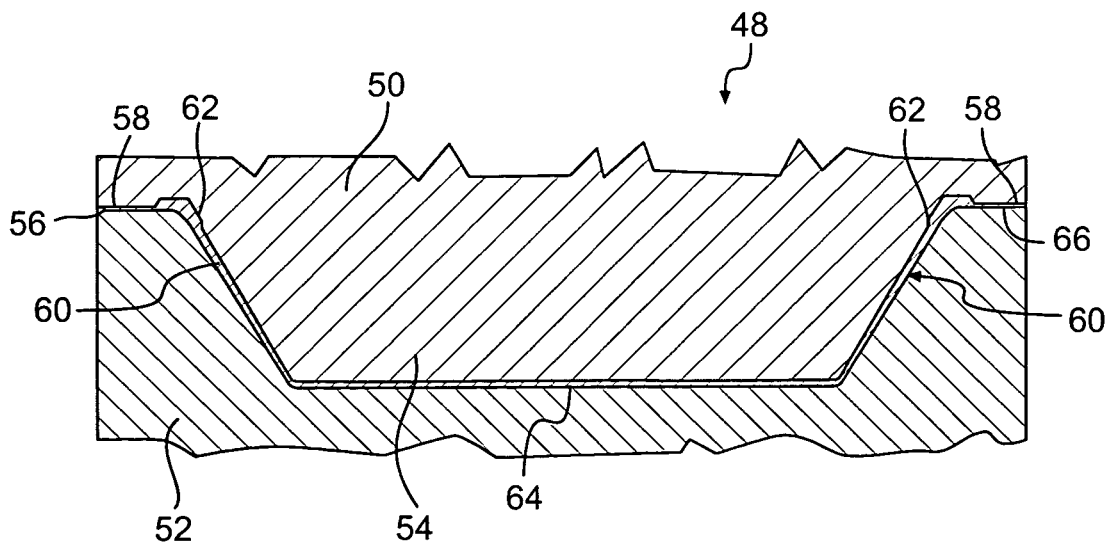
FIG. 4 is a vertical section of a die set used to form the container of FIG. 1 with a blank of material from which a container is formed positioned within the die set.

FIG. 4 is a sectional view of a die set 48 for forming the container 30 of FIGS. 1-3. The die set 48 has a forming punch 50 and a forming die 52. The forming punch 50 has a generally frustoconical downward protrusion 54 conforming in shape to an interior of the container 30. Further, the forming punch 50 has an outwardly projecting shoulder 56 having a ring-like recess 58 of generally trapezoidal transverse configuration around its innermost edge. A frustoconical wall 60 of the protrusion 54 has a ring-like recess 62 adjacent to the upper edge thereof so that when the container 30 is formed, the upper portion of the sidewall 32 and the radially inner portion of the flange 36 can be of greater thickness than the remainder of the sidewall 32 and the remainder of the flange 36, respectively. The forming punch 50 cooperates with the forming die 52 and has a frustoconical recess 64 generally conforming in size and shape to the frustoconical protrusion 54, along with a flat ring-like shoulder 66 adapted to confront the shoulder 56 of the forming punch 50.

To form a container 30, a circular blank (not shown), such as of paperboard and as described above, is positioned so as to be engaged by the forming punch 50 as the forming punch 50 advances toward the forming die 52. The blank is thereby forced between the forming punch 50 and the forming die 52 so as to assume the configuration illustrated in FIG. 4.

During the compression stroke of the die set 48, the excess blank material adjacent to the upper portion 40 of the sidewall 32 and the inner portion 44 of the flange 36, which is created due to the reduction in the radius and surface area of the sidewall 32 and the flange 36, is allowed to bulge into the continuous space defined by the recesses in the protrusion 54 and the shoulder 56 so that the relatively thick zones 40 and 44 are formed along the upper portion of the sidewall 32 and the inner portion of the flange 36, respectively. The pleats 38 will normally extend across the thickened portions of the container 30 in their passage from the bottom wall 34 to the outer edge of the flange 36 along preformed score lines in the blank. In other words, since the pre-scored outer ring-like area of the flat blank of material is elevated during the compression process relative to the flat unscored center portion of the blank material, the radius and surface area of that ring-like outer portion is reduced, forcing the material to occupy a smaller space. The score lines allow the excess material to be bunched and squeezed together to form the pleats 38.

Figure 5:
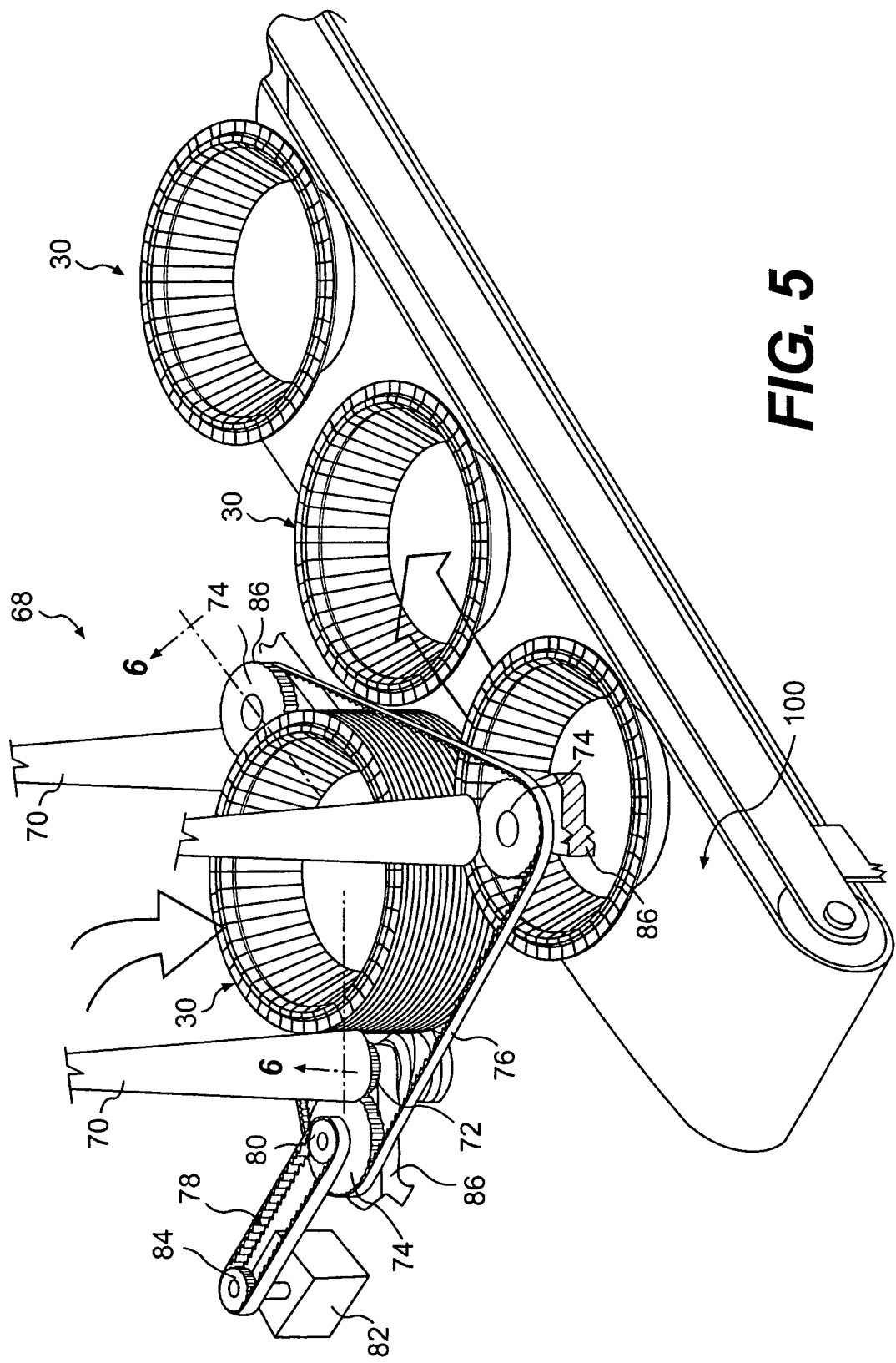
FIG. 5 is a fragmentary isometric view of an apparatus for denesting a stack of nested containers.

FIG. 5 illustrates the container 30 stacked in a nested relationship with other like containers 30, along with an apparatus 68 for denesting the containers 30 from the bottom of the stack. The stack of containers 30 is positioned in the apparatus 68 with open ends facing upwardly and positioned between and retained in a vertical orientation by three vertical tapered guides 70. The guides 70 allow a stack of the containers 30 to be deposited in the apparatus 68 and retained in a substantially vertical orientation. Three guides 70 are illustrated in FIG. 5, but additional guides may be used.

The guides 70 are rotatably mounted on bearings (not seen) in their lower ends and have a first gear 72 that meshes with a second gear 74. The second gears 74 associated with each guide 70 are operatively interconnected with a timing belt 76 so that they rotate in unison. One of the second gears 74 is in turn driven by a second timing belt 78 on an attached gear 80 by a drive motor 82 having a drive gear 84 located thereon. Accordingly, operation of the motor 82 causes each of the second gears 74 to rotate, which in turn rotates the first gears 72 at a predetermined and coordinated rate. The first gears 72 are rotatably mounted on fixed support arms 86 above the upper surfaces of the arms and a denesting screw 88 is secured to a common vertical shaft (not seen) with the first gear 72 for unitary rotation therewith. The denesting screw 88 is positioned beneath the support arm 86.

Figure 6:
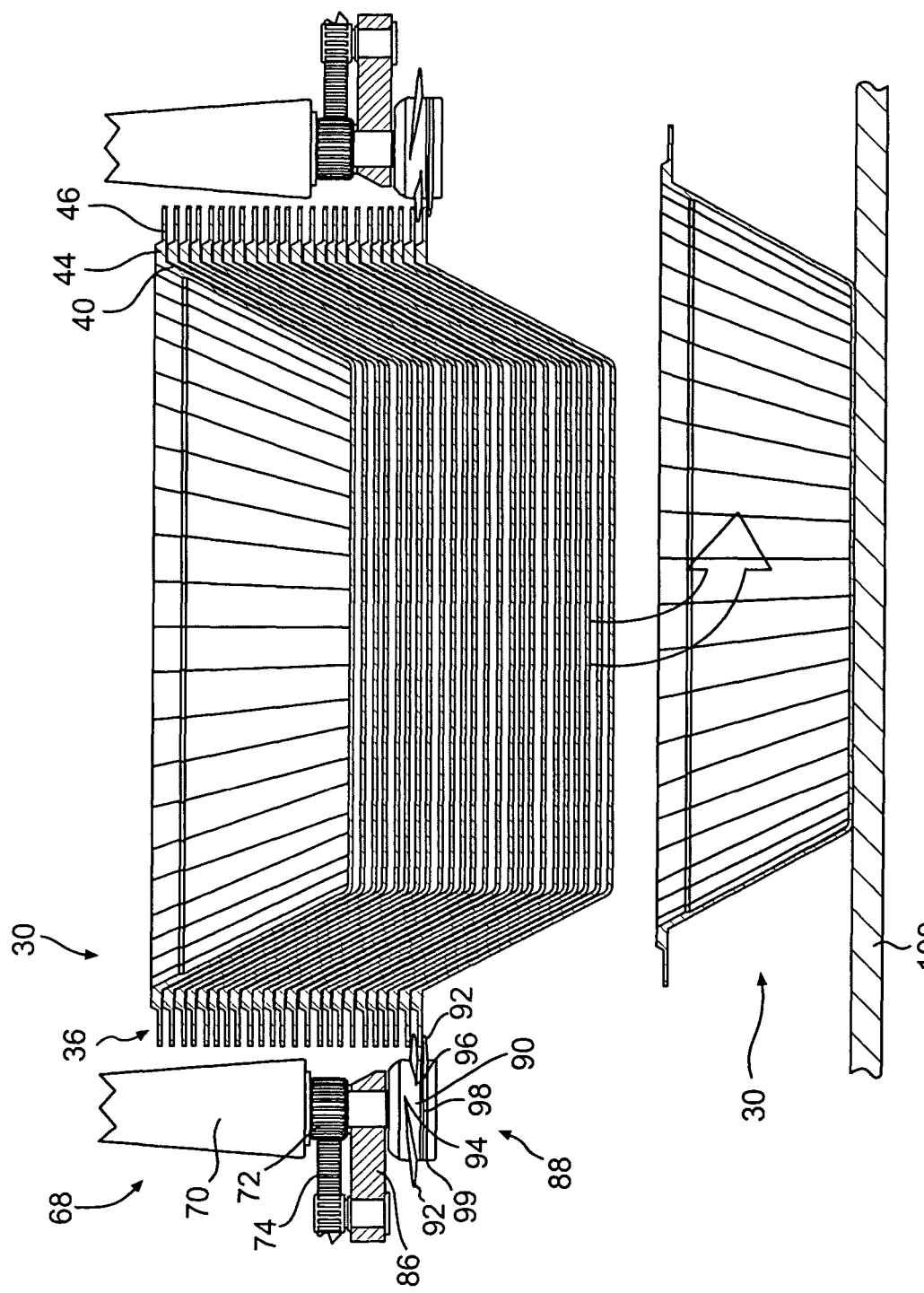
FIG. 6 is an enlarged fragmentary section taken along line 6-6 of FIG. 5.

Referring to FIG. 6, the denesting screw 88 has a generally cylindrical main body 90 and a spiral knife-edge type thread 92 that passes through approximately one revolution so that it has an uppermost terminal end 94 and a lowermost terminal end 96 vertically spaced but adjacent to each other. Spaced downwardly from the lowermost terminal end 96 is a horizontal ring-like support 98 that extends substantially but not totally around the main body 90 so as to define a gap 99 in the ring-like support 98.

In order to denest containers 30 from a stack and to drop the lowermost denested container 30 onto an underlying conveyor belt 100, or any next operational element in the system, the stack is placed in the apparatus 68 so that the underside of the flange 36 of the lowermost container 30 above the threads 92 engages and is supported on the spiral knife-edge threads 92 of the guides 70. When the motor 82 turns the apparatus 68, the spiral threads 92 rotate such that the upper terminal end 94 of the spiral thread 92 moves into a gap between the flanges 36 of adjacent nested containers 30 and allows the container on top of the thread 92 to be lowered as the thread 92 is rotated until it reaches the lowermost end 96 of the thread 92, where the container 30 is allowed to drop onto the partial ring-like support 98. Further rotation of the denesting apparatus causes the gap or the discontinuous portion 99 of the ring-like support 98 to move into alignment with the flange 36 of the container 30 resting thereon and the container 30 is allowed to drop through the gap 99 and away from the stack onto the underlying conveyor belt 100.

The knife-edge thread 92 and the partial ring-like support 98 protrude a sufficient distance away from the cylindrical main body 90 so as to support a significant portion of the relatively thin outer portion of the flange 36 of an associated container 30 for reliable operation of the denesting apparatus 68. The relatively thick inner portion 44 of the flange 36 on each container 30 rests upon the relatively thick portion 44 of the next adjacent lower flange 36, and also supports the next adjacent upper flange 36 along the relatively thick portion 44 of that flange 36. Similarly, the relatively thick upper portion 40 of the sidewall 32 of each container 30 engages the corresponding relatively thick upper portions 40 of the sidewalls 32 of the next adjacent upper and lower containers 30 so that the containers 30 are desirably aligned in a nested stack for later separation.

Due to the thickness of the radially inner portion 44, the relatively thin radially outer portion 46 of the flange 36 is spaced from the corresponding relatively thin radially outer portion 46 of adjacent containers 30 to define uniform gaps of sufficient height to permit the insertion of the spiral knife-edge 92 so that containers 30 can be reliably removed from the bottom of a stack while supporting the remainder of the stack thereabove. There are several other type of denesting devices, for example, which use vacuum cups to denest containers from a stack. These devices will also dispense containers more reliably when they include denesting features according to the present embodiments.

Figure 7:
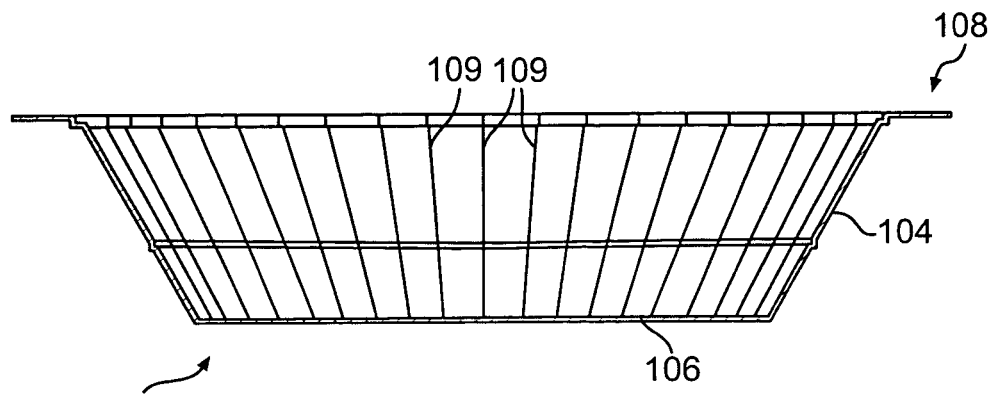
FIG. 7 is a vertical section taken through a second embodiment of a container.
Figure 8:
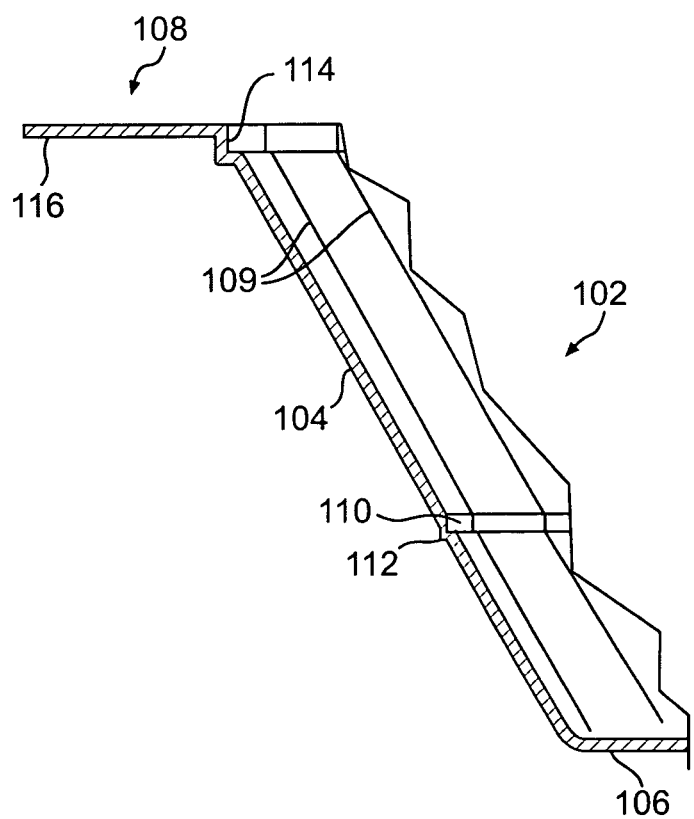
FIG. 8 is an enlarged fragmentary view of the left side of the container illustrated in FIG. 7.

FIGS. 7-10 illustrate a second embodiment of a container 102. Referring to FIGS. 7 and 8, the container 102 is similar to the container 30 shown in FIGS. 1 and 2 in that it includes a generally frustoconical sidewall 104 that is integrally continuous along its lower edge with a flat circular bottom wall 106, and along its upper edge with a ring-like outwardly directed radial flange 108. Radiating pleats 109 extend across the sidewall 104 and the flange 108. In this embodiment, the sidewall 104 is deformed during the forming process to define an annular recess 110 in the inner surface of the sidewall 104 that is generally V-shaped in cross section, and a generally V-shaped ring-like protrusion 112 in the outer surface of the sidewall 104. The flange 108 is defined by a radially inner upstanding wall portion 114 and a radially outer flat radial ring-like portion 116.

Figure 9:
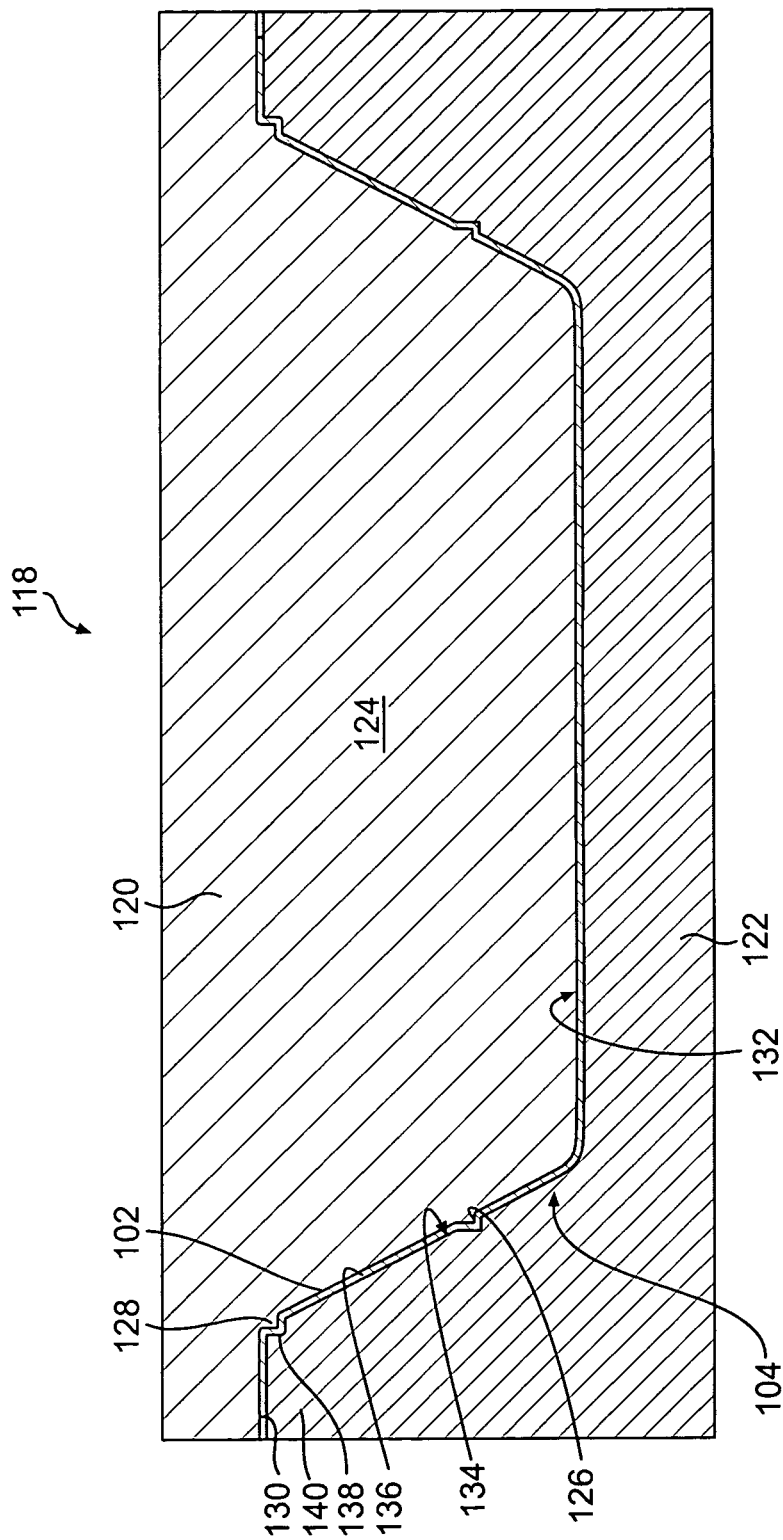
FIG. 9 is a vertical section through a die set used for forming the container of FIG. 7 with a blank of material used to form the container positioned within the die set.

FIG. 9 illustrates a forming operation of the container 102 in a die set 118. The die set 118 has a forming punch 120 and a forming die 122, wherein the forming punch 120 has a generally frustoconical protrusion 124 having a ring-like rib 126 of V-shaped cross section formed in the frustoconical surface thereof approximately a third of the way up the sidewall 104. An annular shoulder 128 is established in the forming punch 120 adjacent to the upper edge of the frustoconical surface and a recess 130 is formed in the shoulder 138. The forming die 122 has a generally frustoconical recess 132 conforming to the protrusion 124, and a ring-like depression 134 of generally V-shaped cross section formed in the frustoconical wall 136 of the recess 130. The depression 134 is aligned with the ring-like rib 126 on the forming punch 120 when the forming punch 120 and the forming die 122 are in a contiguous confronting relationship. The forming die 122 has a shoulder 138 along the upper edge of the frustoconical recess 132 that is alignable with the shoulder 128 of the forming punch 120, and a radially outward protrusion 140 in the shoulder 138 adapted to matingly protrude into the recess 130 in the forming punch 120. When a blank of material (not shown) from which the container 102 is made is positioned in the die set 118, it is deformed into the configuration illustrated in FIGS. 7 and 8.

Figure 10:
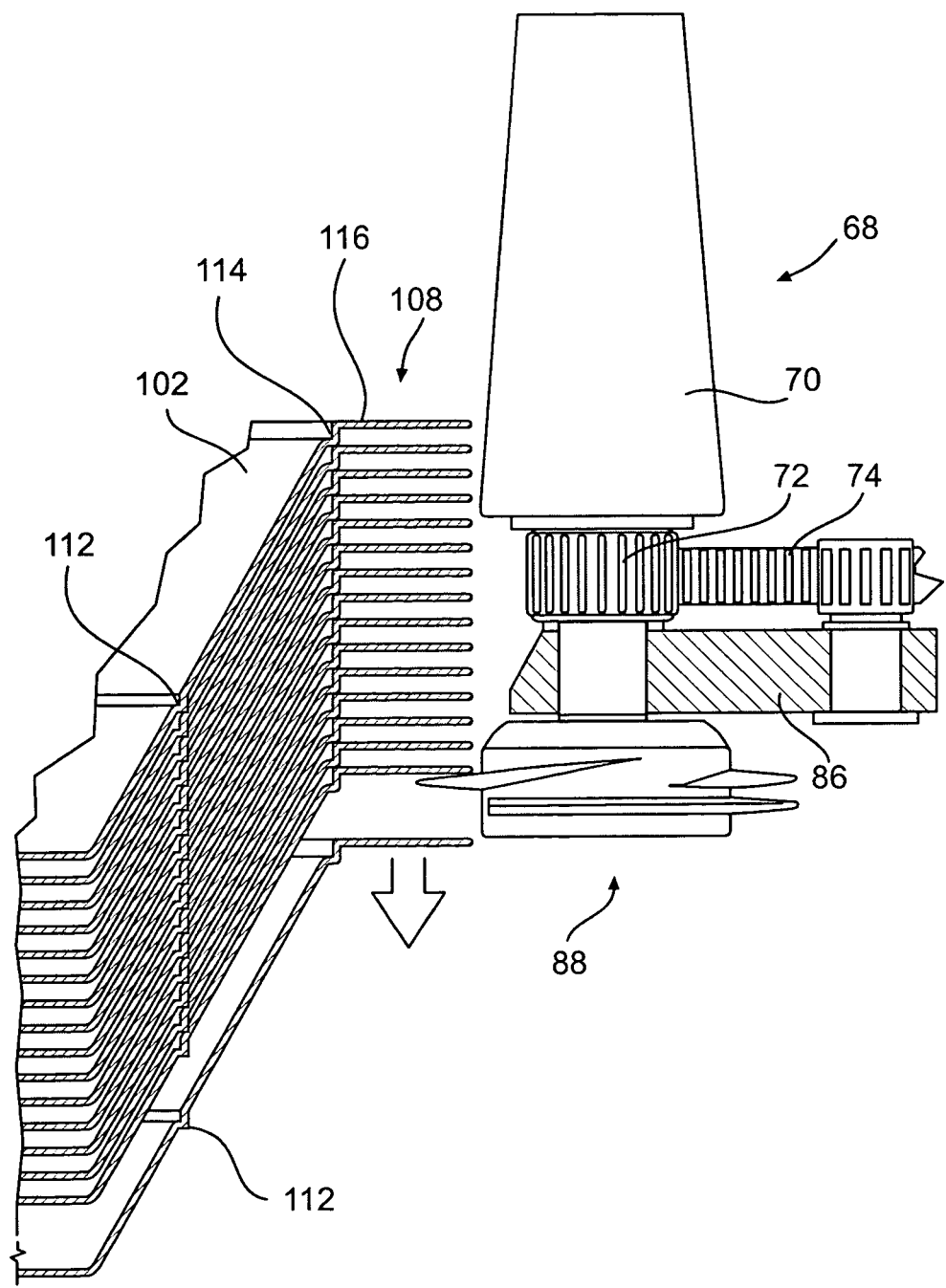
FIG. 10 is a fragmentary vertical section taken through a denesting apparatus and a stack of containers according the second embodiment.

Referring to FIG. 10, a stack of nested containers 102 of the type illustrated in FIGS. 7 and 8 is shown in a denesting apparatus 68 which may be identical to that previously described in FIGS. 5 and 6. When like containers 102 are stacked, as shown in FIG. 10, the inner wall portion 114 becomes aligned with the corresponding inner wall portion 114 of the next adjacent upper and lower containers 102 to support the stack of containers 102 in a nested relationship. In this relationship, the radially outer ring-like portion 116 of each container 102 is thereby separated from the corresponding radially outer ring-like portion 116 of the next adjacent containers 102. The gap between the radially outer portions 116 of the flanges 108 of adjacent containers 102 provides for reliable denesting of the stack. Also, the ring-like protrusion 112 engages the inner surface of the sidewall 104 of the next adjacent lower container 102 so as to establish a uniform spacing between the sidewalls 104 of adjacent containers 102 and to establish a neatly aligned vertical stack.

Figure 11:
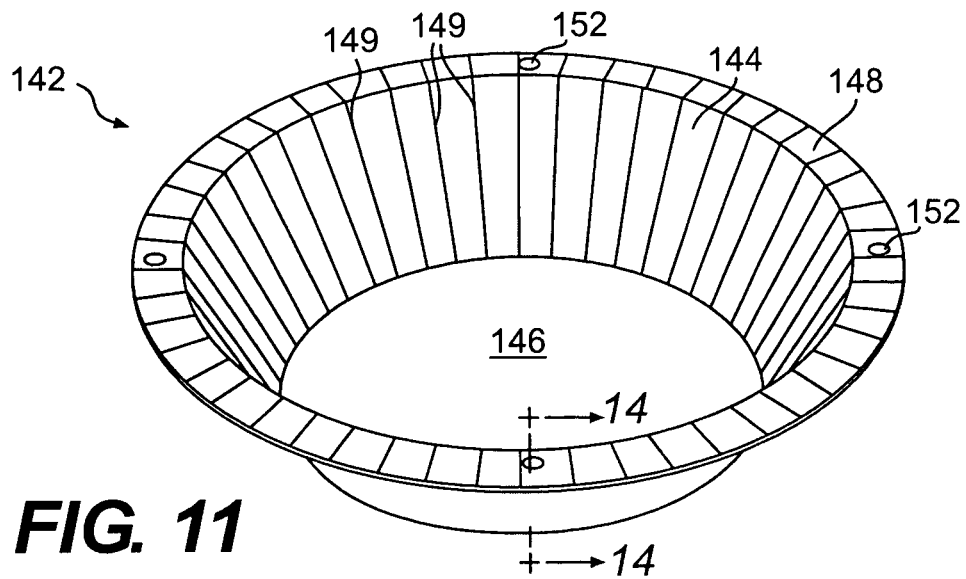
FIG. 11 is an isometric view looking downwardly toward the open top of a container according to a third embodiment.
Figure 12:
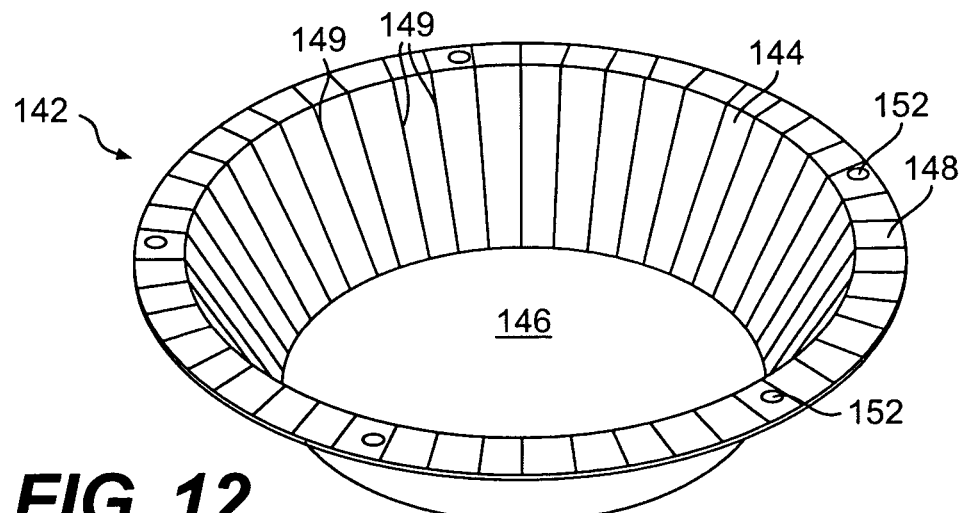
FIG. 12 is an isometric view of a first variant of the third embodiment.
Figure 13:
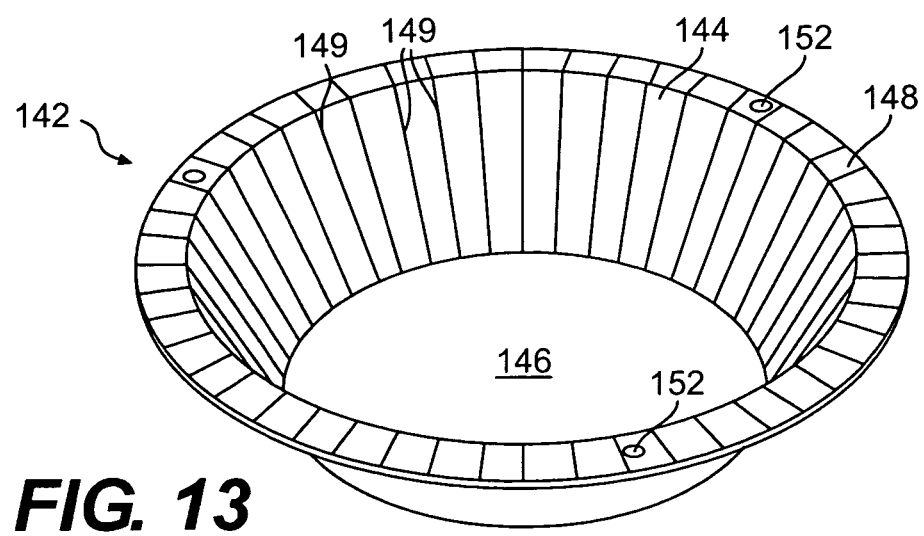
FIG. 13 is an isometric view of a second variant of the third embodiment.

FIGS. 11-16 illustrate variants of a third embodiment of a container 142 and a method of making the container. Referring to FIGS. 11-13, the container 142 is similar to the container 30 shown in FIGS. 1-2 in that it includes a frustoconical sidewall 144 integrally continuous along a bottom edge with a circular flat bottom wall 146 and along a top edge with a ring-like radially outwardly directed flange 148. Radiating pleats 149 are formed in the sidewall 144 and the flange 148 as described in previous embodiments.

Figure 14:
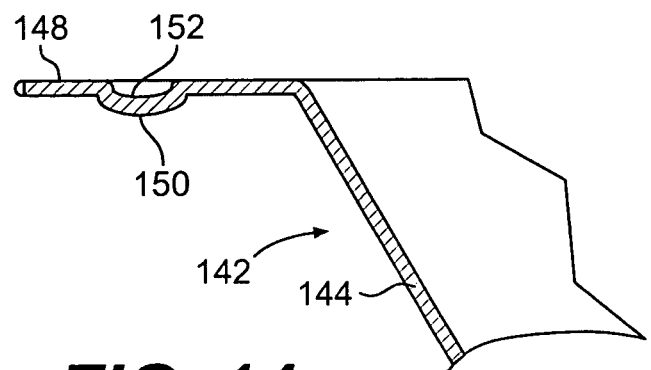
FIG. 14 is an enlarged fragmentary section taken along line 14-14 of FIG. 11.
Figure 15:
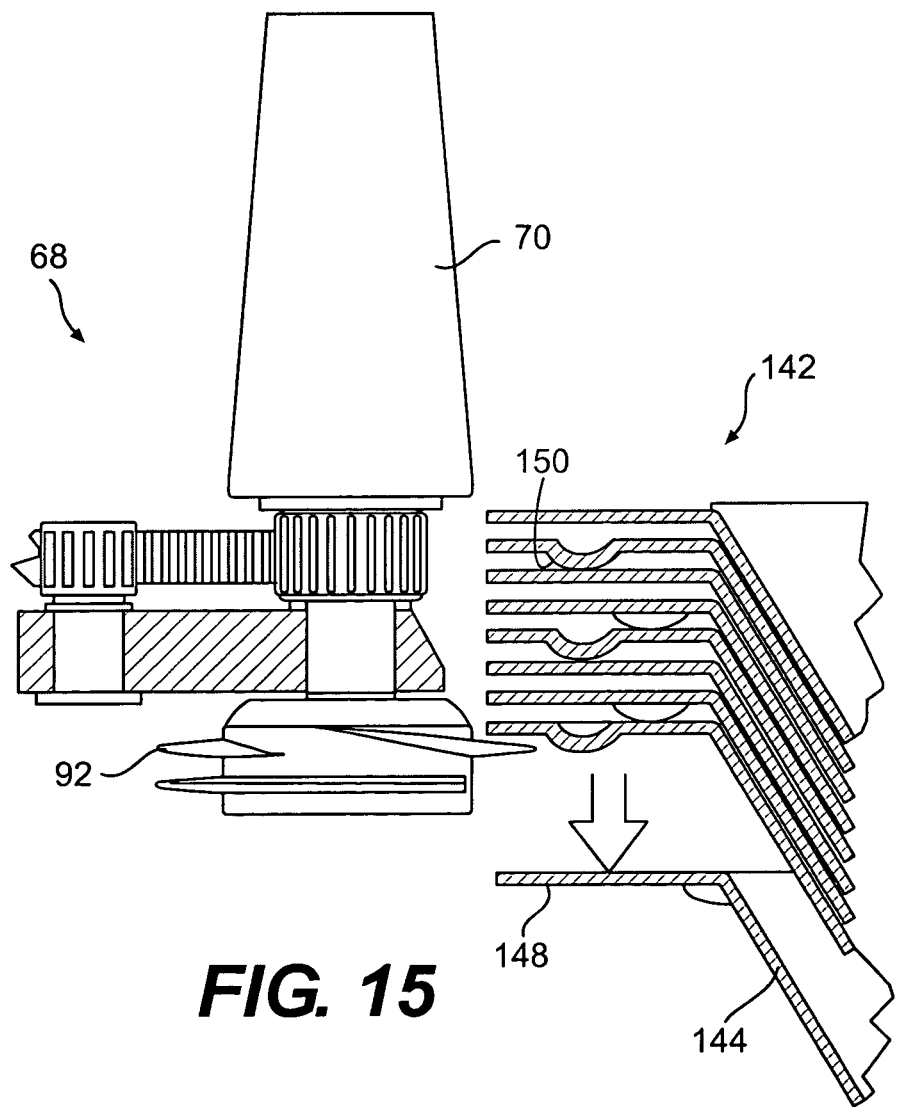
FIG. 15 is a fragmentary vertical section taken through an apparatus for denesting a stack of containers of the type illustrated in FIGS. 11, 12, and 13.

Referring to FIGS. 11-15, with specific reference to FIGS. 14 and 15, the flange 148 of the container 142 includes a plurality of deformations, namely convex hemispherical protrusions 150 extending from the bottom side of the flange 148, and concave indentations 152 defined in the top of the flange 148. The protrusions 150 separate the flanges 148 of adjacent like containers 142 in a nested stack of containers 142. The protrusions 150 are illustrated as generally hemispherical, although other shapes may be used. There may be any number of such protrusions, with three being shown in FIG. 13, five in FIG. 12, and four in FIG. 11.

Referring to FIGS. 14 and 15, the protrusions 150 serve as spacers such that when one container 142 is nested in an underlying container 142, as illustrated in FIG. 15, the outer periphery of the flanges 148 of the adjacent containers 142 are spaced. In order to avoid having the protrusion 150 on the undersurface of one flange 148 from being in registry with a depression in the top surface of the next adjacent lower flange 148, which would obviate the desired spacing between the flanges 148, the protrusions 150 can be established in different numbers on the various containers 142 or in various radial or circumferential locations along the surface of the flange 148, as is illustrated FIG. 15. No protrusion is visible for the uppermost container 142 in FIG. 15 because its protrusions are at other angular locations than the location illustrated. FIG. 15 also shows a denesting apparatus 68 of the type previously described where corresponding reference numerals have been applied and the operation of the denesting apparatus 68 may be identical to that previously described.

Figure 16:
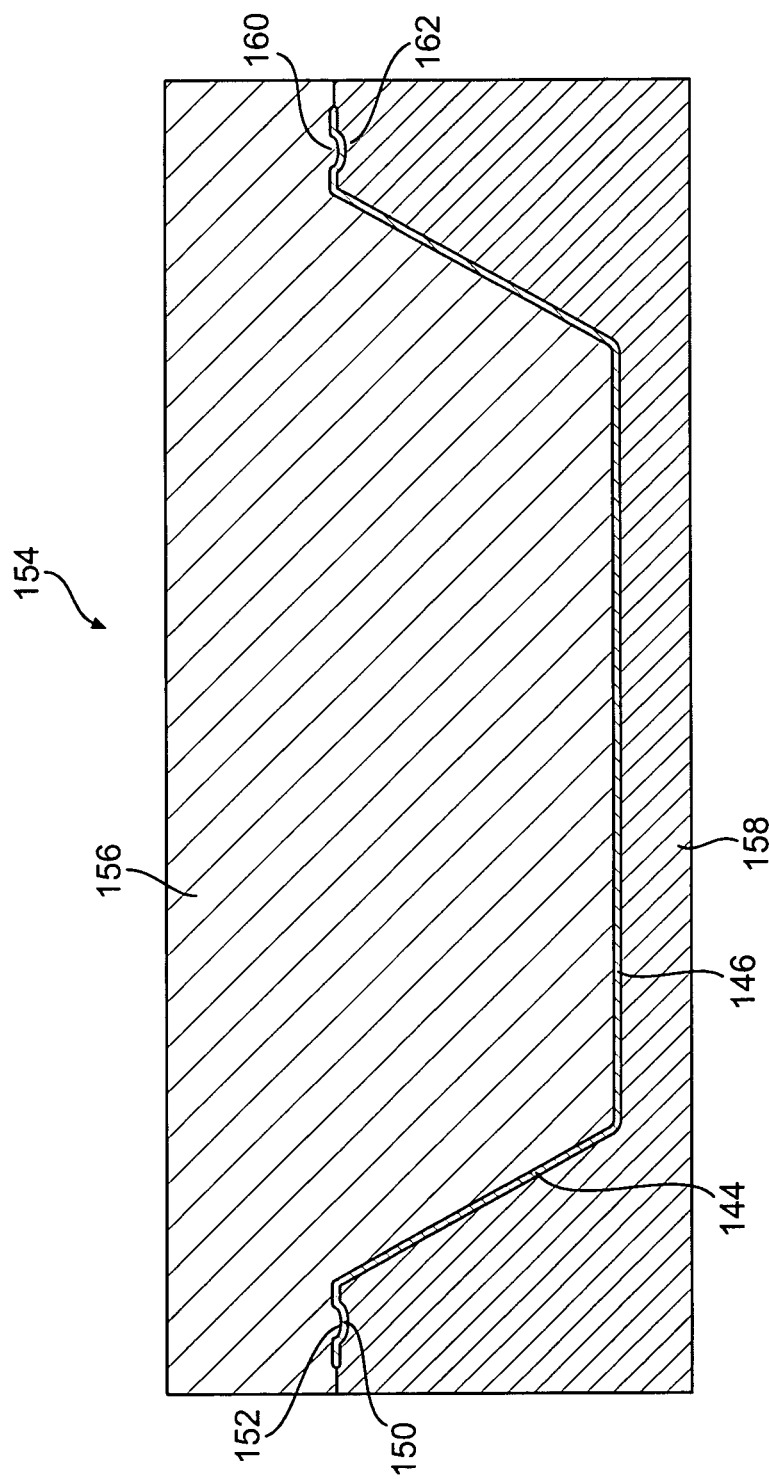
FIG. 16 is a vertical section taken through a die set for forming the container of the third embodiment with a blank of material used to form the container placed in the die set.

FIG. 16 illustrates a method of making the container 142 a die set 154. The die set 154 includes a forming punch 156 and a forming die 158. The forming punch 156 has a plurality of generally hemispherical beads 160 and the forming die has a plurality of generally hemispherical recesses 162. When a blank of material (not shown) from which the container 142 is made is positioned between the forming punch 156 and the forming die 158 and the forming punch 156 is advanced into registration with the forming die 158, the blank is compressed into the configuration illustrated in FIG. 14. Other systems for forming protrusions can be employed.

Figure 17:
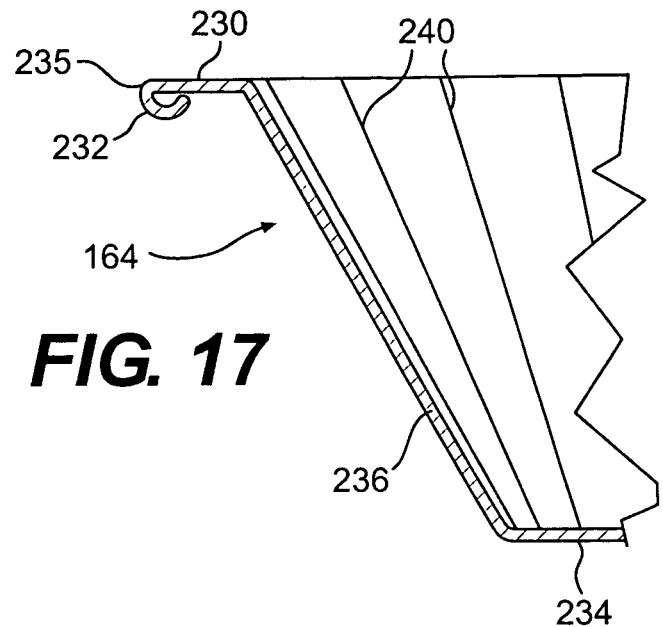
FIG. 17 is a fragmentary vertical section showing one side of a container according to a fourth embodiment.
Figure 18:
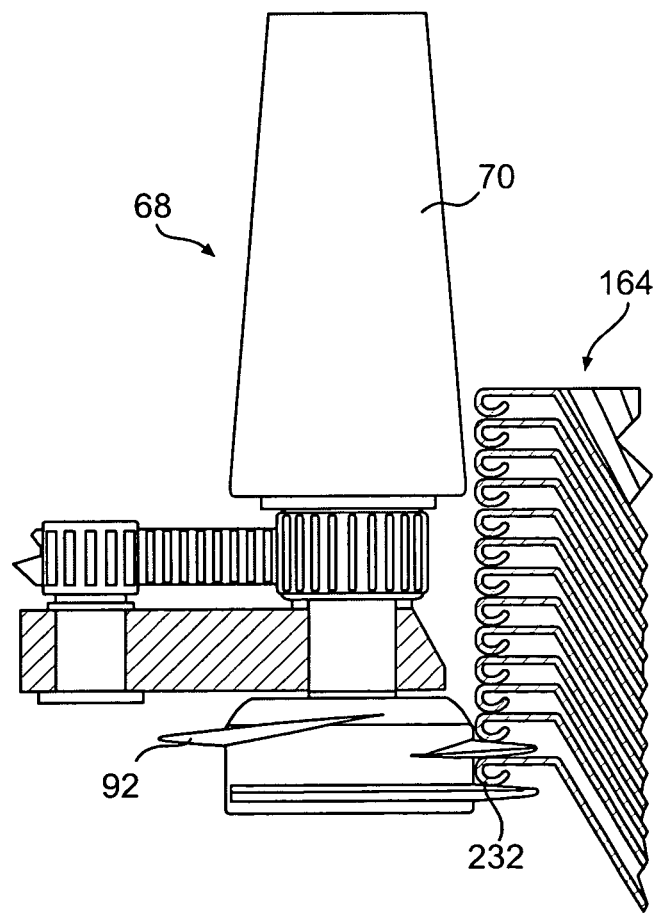
FIG. 18 is a fragmentary vertical section of a device for denesting a nested stack of containers of the type shown in FIG. 17.

FIGS. 17-23 illustrate a fourth embodiment of a container 164 and a method of making the container 164. FIG. 17 is a partial sectional view of the container 164, which includes a bottom wall 234, a sidewall 236, and a flange 230. The flange 230 has a rolled outer portion 232. The rolled outer portion 232 rolls under at a peripheral edge 235. The rolled outer portion 232 has a curved surface which can function as a cam in denesting operations, as illustrated in FIG. 18. The container 164 also has radiating pleats 240 formed in the sidewall 236 and in the flange 230 which result from radiating score lines (not shown) in the blank from which the container 164 is formed.

With reference to FIG. 18, a denesting apparatus 68 of the type previously described is illustrated with corresponding parts having like reference numerals. A stack of nested containers 164 of the shape illustrated in FIG. 17 is positioned within the denesting apparatus 68 such that the spiral knife-edge blade 92 can be inserted between containers 164 to separate the lowermost container 164 in the stack from the next adjacent upper container 164. The curved surface of the rolled edge 235 of the uppermost container 164 serves as a cam so that when the knife edge 92 engages the curved surface, the container 164 above the knife edge 92 is lifted to establish a separation between adjacent containers.

Figure 19:
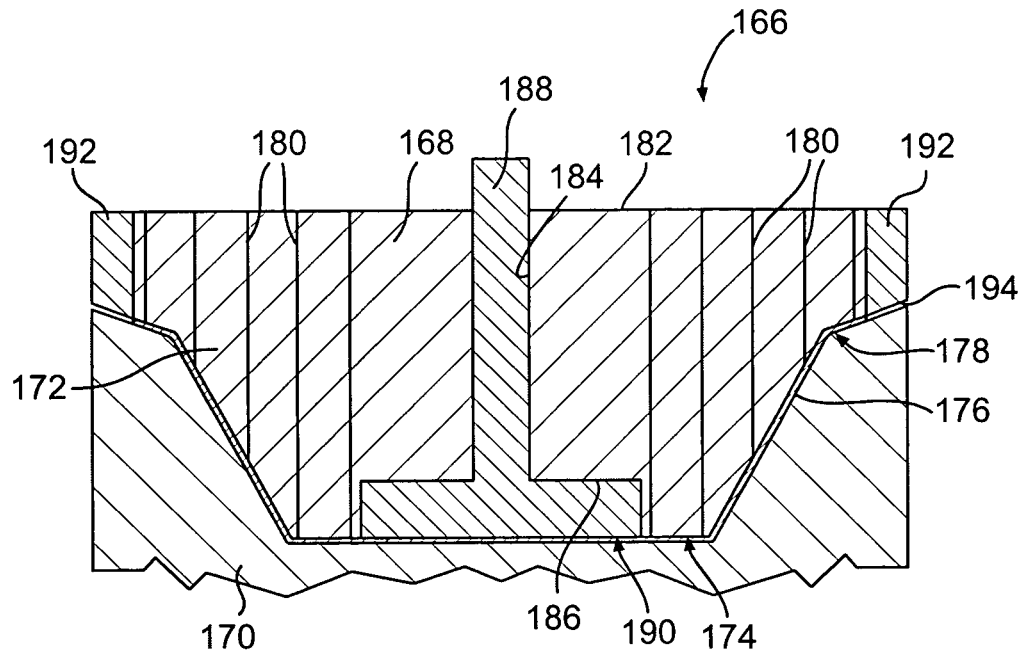
FIG. 19 is a fragmentary isometric view illustrating a die set for forming the container of the fourth embodiment with a blank of material used to form the container disposed therein in a precursor form.

A method of making the container 164 will now be discussed with reference to FIGS. 19-23. Referring to FIG. 19, a first die set 166 includes a forming punch 168 and a forming die 170 with a deformed blank of material from which the container 164 is to be made positioned between the forming punch 168 and the forming die 170, and also with the forming punch 168 fully received in the forming die 170. The forming punch 168 includes a frustoconical protrusion 172 having a circular bottom wall 174, a frustoconical wall 176, and a ring-like shoulder 178 around the frustoconical wall 176 which is inclined upwardly and outwardly. The forming punch 168 also includes a plurality of vertical air passages 180 extending from the top surface 182 of the forming punch to the bottom wall 174, the frustoconical wall 176 and the shoulder 178, so that compressed air can be directed through the passages 180 to assist in ejecting a finished container. A central axial passage 184 having an enlarged recessed portion 186 at the bottom end thereof slidably receives a plunger 188. The plunger 188 extends to assist in ejecting a finished container 164. In the normal default position of the plunger 188, the bottom surface 190 of the plunger 188 is coplanar with the bottom wall 174 of the frustoconical protrusion of the forming punch 168.

A circular ring-like auxiliary plate 192 is mounted around the punch 168 for vertical reciprocating movement independent of the forming punch 168. The circular ring-like auxiliary plate 192 has a generally rectangular cross-sectional configuration with a bottom surface 194 being beveled so as to slope upwardly and outwardly at the same angle as the shoulder 178 of the forming punch 168. In a raised position of the auxiliary plate 192, as shown in FIG. 19, the bottom surface 194 of the auxiliary plate 192 is aligned with the shoulder 178 of the forming punch and in FIG. 20, the auxiliary plate 192 is shown advanced downwardly relative to the forming punch 168.

The forming die 170 includes a generally frustoconical recess 196 that generally conforms with the frustoconical protrusion 172 of the forming punch 168. The forming die 170 further has a ring-like shoulder 198 that is sloped upwardly and outwardly so as to underlie the shoulder 178 of the forming punch 168 and the bottom surface 194 of the auxiliary plate 192.

Figure 20:
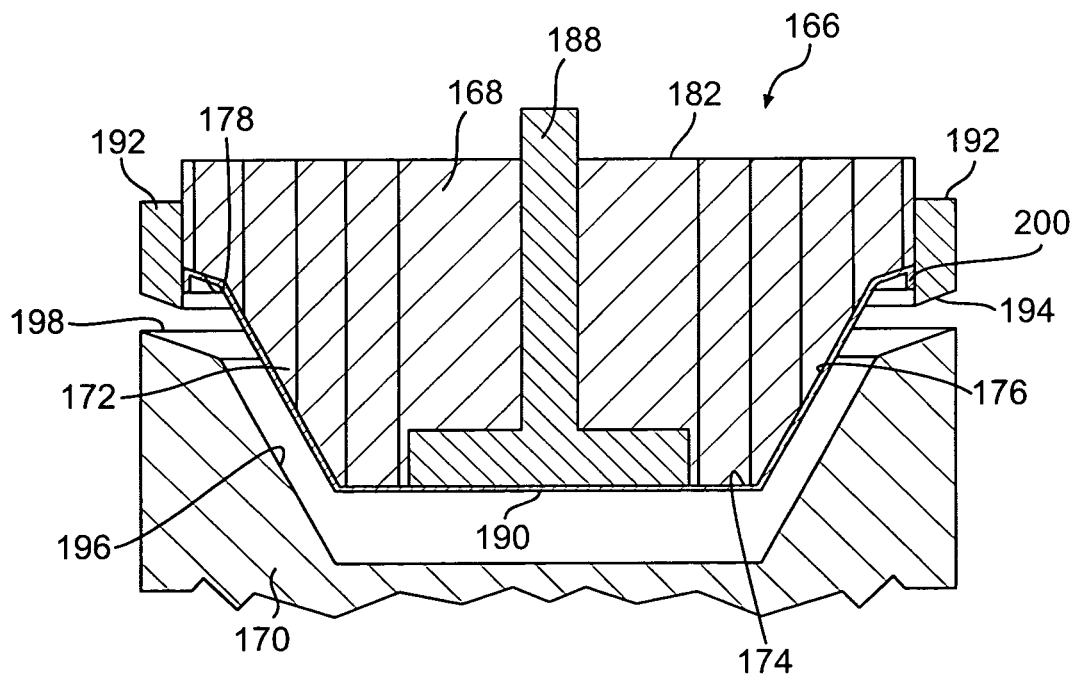
FIG. 20 is a fragmentary vertical section similar to FIG. 19 with the flange of the precursor being initially folded from the precursor form of FIG. 19.
Figure 21:
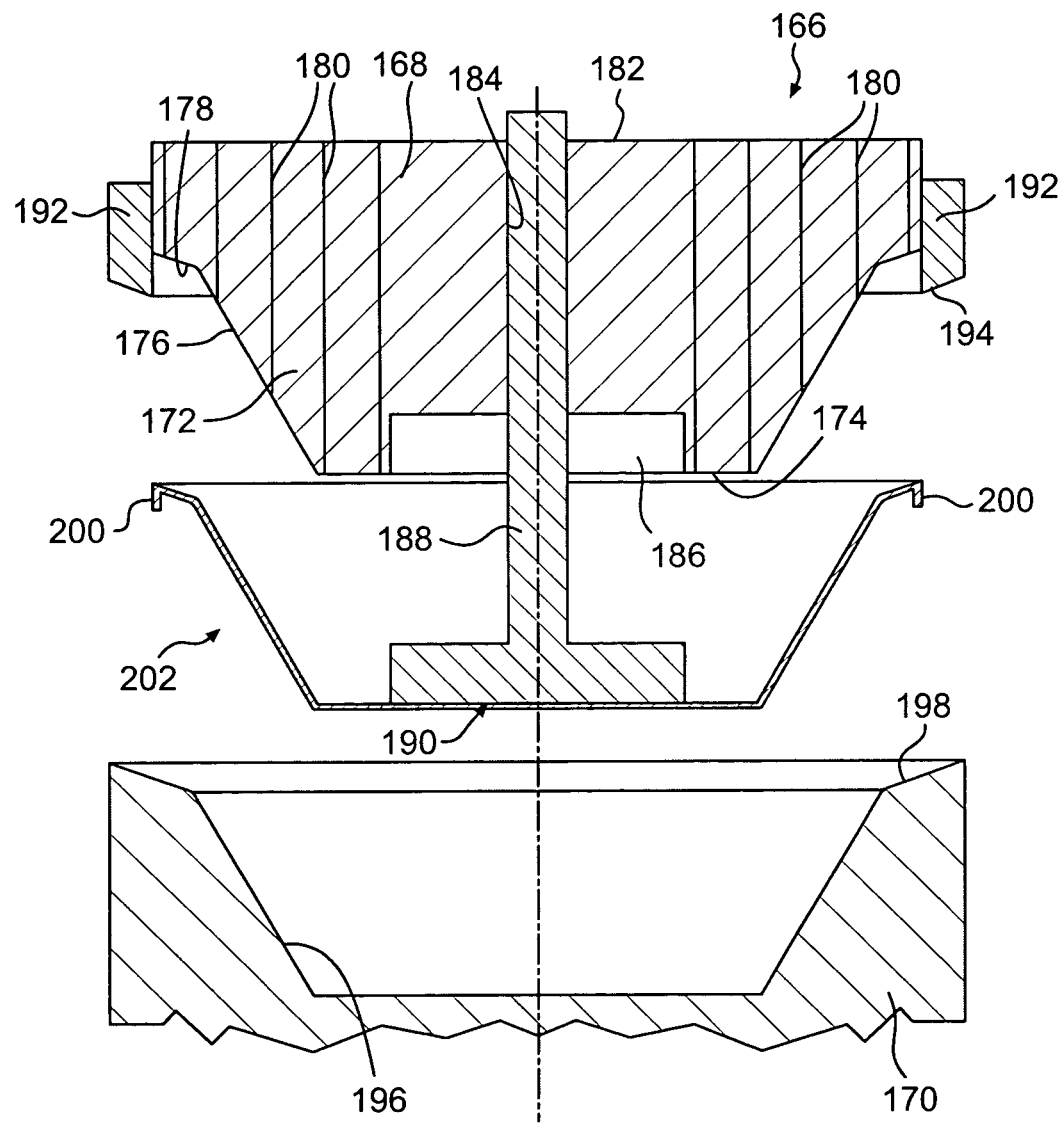
FIG. 21 is a vertical section similar to FIGS. 19 and 20 with the precursor having a folded flange and having been separated from the die set.

The operation of the die set 166 is best understood with reference to FIGS. 19-21. First, a blank of material from which the container 164 is to be formed is positioned between the forming punch 168. As a result, the auxiliary plate 192 and the underlying forming die 170, where it is deformed into an initial precursor form. Referring to FIG. 20, the forming punch 168 is raised relative to the forming die 170 while allowing the auxiliary plate 192 to be shifted downwardly relative to the forming punch 168 and in doing so, the auxiliary plate 192 folds the outermost portion of the flange of the precursor product vertically downwardly to form a flap 200.

Referring to FIG. 21, the precursor form of the container illustrated in FIG. 20 is separated from the forming punch 168 by advancing the plunger 188 downwardly. Separation can be assisted by passing compressed air through the passages 180 in the forming punch 168.

Figure 22:
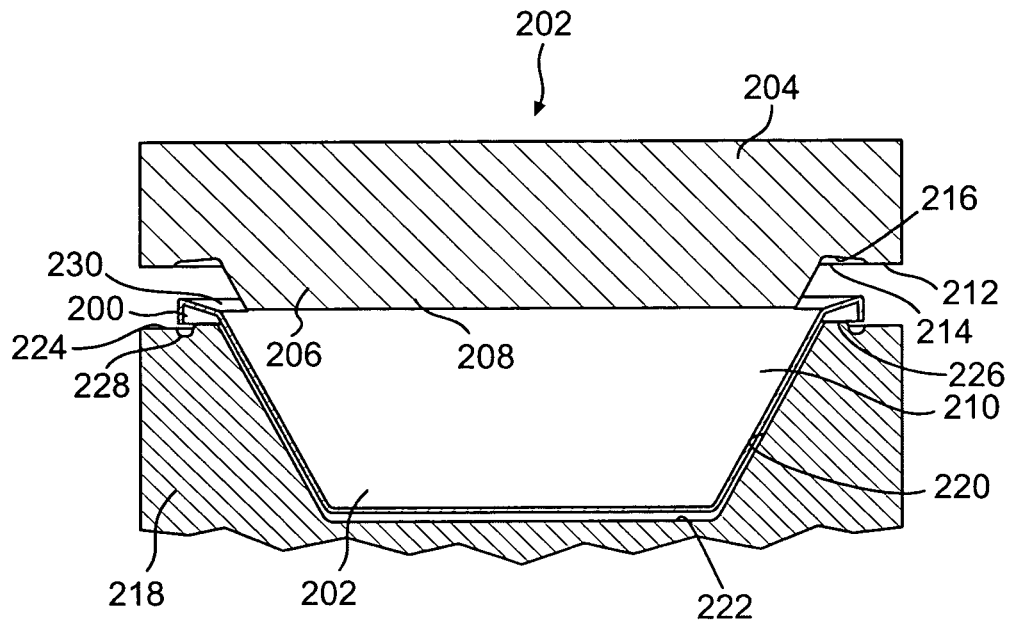
FIG. 22 is a fragmentary vertical section of the precursor formed as shown in FIG. 21 having been positioned in a second die set for rolling the folded edge of the precursor inwardly.

Referring to FIG. 22, the precursor product in the form illustrated in FIG. 21 is then be placed in a second die set 202. The die set 202 has a forming punch 204 with a frustoconical protrusion 206, a frustoconical sidewall 210 and a horizontal shoulder 212 having a recess 214 formed in approximately the inner half of the shoulder 212. The recess 214 has a top wall 216 that is inclined slightly downwardly and outwardly. The forming die 218 of the die set 202 has a frustoconical recess 220 with a circular flat bottom wall 222. The forming die 218 has a shoulder 224 with a raised innermost portion 226 that is sloped slightly downwardly and outwardly in conformance with the slope of the recess 214 in the shoulder 224 of the forming punch 204. Immediately radially outwardly from the sloped portion 226, the shoulder 224 of the forming die 218 has a ring-like recess 228 of generally semi-circular transverse cross section that extends around the entire periphery of the forming die 218 with the outer edge of the recess 228 being approximately in alignment with the down-turned edge of the flange 230 of the precursor product, when the product is positioned within the die set 202.

Figure 23:
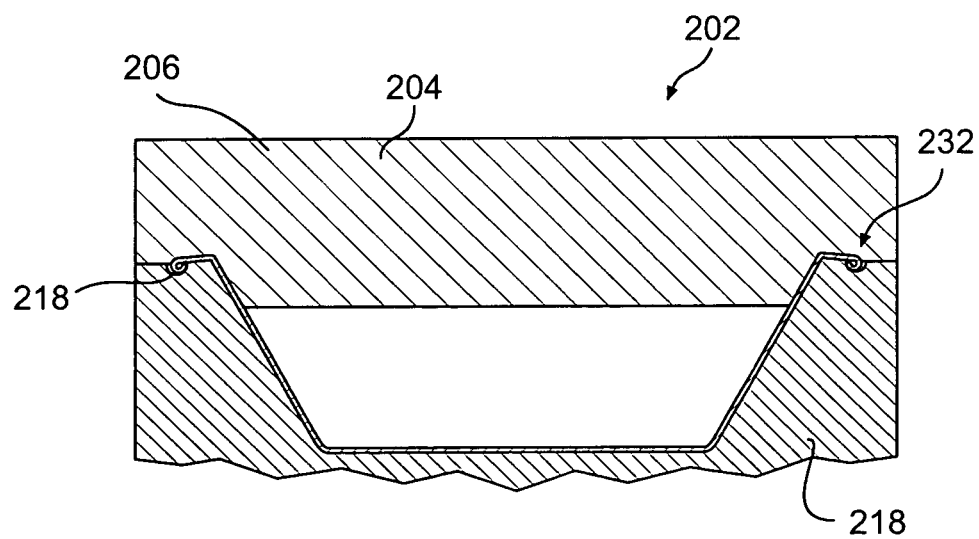
FIG. 23 is a fragmentary vertical section of the second die set with the folded edge of the precursor having been rolled inwardly.

Referring to FIG. 23, when the forming punch 204 is advanced downwardly toward the forming die 218, the outer edge of the flange 230 is forced to roll inwardly along the surface of the ring-like recess 228, thereby defining the rolled outer portion 232 of the container 164.

Figure 24:
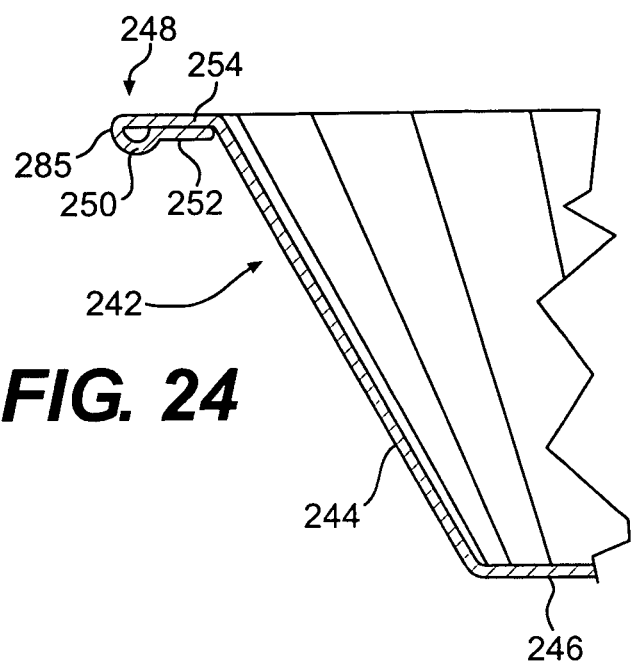
FIG. 24 is a fragmentary vertical section through a portion of the container according to a fifth embodiment.
Figure 25:
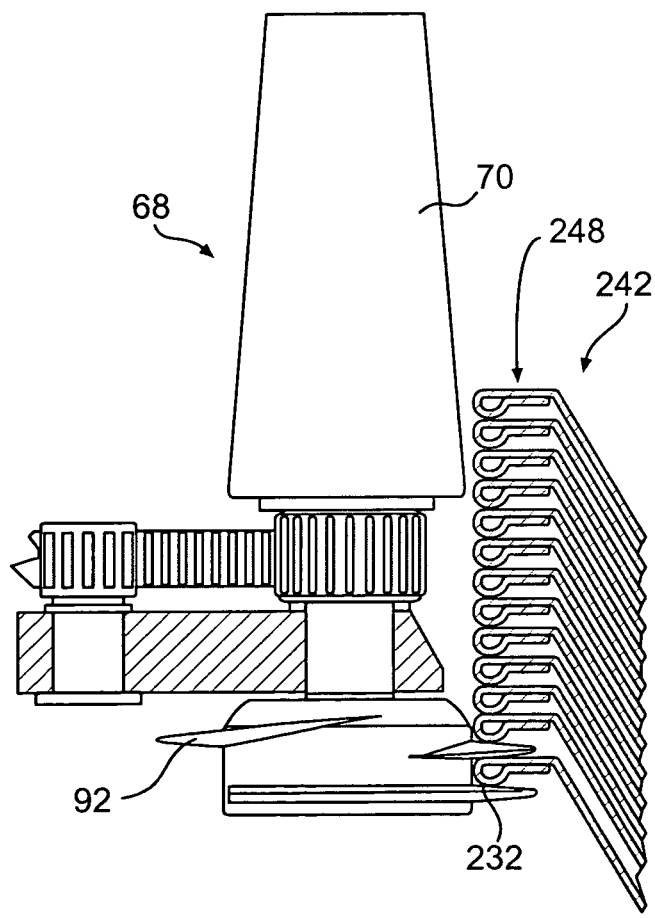
FIG. 25 is a fragmentary vertical section through a denesting apparatus and a stack of nested containers of the type illustrated in FIG. 24.

FIGS. 24-27 illustrate a fifth embodiment of a container 242 and a method of making the container 242. FIG. 24 is a partial sectional view of the container 242, and FIG. 25 illustrates a stack of containers 242 undergoing a denesting operation. Referring to FIGS. 24 and 25, the container 242 has a frustoconical sidewall 244 which is continuous along a bottom edge with a flat circular bottom wall 246 and along a top edge with a radially outwardly directed flange 248. The flange 248 is reverse-folded under itself so as to form a rolled or folded outer tubular portion 250 and a flat inner flap 252 that is engaged with the undersurface of the radially inner portion 254 of the flange 248. The outer rolled edge 285 of the flange 248 is therefore curved and can function as a cam during denesting operations.

With reference to FIG. 25, a stack of the containers 242 are shown in nested relationship adjacent to a denesting apparatus 68 of a type previously described. The component parts of the denesting apparatus 68 may be identical to those previously described and have been assigned identical reference numerals. When the denesting apparatus 68 is used to separate the lowermost container 242 from the remaining stack thereabove, the knife-edge spiral blade 92 rotates and engages the curved or rolled surface 285 of a flange 248 which serves as a cam to lift the container 242 below the uppermost container 242 to allow the knife edge 92 to be inserted between the flange 248 of that container 242 and the flange 248 of the next adjacent lower container 242. By following the operation previously described for the denesting apparatus 68, the lowermost containers 242 in the stack can be sequentially removed and deposited as desired on an underlying conveyor belt or the like, as illustrated in FIG. 5.

Figure 26:
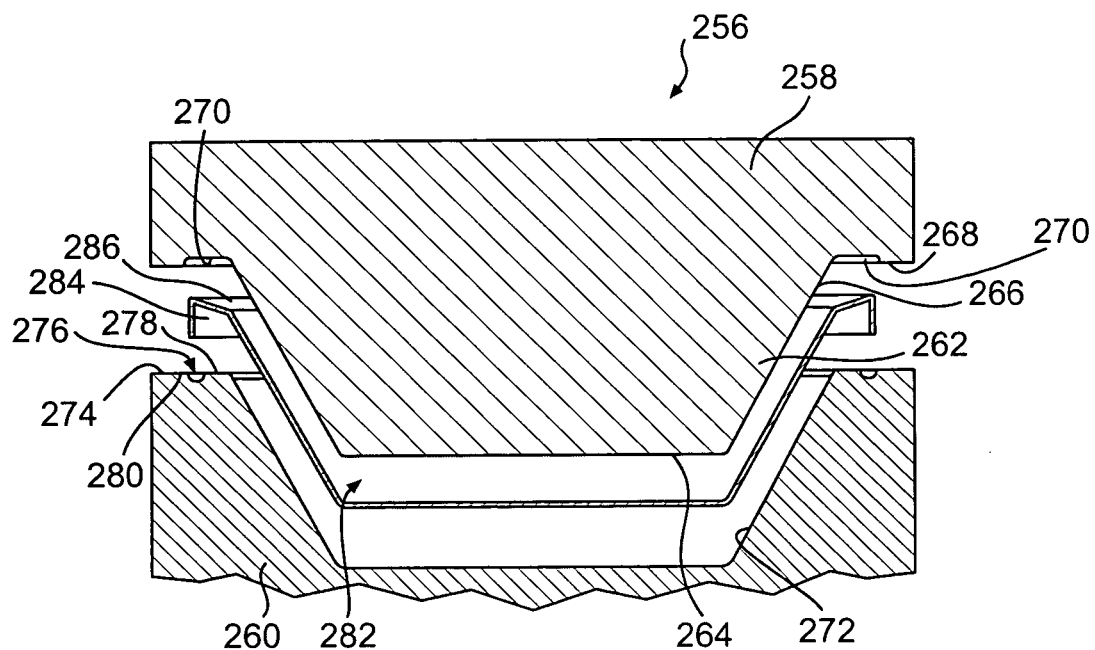
FIG. 26 is a fragmentary vertical section through a die set for forming the container of FIG. 24.
Figure 27:
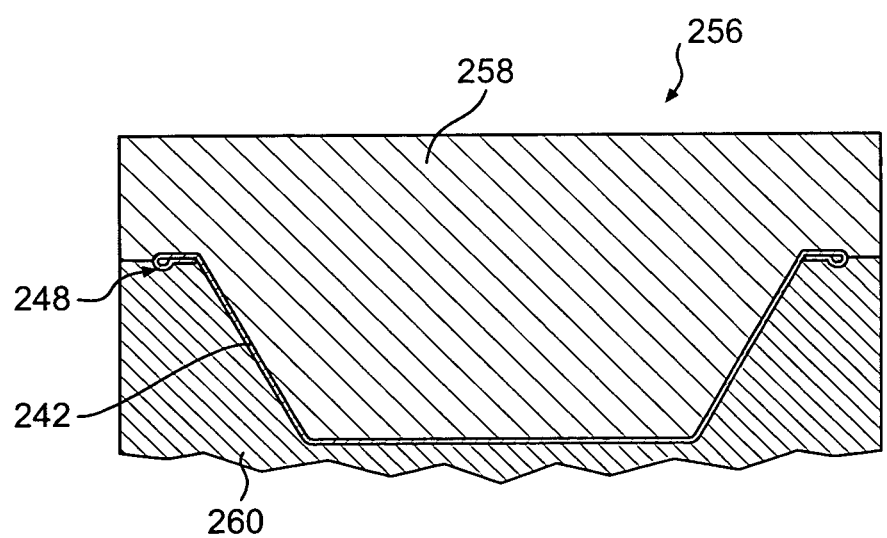
FIG. 27 is a fragmentary vertical section of the die set of FIG. 26 in a closed position.

FIGS. 26 and 27 illustrate a die set 256 for forming the container of FIG. 24. The die set 256 includes a forming punch 258 and a forming die 260. The forming punch 258 has a frustoconical protrusion 262 defining a flat circular bottom wall 264, a frustoconical sidewall 266, and a shoulder 268. The shoulder 268 has an annular recess 270 of generally rectangular cross-section extending along a radially inner edge of the shoulder 268. The forming die 260 has a generally frustoconical recess 272 substantially conforming in size and configuration with the frustoconical protrusion 262 of the forming punch 258, and has a circular flat shoulder 274 around the recess 272. The shoulder 274 in the forming die 260 has a ring-like recess 276 formed therein having a radially inward flat portion 278 and a radially outward portion 280 of generally semi-circular cross-sectional configuration. The radially outer edge of the semi-circular portion 280 is substantially aligned with the radially outer edge of the recess 268 in the shoulder of the forming punch 258.

The die set 256 is used to finally form a precursor product 282 of substantially of the same configuration as that illustrated in FIG. 20, except that the downturned flap 284 along the edge of the flange of the precursor 282 is slightly longer. The precursor product is shown in FIG. 26. In FIG. 26, the precursor product is illustrated in a space between the forming punch 258 and the forming die 260 and when the forming punch 258 is advanced toward the forming die 260 until they are in registry as shown in FIG. 27. During advancement, the downturned flap 284 around the outer edge of the flange 248 is forced into the recess 276 in the forming die 260 so that it rolls inwardly underneath the radially inner portion 286 of the flange 248. The flap 284 is long enough, however, so that after forming the initial roll, it extends fully radially inwardly beneath the upper or radially inner portion 286 of the flange 248. The radially inner portion 286 of the flange 248 can be received in the recess 270 of the forming punch 258 so that the space between the forming punch 258 and the forming die 260 is as desired for formation of the container 242.

FIGS. 28-39 illustrate a sixth embodiment of a pressed container 288 and a method of making the container 288. Referring to FIGS. 28-31, the container 288 includes a flange 290 extending outwardly from the entirety of the container sidewall 292. A depression or groove 294 is formed in the flange 290, at a distance of approximately three-quarters of the width of the flange's top surface 293 from the joinder of the flange 290 and sidewall 296. The groove 294 runs along the circumference of the flange 290, and is generally U-shaped in cross-section as seen in FIG. 29. In the present embodiment 288, the groove 294 is approximately 0.035 inches deep and 0.05 inches wide. The flange 290 itself is about 0.3175 inches wide along its top surface 293, and is divided by the depression 294 into an inner flange segment 306 and an outer flange segment 308. The placement of the depression 294 on the surface of the flange 290, the depression thickness or width, and/or the overall flange dimensions can vary in accordance with alternative embodiments.

Referring to FIG. 29, the sidewall 292 is divided into an upper sidewall 296 and a lower sidewall 298. The upper sidewall 296 and lower sidewall 298 extend at different angles relative to the container base 300, and meet at a ridge 302. The ridge 302 marks the change in angle from the sharper or steeper angle of the lower sidewall 298 to the less steep angle of the upper sidewall 296. When measured with respect to a plane perpendicular to the base 300, the interior of the lower sidewall 298 forms an angle of approximately 19 degrees, while the upper sidewall 296 forms an angle of approximately 30 to 31 degrees. These angles generally permit a certain amount of lateral motion (i.e., motion in the X or Y planes) to occur when multiple containers 288 are stacked, but may inhibit large amounts of such motion. Further, such angles facilitate stacking containers 288 in such a manner that the flanges 290 of adjacent containers 288 abut one another, rather than the sidewalls 292 of adjacent containers. The 19 degree slope angle may further permit self-alignment of stacked containers 288, permitting the outer diameters of each container 288 to align in a height dimension. Different embodiments may use different angles for the upper 296 and lower 298 sidewalls. For example, containers of differing calipers, flange thicknesses, diameters or depths may employ different angular measurements for the sidewalls 296. In general, the angle between the upper sidewall 296 and the lower sidewall 298 should be at least about 5 degrees to ensure proper stacking. An angle of ten degrees or more may also be used.

The container 288 may be formed from a blank having score lines which result in multiple pleats 289 radially extending from the container's bottom surface 291 along the sidewall 292. These pleats 289 are similar to those discussed in more detail above with respect to FIG. 1. Approximately 40 to 80 score lines are present on each blank, with 60 to 72 score lines preferred in a five-inch outer-diameter container. The exact number of score lines employed in an embodiment varies with the outer diameter, depth, and shape of the container.

With respect to the angled sidewall 292, the ridge 302 defining the change in angles between the lower sidewall 298 and the upper sidewall 296 adds multiple benefits to the container 288. First, the ridge 302 may impart additional structural strength to the container 288. The ridge 302 resists twisting and/or shear stresses applied perpendicular to the bottom surface 300, minimizing deformation that may result therefrom. This may be referred to as the "hoop strength" of the container 288. For example, the increased hoop strength of the container 288 may enhance the angled sidewall's 292 resistance to pressure applied by a series of stacked, nested containers 288. Thus, the ridge 302 may prevent deformation that would otherwise occur in a container 288.

Figure 30:
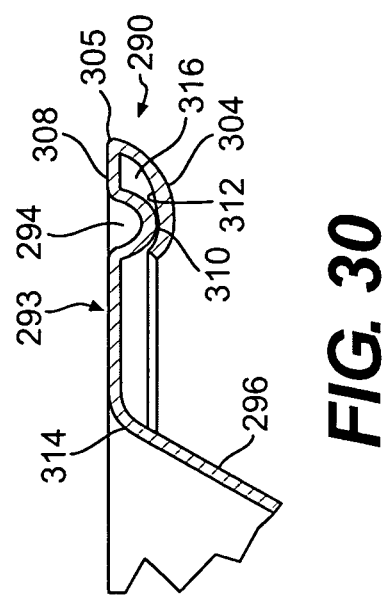
FIG. 30 is an enlarged, cross-sectional view of a flange of the container of FIGS. 28 and 29.

FIG. 30 is an enlarged, fragmentary, cross-sectional view of the flange 290 and the upper sidewall 296. A portion 304 of the flange 290 rolls underneath the flange top surface 293 and at least partially beneath the groove 294. The rolled portion 304 extends from the flange's outer rim or edge 305 under the outer segment 308, and at least partially along the under-surface 310 of the depression 294. The rolled portion 304 may extend along approximately 40% to 75% of the depression's circumference before terminating, although this distance may vary in alternative embodiments. For example, in some embodiments, the rolled portion 304 may extend along the entirety of the depression's 294 circumference. The rolled portion 304 generally increases the thickness of the flange 290, as discussed below with reference to FIG. 31. In the present embodiment, the flange thickness is approximately 0.075 inches, within a tolerance range of plus or minus 0.007 inches. Similarly, the flange's outer diameter is 5.00 inches, within a tolerance range of plus or minus 0.015 inches.

The inner surface 312 of the rolled portion 304 abuts the under-surface 310 of the depression 294. During forming of the container 288, the inner surface 312 and under-surface 310 may be pressure bonded to one another. This may, for example, create a cross-linking of fibers between these paperboard layers of the container 288. The pressure bond generally assists in maintaining the curvature of the rolled portion 304 by maintaining contact between the rolled portion's inner surface 312 and the depression's under-surface 310. This, in turn, prevents the flange 290 from deforming with time or use.

Figure 31:
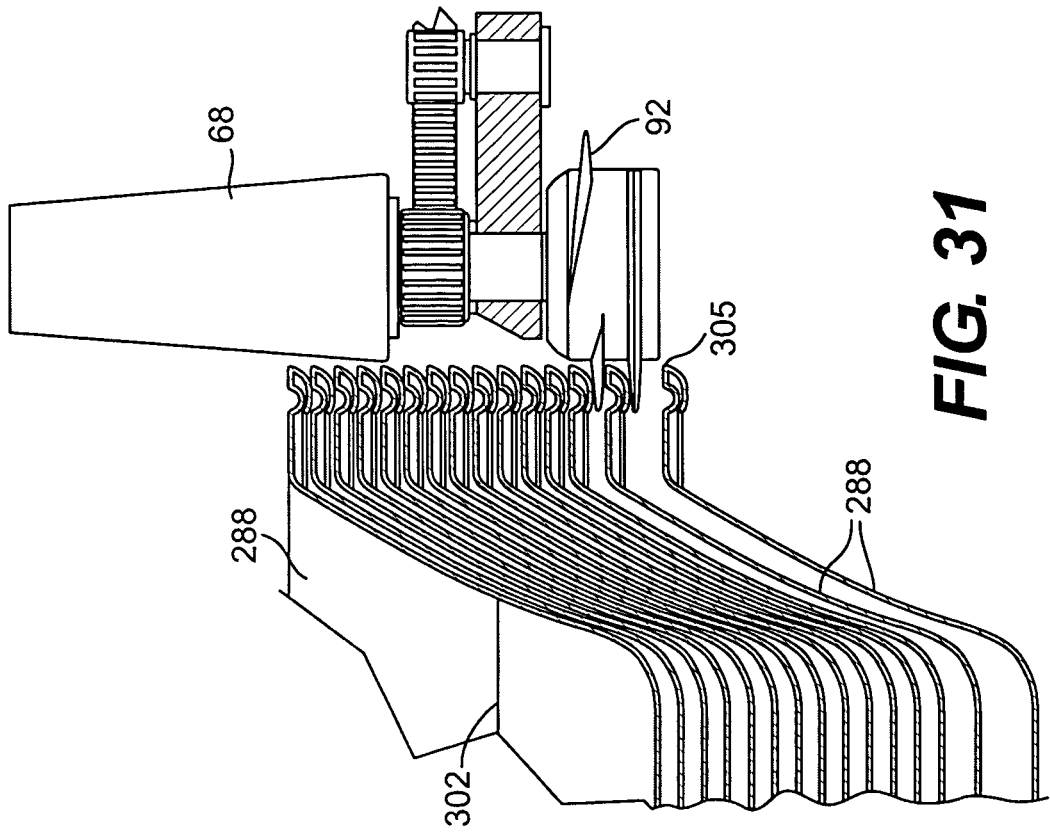
FIG. 31 is a fragmentary vertical section through a denesting apparatus and a stack of nested containers of the type illustrated in FIG. 28.

FIG. 31 illustrates a stack of containers 288 in a denesting apparatus 68. As shown in FIG. 31, the ridges 302 of the stacked containers 288 generally do not abut one another. Specifically, when a first container 288 is nested or stacked within a second container 288, the outer surface of the first container's ridge 302 does not abut the inner surface of the second container's ridge 302. Instead, the nested containers 288 contact one another at the flanges 290. This provides lateral stability for a stack of containers 288, permitting containers to self-align and thus facilitating denesting.

The inner surface 312 of the rolled portion 304 and the underside of the outer segment 308 define a void space 316. When the container 288 is viewed from the exterior, the void space 316 is not visible. The void space 316 generally increases the overall thickness of the flange 290.

As also shown in FIG. 30, the flange 290 and the upper sidewall 296 meet in a circumferential curved edge 314, rather than forming an angled junction. The curved edge 314 generally may have a radius of approximately 0.045 inches, although this dimension may change in alternate embodiments. The curved edge 314 facilitates a gradual change in angle between the flange 290 and the upper sidewall 296, as well as facilitating denesting operations. In some embodiments, the curved edge 314 may be replaced by a more abrupt, angled transition.

The outer edge of the flange 290 generally defines an angled peripheral edge 305 between the outer flange segment 308 and the rolled portion 304. When multiple containers 288 are stacked or nested, the rolled portion 304 of a top container 288 rests upon the top surface 293 of a bottom container's flange 290, as shown in FIG. 31. The base of the top container's rolled portion 304 may rest at least partially within the bottom container's depression 294, as shown in FIG. 31. However, the radius of the rolled portion 304 is generally greater than the radius of the depression 294. Thus, although the bottom container's depression 294 may partially accept the base of the top container's rolled portion 304, the rolled portion 304 nonetheless extends upwardly to space the top container's angled edge 305 from the bottom container's angled edge 305, and increases the overall thickness of the flange 290. The spacing permits the knife edge 92 of the denesting apparatus 68 to move between adjacent containers 288 in order to denest the stacked containers 288.

FIGS. 32-39 illustrate various stages during the process of manufacturing the nestable container 288. As with previously-described embodiments, the present container 288 is manufactured in a two-stage process. The first stage is forming, from a circular paperboard blank, an intermediate container 318 having a downturned flange 320 made up of a downturned portion 322 adjacent to the container sidewall 324 and a perpendicular portion 326 depending from the downturned portion 322. The intermediate container 318 is shown to best effect in FIG. 35, while the process for manufacturing the intermediate container is generally shown in FIGS. 32-35. The circular blank from which the intermediate container 318 is formed generally may have a diameter of approximately 6.450 to 6.560 inches, and a thickness of 0.01 to 0.045 inches, or more specifically a thickness of 0.013 to 0.024 inches. The paperboard may also include a film or laminate of 0.0005 inches thickness.

Turning now to FIG. 32, a die set 330 for forming the intermediate container 318 is shown in cross-section. Unlike the previously-discussed die sets 48, 118, 154, 202 and 256, in this embodiment a forming punch 332 is located beneath a forming die 334. Essentially, the orientations of the punch 332 and the die 334 are reversed when compared to die sets discussed previously.

The forming punch 332 is seated in the forming die 334, with the paperboard blank pressed into the intermediate container shape 318. The punch 332 has a frustoconical protrusion 336 defining a flat, circular top wall 338, a generally frustoconical sidewall 340, an angled shoulder 342, and an upwardly-extending edge wall 344. The frustoconical sidewall 340 is further divided into a first angled sidewall portion 346 and second angled sidewall portion 348, which meet at a circumferential ridge point 351. The first and second angled sidewalls 346, 348 extend at different angles from a plane parallel to the top wall 338. Specifically, in the present embodiment the first angled sidewall portion 346 forms approximately a 19 degree angle with the top wall 338, while the second angled sidewall portion 348 extends at approximately 30 to 31 degrees from a plane perpendicular to the top wall of the punch 332. Other orientations of the die sets are within the scope of the invention.

The angled shoulder 342 of the punch 332 angles slightly towards the top wall 338, and abuts the second angled sidewall 348. The edge wall 344 extends upwardly and defines an outer shoulder 342. As described in more detail below, the angled shoulder 342 and the edge wall 344 combine with a mating surface on the die 334 to form the downturned portion 322 and a perpendicular portion 326 of the intermediate container 318.

The die 334 includes a flat, circular top wall 350, a generally frustoconical, downwardly-extending sidewall 352 composed of a first die sidewall 354 and second die sidewall 356, an upwardly angled die shoulder 358, and upwardly-extending die edge wall 360. As discussed with respect to the punch 332, the first and second die sidewalls 354, 356 extend at different angles and meet at a die ridge 361 extending along the circumference of the die 334. The first die sidewall 354 extends from the top wall 350 at approximately a 19 degree angle, while the second die sidewall 356 extends from the ridge at approximately a 30.8 degree angle, measured with respect to a plane perpendicular to the top wall 350.

Figure 33:
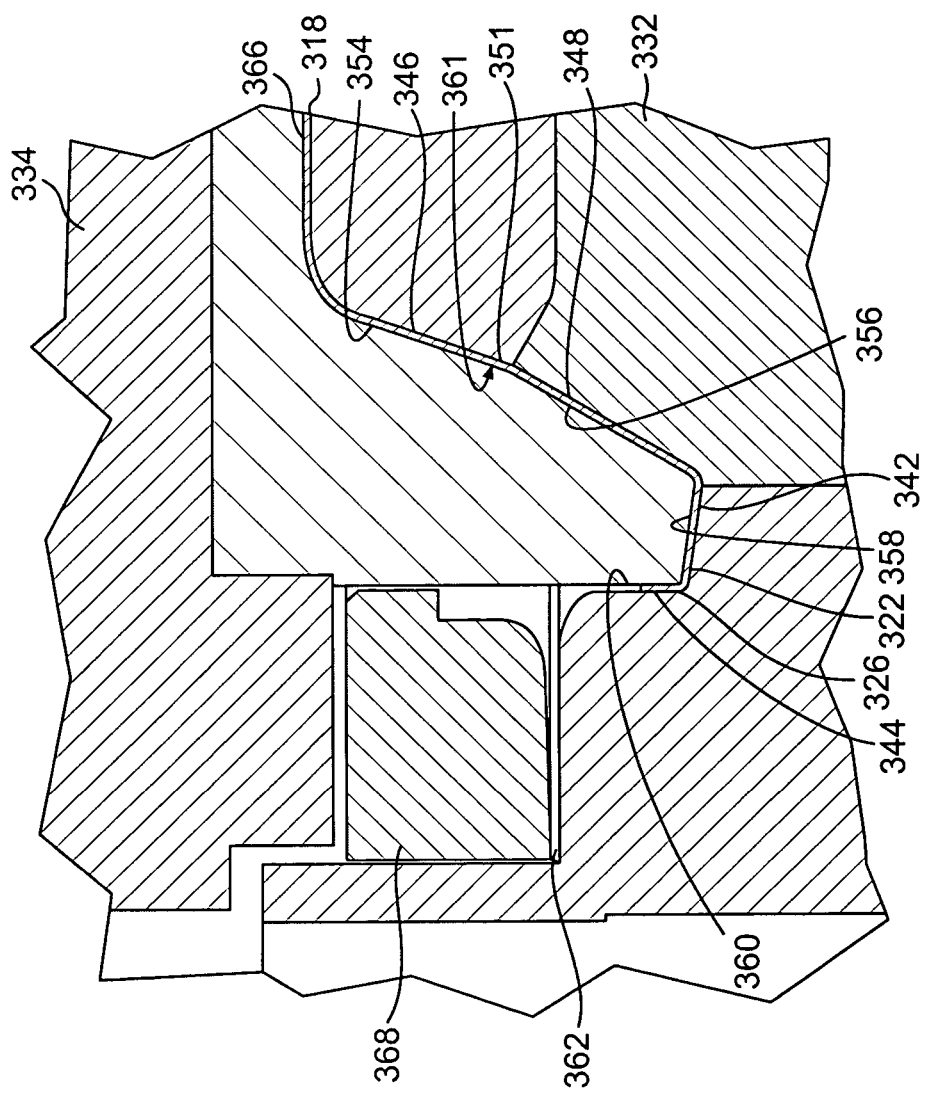
FIG. 33 is an enlarged, cross-sectional view of a portion of the die set of FIG. 32, specifically showing the portions of the die set used to form a flange of the intermediate tray form.

The exemplary process of manufacturing the intermediate container 318 will now be described with respect to FIGS. 32-35. FIG. 33 depicts with particularity certain elements of the die 334 and the punch 332. First, a circular blank (not shown) is inserted between the punch 332 and die 334, while the die set 330 is open. The blank generally seats in the flat, circular ridge 362 atop the punch 332. Once the blank is seated, the die 334 is lowered onto the punch 332, bending, compressing, and deforming the paperboard blank to form the intermediate container 318 shown in FIG. 32. As the die set 330 closes, the complementary surfaces of the die 334 and the punch 332 generally draw the paperboard blank out of the ridge 362 and deform it into the intermediate container shape. This process also forms the pleats 289 as the flat paperboard blank is at least partially folded upon itself and pressed flat to achieve the three-dimensional shape of the intermediate container 318. Each such fold and pressing form a pleat 289. Further, the closing of the die set 330 aligns the first die sidewall 354 with the first angled sidewall 346 of the punch 332, and the second die sidewall 356 with the second angled sidewall 348. Accordingly, the intermediate container sidewall 324 is compressed to form the ridge 325, lower sidewall 327, and upper sidewall 329 at the angles previously mentioned.

The general operating conditions of the first die set 330 will now be described. Between 6,000 and 25,000 pounds of force may be applied by the first die set 330, with a more specific range of 6,000 to 15,000 pounds of force. The operating temperatures of both the punch 332 and die 334 are between 200 and 350 degrees Fahrenheit, with a more specific range of 240 to 350 degrees Fahrenheit. The punch 332 remains closed in the die 334 for 0.1 second to 5.0 seconds, with a preferred closure dwell time of 0.03 to 1.0 seconds. The moisture level of the paperboard blank prior to entering the die 334 can be in the range of about 8-11%, with a more specific range of about 9-9.5%.

FIG. 33 is an enlarged, fragmentary, cross-sectional view of the portions of the punch 332 and die 334 forming the downturned portion 322 and perpendicular portion 326 of the intermediate container 318. As shown in FIG. 33, the combination of upwardly angled die shoulder 358 and the angled shoulder 342 cooperate to form the downturned portion 322 of the intermediate container's flange 320. Similarly, as the die set 330 closes, a portion of the blank is drawn into the void space between the punch's edge wall 344 and the die edge wall 360 to form the perpendicular portion 326 of the intermediate container 318. Both the downturned portion 322 and the perpendicular portion 326 of the flange run along the entire circumference of the intermediate container 318.

Figure 34:
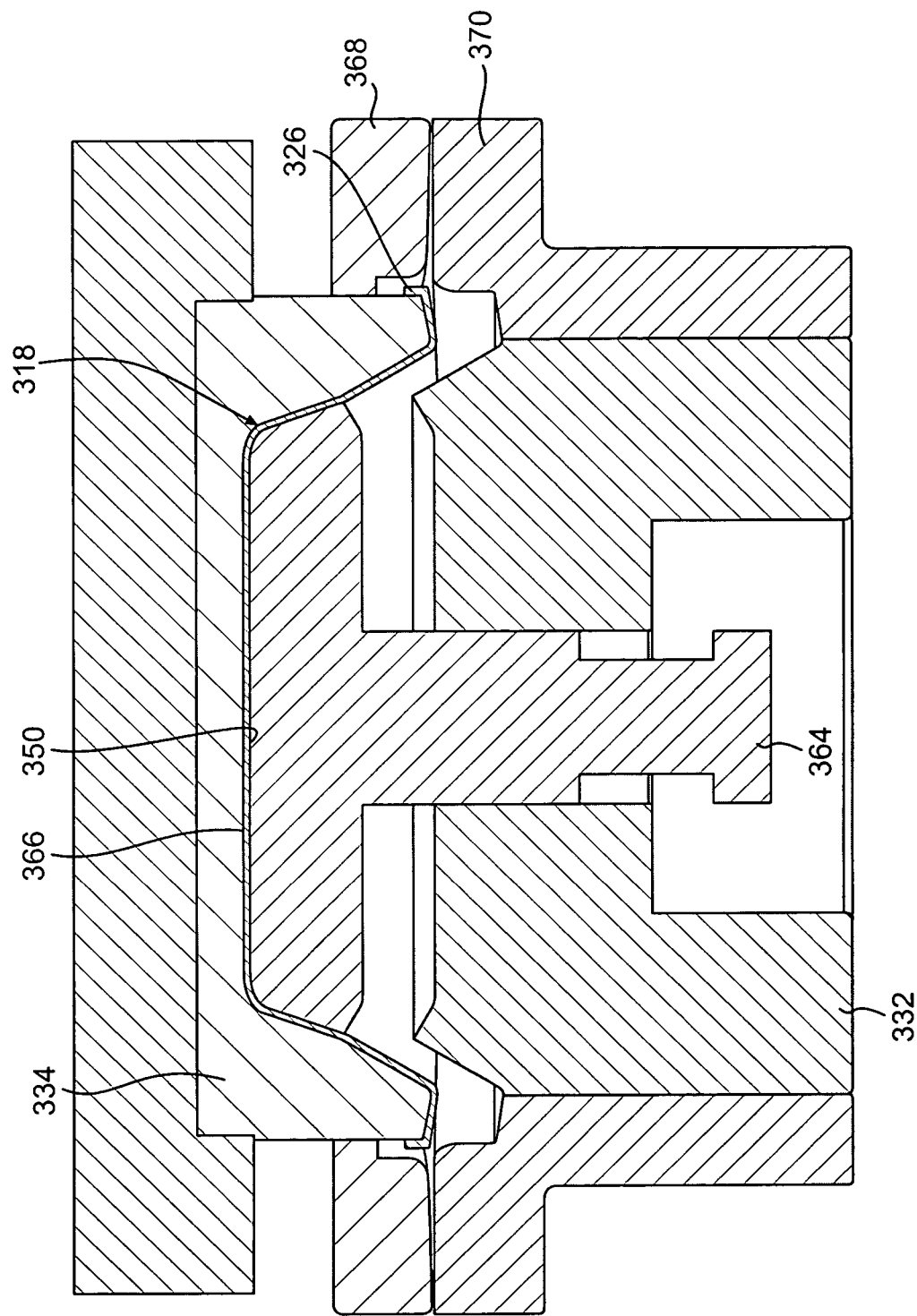
FIG. 34 is a cross-sectional view of the die set of FIG. 32, with the die retracted and a plunger extended.

Referring to FIG. 34, after the punch 332 and the die 334 cooperate to form the blank into the intermediate container 318, the die 334 retracts. Simultaneously, a plunger 364 rises from the punch, holding the base 366 of the intermediate container 318 against the top wall 350 of the die 334. An outer die ring 368 does not retract, but instead remains at least partially in contact with the punch 332. As the die 334 and the plunger 364 move, the perpendicular portion 326 of the intermediate container 318 moves. If the perpendicular portion's edge contacts the shoulder of the ring 368, the downward force exerted against the intermediate container 318 may facilitate removing the container from the die 334. An outer punch ring 370 moves up and down, and stays in contact with the die ring 368 until it reaches the height of the punch surface.

Figure 35:
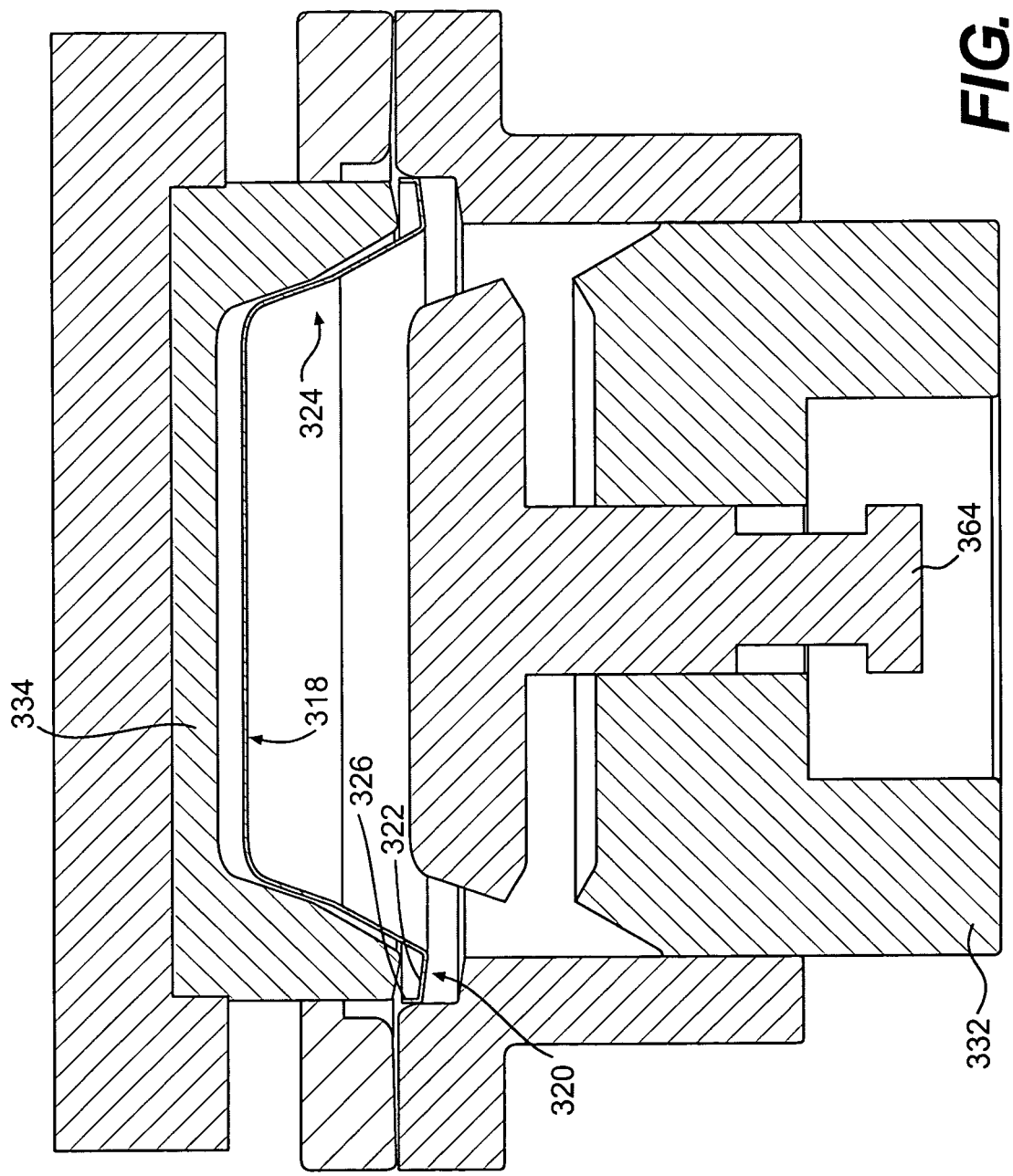
FIG. 35 is another cross-sectional view of the die set of FIG. 32 with the die, plunger, and punch retracted.

Referring to FIG. 35, once the die 334 and the plunger 364 have moved to bottom out and compress the paperboard blank, the plunger 364 and punch 332 retract and the intermediate container 318 moves downward, ejecting itself from the die 334. At least two factors facilitate the ejection of the intermediate container 318 from the die 334. First, the paperboard of the intermediate container 318 is at least somewhat naturally resilient. This characteristic tends to force the sidewall 324 against the sidewall of the die 334, which in turn levers the intermediate container 318 out of the die 334. Second, placing the die 334 above the punch 332 ensures gravity acts to pull the intermediate container 318 out of the die 334. Airjets or ejector pins may optionally be employed to force the intermediate container 318 out of the die 334, as described above with respect to a previous embodiment. These ejection assists may also be used to eject containers from punches in other embodiments.

Figure 36:
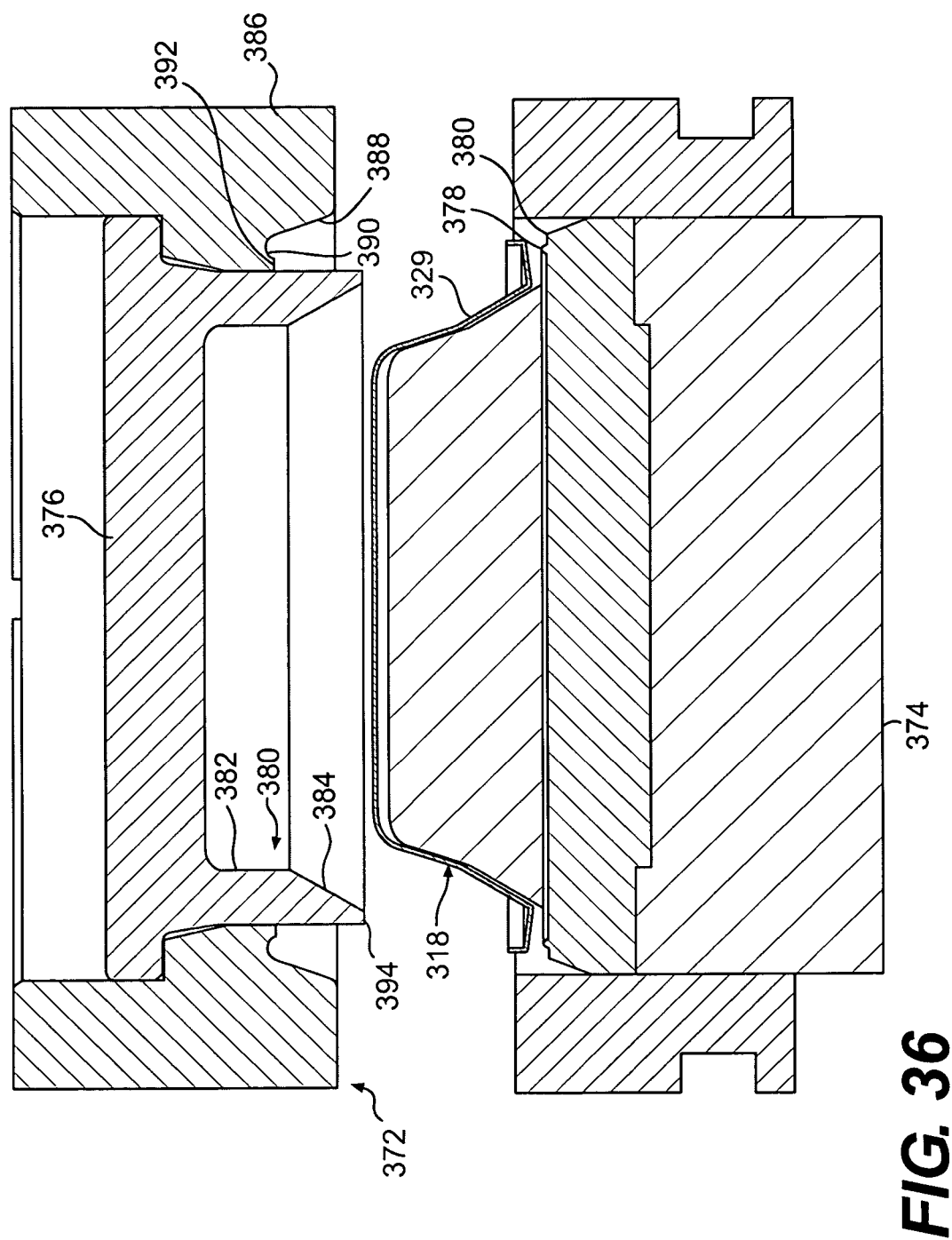
FIG. 36 is a cross-sectional view of a second die set used to form a final pressed container, similar to that shown in FIG. 28, from an intermediate tray form.

FIGS. 36-39 illustrate formation of the final container 288 from the intermediate form 318. Referring to FIG. 36, once the intermediate container 318 has been created from a blank, the intermediate container 318 may be placed within, or otherwise transferred to, a second die set 372 to form the final container 288. The second die set 372 also has a die 376 and a punch 374 located beneath the die 376. Generally, the physical characteristics of the punch 374 and die 376 of the second die set 372 match those of the punch 332 and die 334 of the first die set 330, albeit with some exceptions as described below. Initially, the intermediate container 318 is placed upon the punch 374. The intermediate container 318 may be slightly off-center as the second forming process begins without affecting the process. The punch 374 also includes a male protrusion 378 running circumferentially along a flat, outer plate 380 of the punch.

Figure 37A:
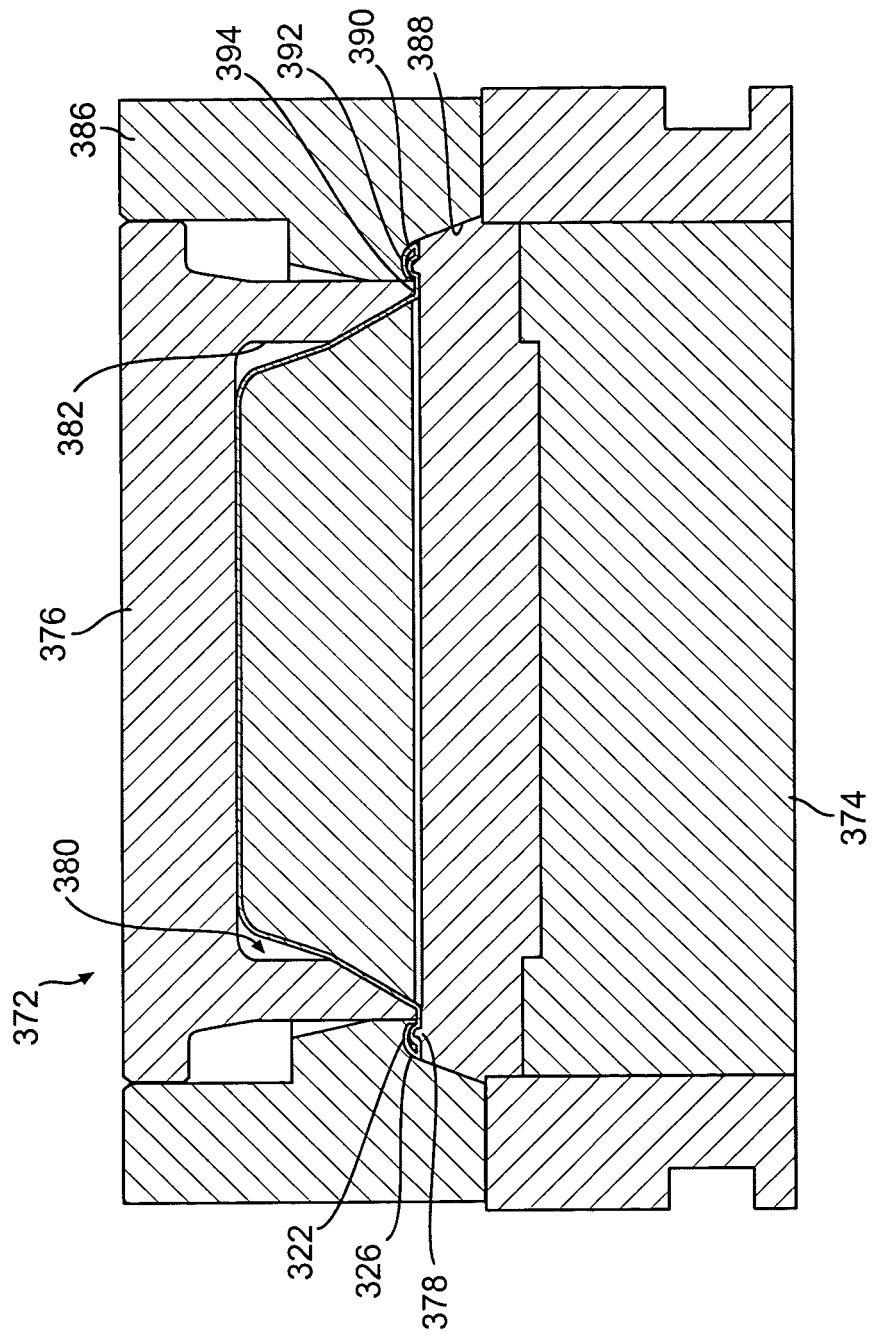
FIG. 37A is a cross-sectional view of the second die set of FIG. 36 in a closed position.

The die 376 is lowered onto the punch 374, with the intermediate container 318 resting on the punch 374. As the punch 374 enters the die 376, the container sidewall 324 contacts the die sidewall 380. As can be seen in FIGS. 36 and 37A, the die sidewall 380 is formed of a vertical sidewall segment 382 and an angled sidewall segment 384. The angled sidewall segment 384 extends at an angle of approximately 30 to 31 degrees, matching the angle of the upper sidewall 329 formed in the first die set 330.

Referring to FIG. 37A, even when the second die set 372 is fully closed, the intermediate container 318 lower sidewall 327 does not contact the vertical sidewall segment 382 of the die 376. This permits the intermediate container 318 to enter the die 376 without impacting, or potentially being crushed or deformed by, the die sidewall 380. In the event the intermediate container 318 is off-center on the punch 374, the intermediate container 318 is centered as its upper sidewall 329 comes into contact with the angled sidewall segment 384 during closure of the die set 372. When desirable to operate the second die set 372 and first die set 330 simultaneously, forces applied to the first die set 330 will be available to the second die set 372 for deformation and/or shaping of the intermediate container 318. The operating temperature of the second die set 372 may be in the range of about 200 to 350 degrees Fahrenheit, with the punch 374 having an operating temperature of about 200-355 degrees and the die 376 having an operating temperature of 240 to 325 degrees.

When the first die set 330 and second die set 372 are interlinked and simultaneously operate, an additional force may be applied to the second die set 372 during closure in order to equalize the closing force of the first die set 330. The equalizing force may ensure the die sets 330, 372 close substantially simultaneously, and prevent either die set from cocking or closing unevenly. Thus, the equalizing force may further prevent uneven pressing of a paperboard blank or container in either die set.

Once the die 376 completely receives the punch 374, stabilizing, centering, and immobilizing the intermediate container 318 therebetween, a circular flange formation element 386 is lowered. FIG. 36 shows the flange formation element 386 retracted from the die 376, so that the bottom surface of the flange formation element 386 is higher than the lower surface of the die 376. FIG. 37A shows the flange formation element 386 lowered around the die, so that the bottom surface of the flange formation element 386 is lower than the bottom surface of the die 376. The flange formation element 386 is generally continuous and encircles the entirety of the die 376.

Referring to FIG. 37A, the flange formation element 386 includes a formation sidewall 388, sloping inwardly to a formation cavity 390. The formation cavity 390 is bounded on its inner edge (the edge closest to the die 376) by a formation shoulder 392. As the flange formation element 386 descends around the die 376, the distal edge of the container perpendicular portion 326 impacts the formation sidewall 388. Upon initial impact, and after the intermediate container 318 centers on the punch 374, the downturned portion 322 of the intermediate container 318 is held against the outer plate 380 by a lip 394 of the die 376. This prevents the downturned portion 322 from moving when the distal edge of the perpendicular portion 326 impacts the formation sidewall 388.

Figure 37B:
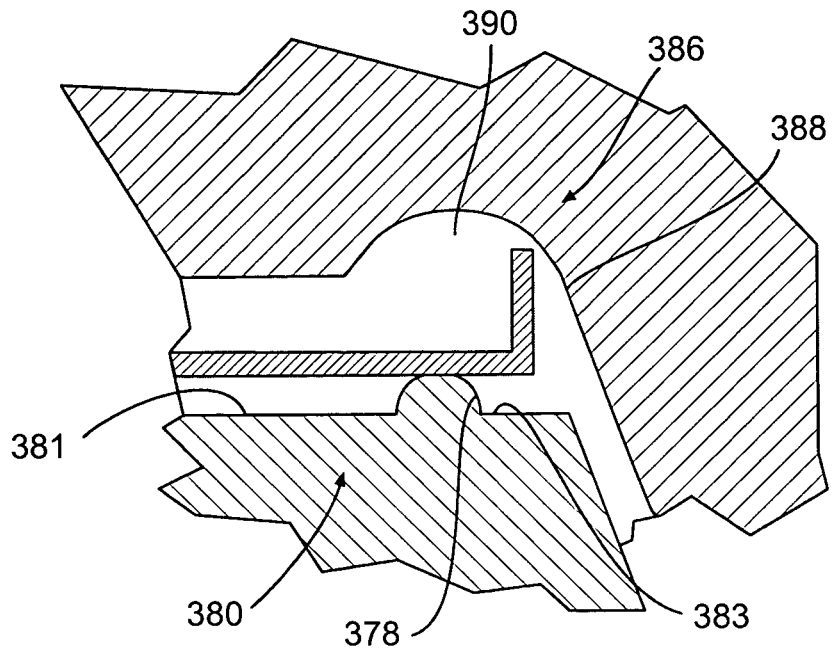
FIG. 37B is an enlarged view of a flange formation element and protrusion shown in FIG. 37A, with the second die set in a partially-open position.

FIG. 37B is an enlarged view of the protrusion 378 and the flange formation element 386 in a partially-open state. The formation cavity 390 (measured from the end to the point at which the formation cavity impacts the outer plate 380) is larger than the protrusion 378. The formation sidewall 388 has a 20 degree slope. The outer ring 380 may be divided into an inner ring portion 381 and outer ring portion 383, each on a different side of the protrusion 378. The protrusion 378 is 0.05 inches wide. The formation cavity 390 has a radial width of 0.145 inches. The protrusion 378 is approximately 0.035 inches high, while the formation cavity 390 is approximately 0.0507 inches deep. These dimensions may vary, for example, in alternate embodiments. The elements 381 and 383 lie in a flat, horizontal plane. However, they may be deformed at a slight angle to create the finished flange.

Returning to FIG. 37A, the formation sidewall 388 is sloped inwardly, towards the die 376, at an approximate 20 degree angle. The flange formation element's downward motion rolls the distal edge of the perpendicular portion 326 inward, towards the die 376 and punch 374 and into the formation cavity 390. Since the paperboard is at least somewhat flexible, it rolls rather than crumples. This flexibility is aided by enhancing the paperboard moisture, raising it to between about 2% to 13%, or more specifically between about 8% and 10% by weight. The rolling of the perpendicular portion 326 forms the rolled portion 304 of the finished flange 290. The formation shoulder 392 bounds the formation cavity 390, and ensures the perpendicular portion 326 does not extend too far towards the die 376 as the formation element 386 closes.

In addition to rolling the perpendicular portion 326, the flange formation element 386 generally presses the downturned portion 322 of the intermediate container 318 against the outer plate 380 of the punch 374. As the formation element 386 lowers and the perpendicular portion 326 is forced under the downturned portion 322 (see FIG. 37A), a force is also vectored parallel to the outer plate's surface. Thus, two force vectors act upon the downturned portion: a first force vector presses the downturned portion 322 against the outer plate 380 and perpendicular to the circumferential protrusion 378, while a second force vector presses the downturned portion 322 laterally to the outer plate 380 and against an outer edge of the protrusion 378.

The combination of forces causes the downturned portion 322 to "wrap" around the protrusion 378, conforming thereto. Thus, even though the formation cavity 390 is substantially larger than the protrusion 378 and lacks a completely complementary female surface, the downturned portion 322 nonetheless is pressed fully about the protrusion 378. This is due to two paperboard/film thicknesses equal to 0.036 inches being compressed into a closed gap of 0.030-0.033 inches. Alternate embodiments may have different measurements for the gap or paperboard/film material. The formation shoulder 392, in combination with the now-rolled perpendicular portion 326, forces the inner section of the container's downturned portion 322 against the inner edge of the protrusion 378. When the formation element 386 is completely lowered about the die 376, the now-rolled perpendicular portion 326 occupies substantially all available area between the inner edge of the protrusion 378 and the formation shoulder 392. This prevents the downturned portion 322 of the intermediate container 318 from buckling upwardly and into the formation cavity 390. The resulting forces create the aforementioned "wrapping" effect, conforming the downturned portion to the profile of the protrusion 378. This forms the depression/groove 294 described above with reference to FIGS. 28-30.

The relatively small space in the formation cavity 390, coupled with the pressure applied to the section of the downturned portion 322 wrapped around the male protrusion 378 to form the top, flat portion of the finished flange (i.e., outer wall of the depression 304 of the finished container 288), deforms the perpendicular portion 326. This deformation resists decoupling or expansion of the flange 290 in the final, formed container 288 and additionally may impart structural strength to the container 288. Additionally, the pressure substantially straightens the downturned portion 322, so that the finished flange 372 is essentially parallel to the bottom surface of the container 288, and sufficiently deforms the paperboard to minimize springback or unrolling of the finished flange 372.

Figure 37C:
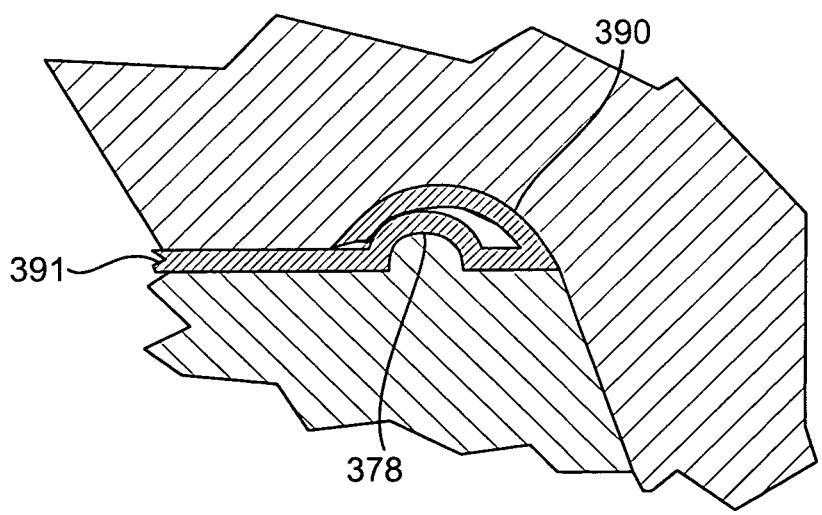
FIG. 37C is an enlarged view of the flange formation element and protrusion of FIG. 37B with the second die set in a closed position.

The perpendicular portion 326 of the container 288 may also be bonded to the downturned portion 322 by the aforementioned combination of pressure and small space in some embodiments. FIG. 37C is an enlarged view of the protrusion 378 and formation cavity 390, with the die set 372 closed. The paperboard 391 shown in the formation cavity 390 may be approximately 0.017 inches thick, while the film laminated thereto may be approximately 0.005 inches thick. As shown in FIG. 37G. the paperboard 390 does not roll under the entirety of the paperboard wrapped around the protrusion 378, but instead typically terminates at a point approximately three-quarters along the protrusion 378.

Figure 37D:
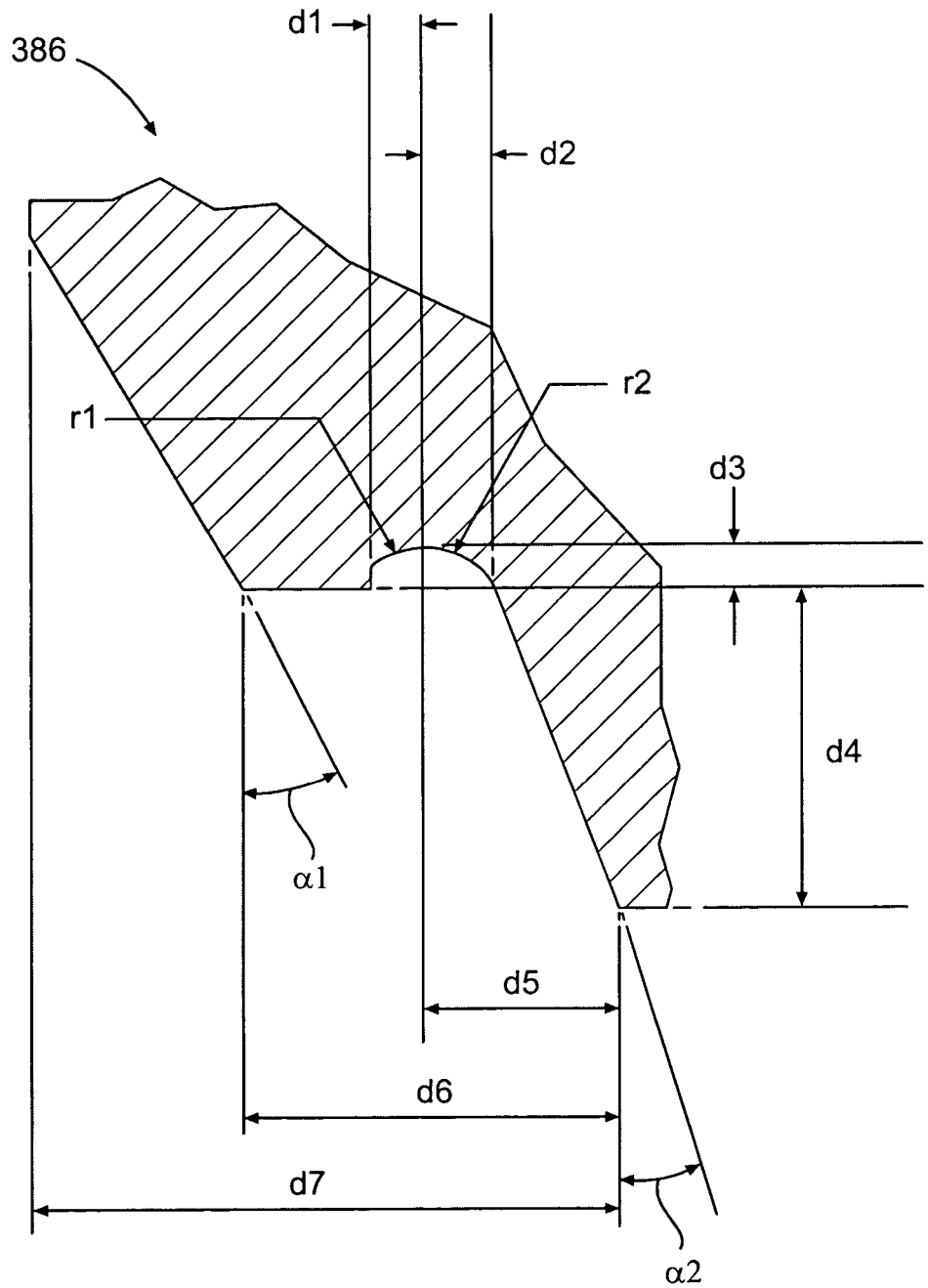
FIG. 37D is an enlarged view of the flange formation element shown in FIGS. 37B and 37C.

FIG. 37D is a detailed view of the flange formation element 386, including several exemplary measurements. Alternate embodiments may employ different dimensions without departing from the spirit or scope of the present invention. In FIG. 37D, d1=0.0592 in., d2=0.0858 in., d3=0.0507 in., d4=0.4064 in., d5=0.2334 in., d6=0.4527 in., d7=0.7207 in., r1=0.0622 in., r2=0.0975 in., α1=30 degrees, and α2=29 degrees.

Figure 38:
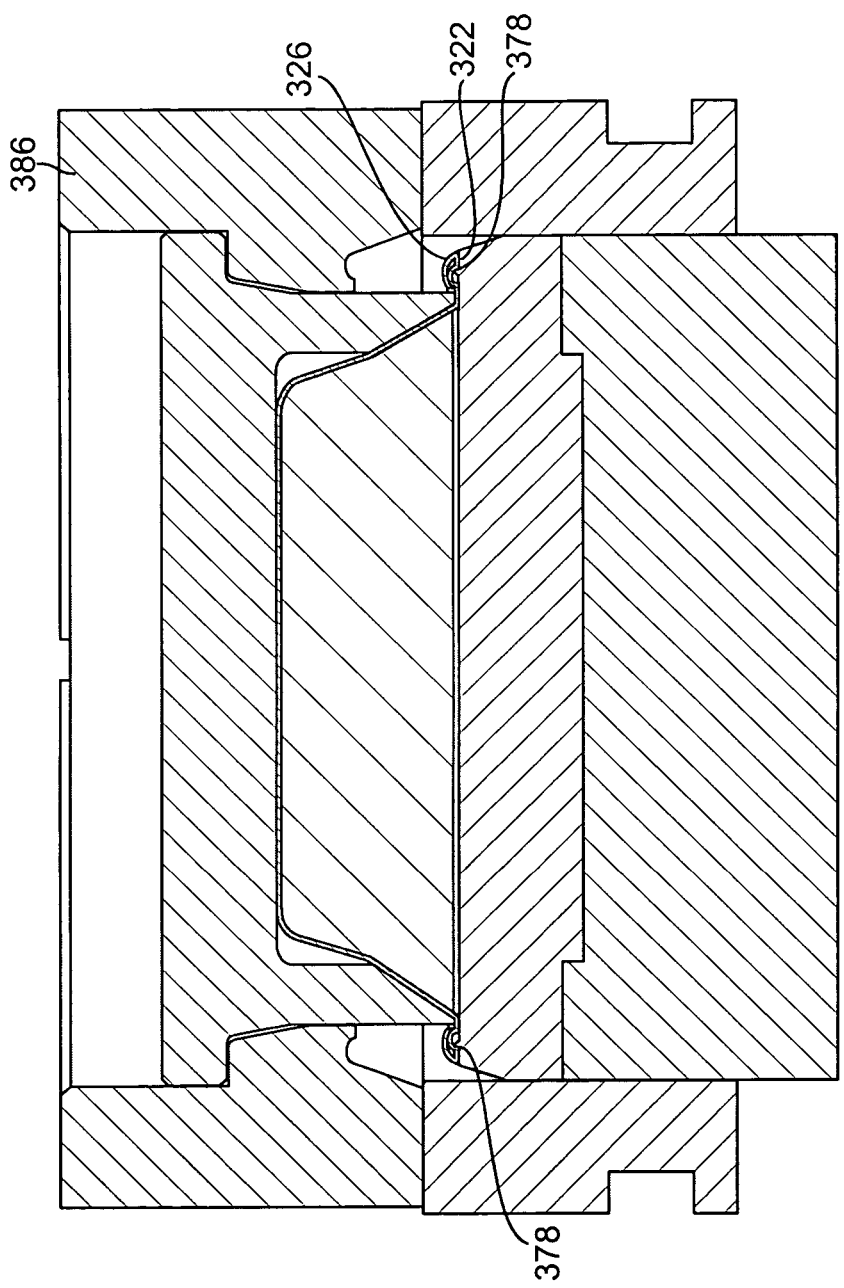
FIG. 38 is a cross-sectional view of the second die set of FIG. 36 with a flange formation element retracted.

Referring to FIG. 38, after the perpendicular portion 326 is rolled into the formation cavity 390 and the downturned portion 322 is molded around the protrusion 378, the flange formation element 386 is withdrawn.

Next, as shown in cross-section in FIG. 39, the die 376 is withdrawn. The final, formed container 288 may be withdrawn from the second die set 372. An air-assist or ejector pin may be used to facilitate removal of the container 288.

The aforementioned manufacturing process for forming a container 288 having a rolled flange 290 with a depression 294 formed therein has been described as a two-stage process. The first and second die sets 330, 372 may be part of a single apparatus, or may be separate from one another. Further, the first and second die sets may be interlinked such that both die sets 330, 372 close and open on the same motion. If the die sets 330, 372 are mounted on an inclined surface, gravity (optionally with an air-assist or ejector pin) may be used to transfer containers 288 between the first and second die sets 330, 372. Optionally, a chute, conveyor belt, or other mechanism may convey the intermediate container 318 from the first die set 330 to the second die set 372 for further forming. The conveyor belt may be, for example, a vacuum belt. Additionally, in some embodiments, the second die set 372 may be omitted and the depression 294 formed in the first die set 330.

The forming methods discussed in detail above with reference to FIGS. 26-39 allow containers 288 to be produced having a substantially uniform outer diameter across the entire circumference of the container 288. Similarly, the thickness of the flange 290, as established by the radius of the rolled portion 304, is also substantially uniform. The flange top surface 293 and rolled portion 304 thickness may also be substantially uniform. Further, these elements are of substantially the same dimensions from one container 288 to another. For example, the thickness and outer diameter of the flange 290 may vary by no more than 5/1000ths to 8/1000ths of an inch between containers. The extent to which the rolled portion 304 underlies the depression 294, however, may vary along the flange 290 and container 288 circumference.

Because each container 288 has a flange 290 of relatively uniform outer diameter and thickness, the containers 288 may be reliably lidded with snap-fit lids of appropriate size. The use of snap-fit lids is facilitated by uniform containers 288 because snap-fit lids generally require strict tolerances in order to achieve a proper fit. By contrast, containers of conventional construction may have flange outer diameters or thicknesses that vary too greatly from one container to another, rendering snap-fit lids inappropriate. In alternative embodiments, a metal lid may be mechanically rolled onto or otherwise attached to the container 288.

Similarly, a film may be heat-sealed to the flange 290 to create a lid. Because the flange 290 is uniform in its outer diameter and thickness (i.e., is "dimensionally stable"), a film may be created in a standard size for heat-sealing to the flange 290. Further, the dimensional stability of the flange 290 minimizes any gapping or discontinuity between the film and flange top surface 293, in turn minimizing airflow paths between the interior of a sealed container 288 and the atmosphere.

Figure 40:
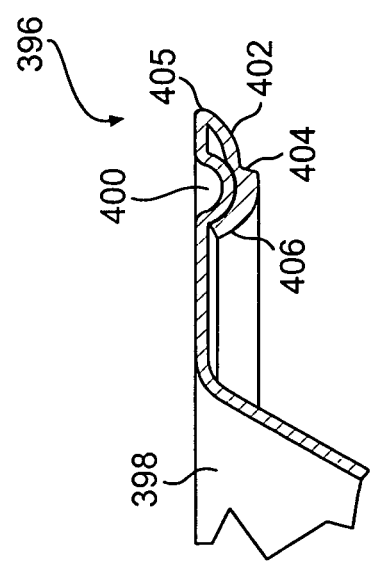
FIG. 40 is an enlarged, fragmentary, cross-sectional view of a flange according to a seventh embodiment.

The general shape of the flange 290 may be varied by modifying the cross-sectional profile of the formation cavity 390, the formation sidewall 388, and/or the formation shoulder 392. For example, FIG. 40 is an enlarged, fragmentary cross-sectional view of a seventh embodiment of a flange 396 incorporated into a nestable container 398, similar to the container 288 section shown in FIG. 30. The flange 396 includes a depression 400 formed therein and a rolled portion 402, as discussed previously with respect to FIGS. 28-30. In the container 398, however, the rolled portion 402 forms an offset 404 perpendicular with respect to a top surface 401 of the flange 396. The thickness of the rolled portion 402 increases at the offset 404, and the offset 404 thereby provides additional space between nested containers 398, and thus may enhance denestability in some applications. The rolled portion 402 may extend underneath the depression 400 to form an extending under-segment 406, after forming the offset 404. A peripheral edge 405 of the flange 396 may be curved to facilitate denesting.

The thickness of the offset 404 and the under-segment 406 exceeds that of the outer section of the rolled portion 402. Effectively, the outer section of the rolled portion 402 is compressed in a die set to narrow its thickness, while the offset 404 and under-segment 406 are not so strongly compressed.

Yet another embodiment (not shown) may form a flange having a depression running continuously along the flange top surface, as described with respect to FIGS. 28-30, but lacking a rolled portion extending downwardly and underneath the depression.

Still other flange embodiments may be formed. For example, the depression previously mentioned may be replaced with a raised surface, a dimple, or a ring on the flange. That is, the raised surface may extend upwardly from the top of the flange, rather than downwardly from the bottom. Such raised surfaces may be used in combination with, or in place of, any flange mentioned herein. As another example, a flange may have one or more circular depressions, dimples, or grooves, along with a raised surface. The depressions and raised surfaces may alternate either radially or circumferentially along the flange. Yet other embodiments may omit such depressions, grooves, and/or raised surfaces entirely.

Figure 41:
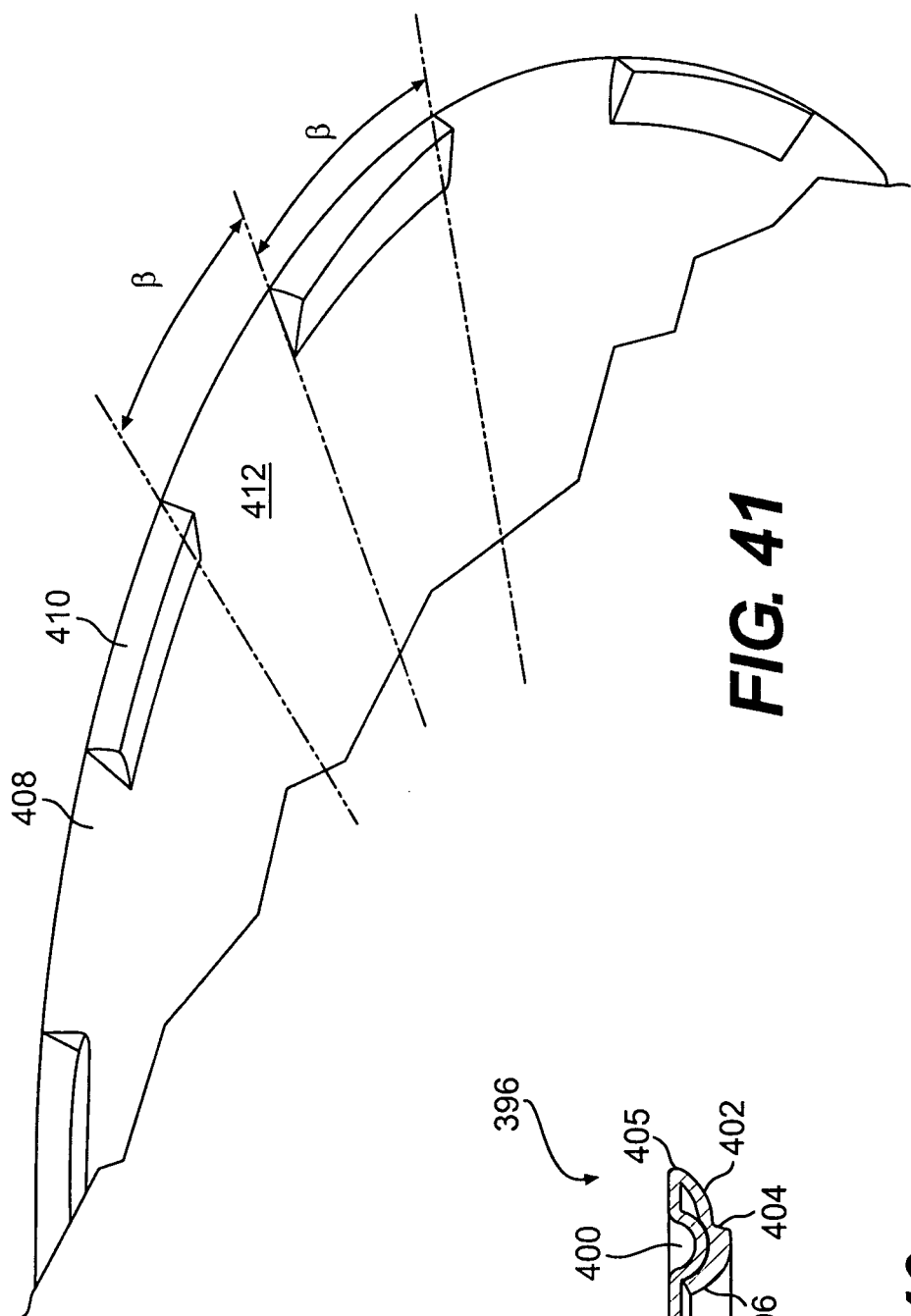
FIG. 41 is an isometric view, looking upwardly, of a flange according to an eighth embodiment.

FIG. 41 is an isometric view, looking upwardly, of an eighth flange embodiment forming part of a container. Here, a flange 408 includes a series of depending square edges 410. The square edges 410 occur approximately at intermittent angles β around the circumference of the flange. The angle β may be, in one embodiment, a fifteen degree arc. The arc between square edges 410, and the arc occupied by each square edge 410, may vary. In the present embodiment, the square edges 410 may have a radial width of approximately 0.035 inches, and a thickness of approximately 0.035 inches. These square edges 410 formed on the flange 408 permit denesting in the manner previously described, as well as providing an increase in flange strength and facilitating the use of various lids. It should be noted the portions of the flange 408 in the intermediate arc segments 412 between square edges 410 may be rolled, deformed, or compressed to maintain a constant outer diameter for the associated container.

FIGS. 42-49 illustrate a ninth embodiment of a pressed container 500 and a method of making the container 500. The container 500 has the shape of a plate and includes a flange 510 extending outwardly from the entirety of the container sidewall 512. A depression or groove 514 can be formed in the flange 510 spaced from the flange's top surface 513 from the joinder of the flange 510 and sidewall 512. The groove 514 runs along the circumference of the flange 510, and is generally U-shaped in cross-section, as seen in FIG. 43. The groove 514 can be any depth or configuration as desired, including those specified in the above embodiments. The top surface 513 can include a flat section 515 between an upper sidewall 516 and the groove 514. The flange 510 can also include any turn down, rolling, or folding as desired, including those detailed in the embodiments shown above. The flange 510 is shown in FIGS. 42-49 with the optional flat section 515, groove 514, and angled upper sidewall 516. The flange 510 is shown in FIG. 42 divided into an inner flange segment 506 and outer flange segment 508 by the depression 514. Alternate embodiments can vary the placement of the depression 514 on the surface of the flange 510, the depression thickness or width, and/or the overall flange dimensions.

As also shown in FIG. 42, the sidewall 512 is divided into an upper sidewall 516 and a lower sidewall 518. The upper sidewall 516 and lower sidewall 518 extend at different angles relative to the container base 520, and meet at a ridge 502. The ridge 502 marks the change in angle from the sharper or steeper angle of the lower sidewall 518 to the gentler angle of the upper sidewall 516. When measured with respect to a plane perpendicular to the base 520, the interior of the lower sidewall 518 preferably forms an angle of approximately 19 degrees, while the upper sidewall preferably forms an angle of approximately 30 degrees. These angles generally permit a certain amount of lateral motion (i.e., motion in the X or Y planes) to occur when multiple containers are stacked, but can inhibit large amounts of such motion. Further, such angles facilitate stacking containers 500 in such a manner that the flanges 510 of adjacent containers 500 abut one another, rather than the sidewalls 512 of adjacent containers 500. The 19-degree angle of the lower sidewall 518 can enable self-alignment of stacked containers, permitting the outer diameters of each container 500 to align in a height dimension. Different embodiments may use different angles for the upper 516 and lower sidewalls 518. For example, containers of differing flange thickness, diameters, or depths may employ different angular measurements for the sidewalls.

The container 500 typically also has multiple pleats 519 radially extending from the container's bottom surface 520 along the sidewall 512. These pleats 519 are similar to those discussed in more detail above with reference to FIG. 1. Approximately 40 to 80 pleats are present on each blank, with 60 to 72 pleats preferred in a five-inch outer-diameter container and more in a nine-inch diameter plate. The exact number of pleats employed in an embodiment varies with the outer diameter, depth, and shape of the container.

As shown in FIG. 42, the flange 510 has a substantially uniform outer diameter across the entire circumference of the container 500, and a substantially uniform flange thickness, as established by the radius of the rolled portion 504. Also, the flange top surface 513 and the rolled portion 504 thickness are substantially uniform. In the present embodiment, the thickness and the outer diameter of the flange 510 do not vary, or vary only to a minor degree, between containers, so that the container 500 is substantially reproducible. The extent to which the rolled portion 504 underlies the depression 514, however, can vary along the flange and container 500 circumferences.

Because each container 500 has a flange 510 of relatively uniform outer diameter and thickness, the containers 500 may be lidded with a snap-fit lid. The relatively uniform dimensions and the attendant reproducibility of the container 500 allow for the use of snap-fit lids, which have relatively tight size tolerances. In other embodiments, a plastic lid can be affixed to the flange 510 and the groove 514 can help seal the lids to the plates, containers, bowls, or other formation.

Similarly, a film may be heat-sealed to the flange 510 to create a lid. Because the flange 510 is uniform in its outer diameter and thickness (i.e., is "dimensionally stable"), a film may be created in a standard size for heat-sealing to the flange 510. Further, the dimensional stability of the flange 510 minimizes any gapping or discontinuity between the film and flange top surface 513, in turn minimizing airflow paths between the interior of a sealed container 500 and the atmosphere.

FIG. 43 is a cross-sectional view of a pressed container 500, taken along line 43-43 of FIG. 42. This view shows the ridge 502 and the angle between the upper sidewall 516 and lower sidewall 518, as well as a cross-section of the flange 510.

With respect to the angled sidewall 512, the ridge 502 defining the change in angles between the lower sidewall 518 and upper sidewall 516 adds multiple benefits to the container 500. First, the ridge 502 may impart additional structural strength to the container 500. The ridge 502 resists twisting and/or shear stresses applied perpendicular to the bottom surface 520, minimizing deformation that may result therefrom. This may be referred to as the "hoop strength" of the container 500. For example, the increased hoop strength of the container 500 may enhance the angled sidewall's 512 resistance to pressure applied by a series of stacked, nested containers. Thus, the ridge 502 may prevent deformation that would otherwise occur in a container.

Figure 44:
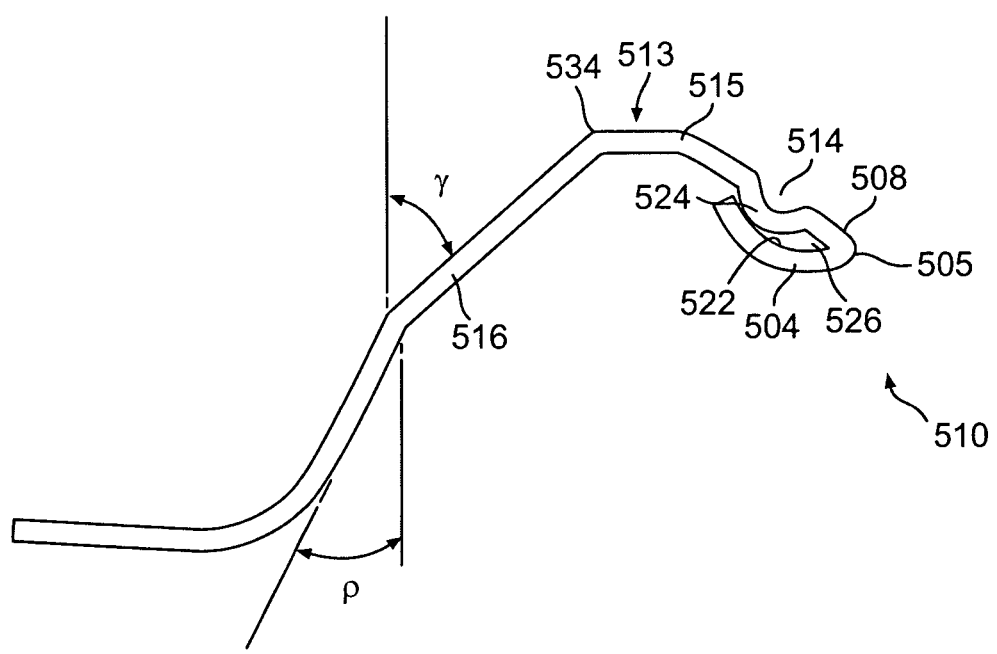
FIG. 44 is an enlarged, cross-sectional view of a flange of the container of FIGS. 42 and 43.

FIG. 44 is an enlarged, fragmentary, cross-sectional view of the flange 510 and the upper sidewall 516. A portion 504 of the flange 510 rolls underneath the flange top surface 513 and at least partially beneath the groove 514. The rolled portion 504 extends from the flange's outer rim 505 under the outer segment 508, and along the under-surface 524 of the depression 514. Typically, the rolled portion 504 extends entirely along the depression's circumference, along under-surface 524, and continues along the under-surface 525 of the flat section 515 of the top surface 513 of the flange 510. This distance of extension can change in alternate embodiments and incorporates at least those variations as shown in the present disclosure. For example, in some embodiments the rolled portion 504 can extend along approximately 40% to 75% of the depression's circumference before terminating. The rolled portion 504 generally increases the thickness of the flange 510 and, in combination with or in addition to the grooves 514 formed therein, aid in the removal of container 500 from a stack. Further, the grooves of the flanges 510 can help seal plastic lids to the containers 500 as desired.

An inner surface 522 of the rolled portion 504 abuts the under-surface 524 of the depression 514. During formation of the container 500, the inner surface 522 and under-surface 524 can be pressure bonded to one another, which can, for example, create a cross-linking of fibers between these paperboard layers. The pressure bond generally assists in maintaining the curvature of the rolled portion 504 by maintaining contact between the rolled portion's inner surface 522 and the depression's under-surface 524. This, in turn, prevents the flange 510 from deforming with time or use. Regardless of whether such pressure bonding occurs, the rolled portion 504 is deformed to assume the shape generally shown in FIG. 43, and the deformation increases the flange thickness and can assist in, for example, sealing the container 500 to a plastic lid applied thereto. In FIG. 44, by way of example, the angle γ can have a value of 30 degrees, and ρ can have a value of 19 degrees.

The inner surface 522 of the rolled portion 504 and the underside of the outer segment 508 define a void space 526. The void space 526 generally increases the overall thickness of the flange 510.

Figure 45:
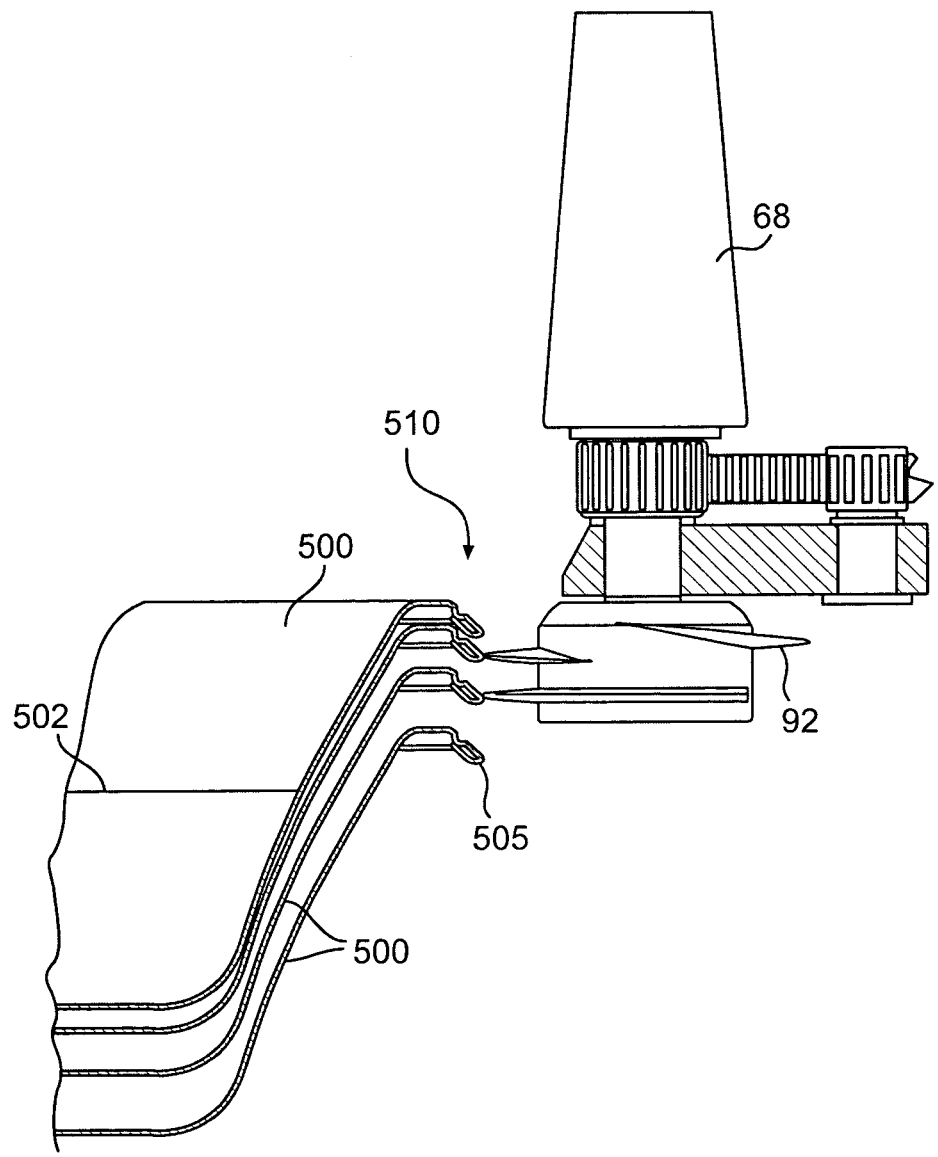
FIG. 45 is a fragmentary vertical section through a denesting apparatus and a stack of nested containers of the type illustrated in FIG. 42.

Referring to FIG. 45, the ridges 502 of multiple stacked containers 500 generally do not abut one another. Specifically, when a first container 500 is nested or stacked within a second container 500, the outer surface of the first container's ridge 502 does not abut the inner surface of the second container's ridge 502. Rather, the preferred nested containers 500 contact one another at the flanges 510. This provides lateral stability for a stack of containers 500, permitting containers to self-align and thus facilitating denesting.

As shown in FIG. 44, the flange 510 extends downwardly at an angle between 1 degree to 89 degrees from the top surface 513. This downward shape of the flange 510 in the present embodiment provides an additional resistance to bending and other deformations. Thus, in this embodiment, the shape of the flange 510 provides containers 500 of consistent and uniform outside diameters, which are perceived to be stronger and thicker in general since the shape of the flange 510 helps resist bending and other deformation. In alternate embodiments, the features shown in FIG. 44 can mostly be used in the alternative. However, in these alternate embodiments, the flanges should be folded under at least partially and should extend downward at an angle. All other elements would optionally be used in varying embodiments with the folded under, angled flange providing enough strength and thickness to impart strength, providing denesting ability, and providing a seal for plastic or other lids to be applied to the plate or container. Thus, the reproducibility of the flange 510 of the container 500 in the present embodiment allows for consistent and uniform outside diameters of containers to be maintained to enable sealing of plastic or other lids to the plates or containers.

As also shown in FIG. 44, the flange 510 and the upper sidewall 516 meet in a circumferential curved edge 534, rather than forming an angled junction. The curved edge 534 may have a radius of approximately 0.045 inches, although this dimension can vary in alternate embodiments. The curved edge 534 facilitates a gradual change in angle between flange 510 and upper sidewall 516, as well as denesting operations. In some embodiments, the curved edge may be replaced by a more abrupt, angled transition.

The outer edge of the flange 510 generally defines an angled peripheral edge 505 between the outer flange segment 508 and the rolled portion 504. When multiple containers 500 are stacked or nested, the rolled portion 504 of a top container rests upon the top surface 513 of a bottom container's flange 510, as shown in FIG. 45. The base of the top container's rolled portion 504 can rest at least partially within the bottom container's depression 514, as shown in FIG. 43. However, the radius of the rolled portion 504 is generally greater than the radius of the depression 514. Thus, although the bottom container's depression 514 can partially accept the base of the top container's rolled portion 504, the rolled portion 504 nonetheless extends upwardly to space the top container's angled edge 505 from the bottom container's angled edge 505, and increases the overall thickness of the flange 510. As shown in FIG. 45, this spacing permits a knife edge 92 of a denesting apparatus 68 to move between adjacent containers 500, in turn allowing denesting of containers 500.

FIGS. 46-51B illustrate various stages during the process of manufacturing the nestable container 500. As with previously described embodiments, the present container 500 is manufactured in a two-stage process. The first stage is forming, from a circular blank, an intermediate container 540 having a downturned flange 542 including a downturned portion 544 adjacent to a container sidewall 546, and a perpendicular portion 548 depending from the downturned portion 544. The process for manufacturing the intermediate container is generally shown in FIGS. 46-49, with the intermediate container 540 shown to best effect in FIG. 49. The finished container 500 is formed from the intermediate container 540 in the second stage.

The diameter and thickness of a circular paperboard blank used to form the intermediate container 540 are generally sized to the final product's desired dimensions, with the die sets used to form the container 500 dimensioned accordingly. The paperboard blank can also include a film or laminate, and may be approximately 0.0005 inches thick. Referring to FIGS. 42-45, the container 500 may have an outside diameter of 9 inches. A container of 9 inch outside diameter may be formed in a die set that includes an approximately 7.15 inch inner container diameter and approximately between 8.275 and 8.319 inches for the die set, allowing for a container thickness of between approximately 0.01 to 0.045 inches.

Figure 46:
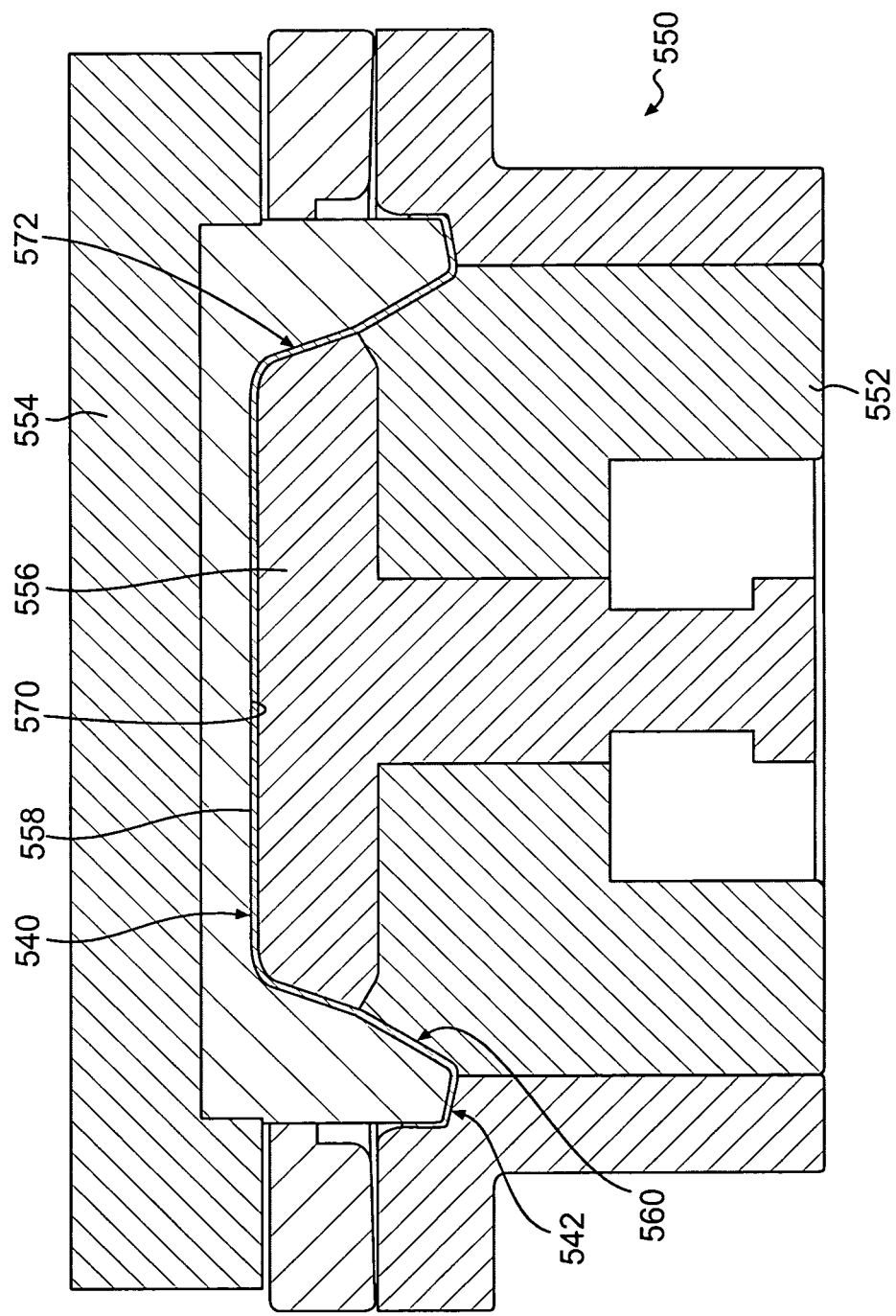
FIG. 46 is a cross-sectional view of a die set used to form an intermediate container form from a circular blank.

Referring to FIG. 46, a die set 550 for forming the intermediate container 540 is shown in cross-section. The die set 550 includes a forming punch 552 seated in the forming die 554, with the blank pressed into the intermediate container 540. The punch 552 can be located either above or beneath the forming die 554, similar to either of the die sets 48, 118, 154, 202, 256, or 330. The punch 552 has a frustoconical protrusion 556 defining a flat, circular top wall 558, a generally frustoconical sidewall 560, an angled shoulder 562, and an upwardly extending edge wall 564. The frustoconical sidewall 560 is further divided into a first angled sidewall portion 566 and second angled sidewall portion 568, which meet at a circumferential ridge point 571. The first and second angled sidewalls 566, 568 extend at different angles from a plane parallel to the top wall 558. Specifically, in the present embodiment the first angled sidewall portion 566 forms approximately a 19-degree angle with the top wall 558, while the second angled sidewall portion 568 extends at approximately 30 degrees from a plane perpendicular to the top wall of the punch 552.

The angled shoulder 562 of the punch 552 angles slightly towards the top wall 558, and abuts the second angled sidewall 568. The edge wall 564 extends upwardly and defines an outer shoulder. As described in more detail below, the angled shoulder 562 and the edge wall 564 combine with a mating surface on the die 554 to form the downturned portion 544 and perpendicular portion 548 of the intermediate container 540.

The die 554 includes a flat, circular top wall 570, a generally frustoconical, downwardly-extending sidewall 572 composed of a first die sidewall 574 and a second die sidewall 576, an upwardly angled die shoulder 578, and an upwardly-extending die edge wall 580. As discussed with respect to the punch 552, the first and second die sidewalls 574, 576 extend at different angles and meet at a die ridge 581 extending along the circumference of the die 554. The first die sidewall 574 extends from the top wall 570 at approximately a 19-degree angle, while the second die sidewall 576 extends from the ridge at approximately a 30-degree angle, measured with respect to a plane perpendicular to the top wall 570.

Figure 47:
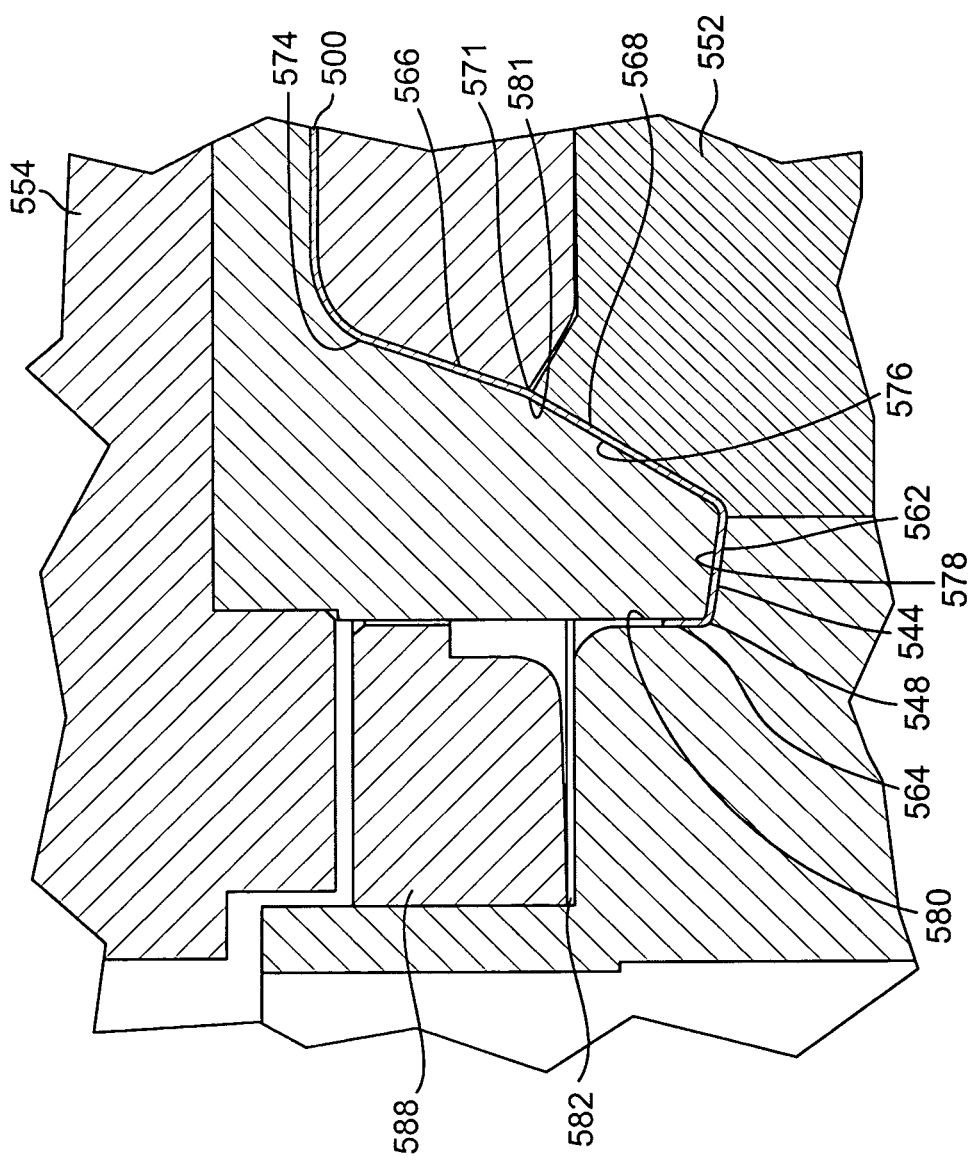
FIG. 47 is an enlarged, cross-sectional view of a portion of the die set of FIG. 46, specifically showing the portions of the die set used to form a flange of the intermediate container form of FIG. 46.
Figure 48:
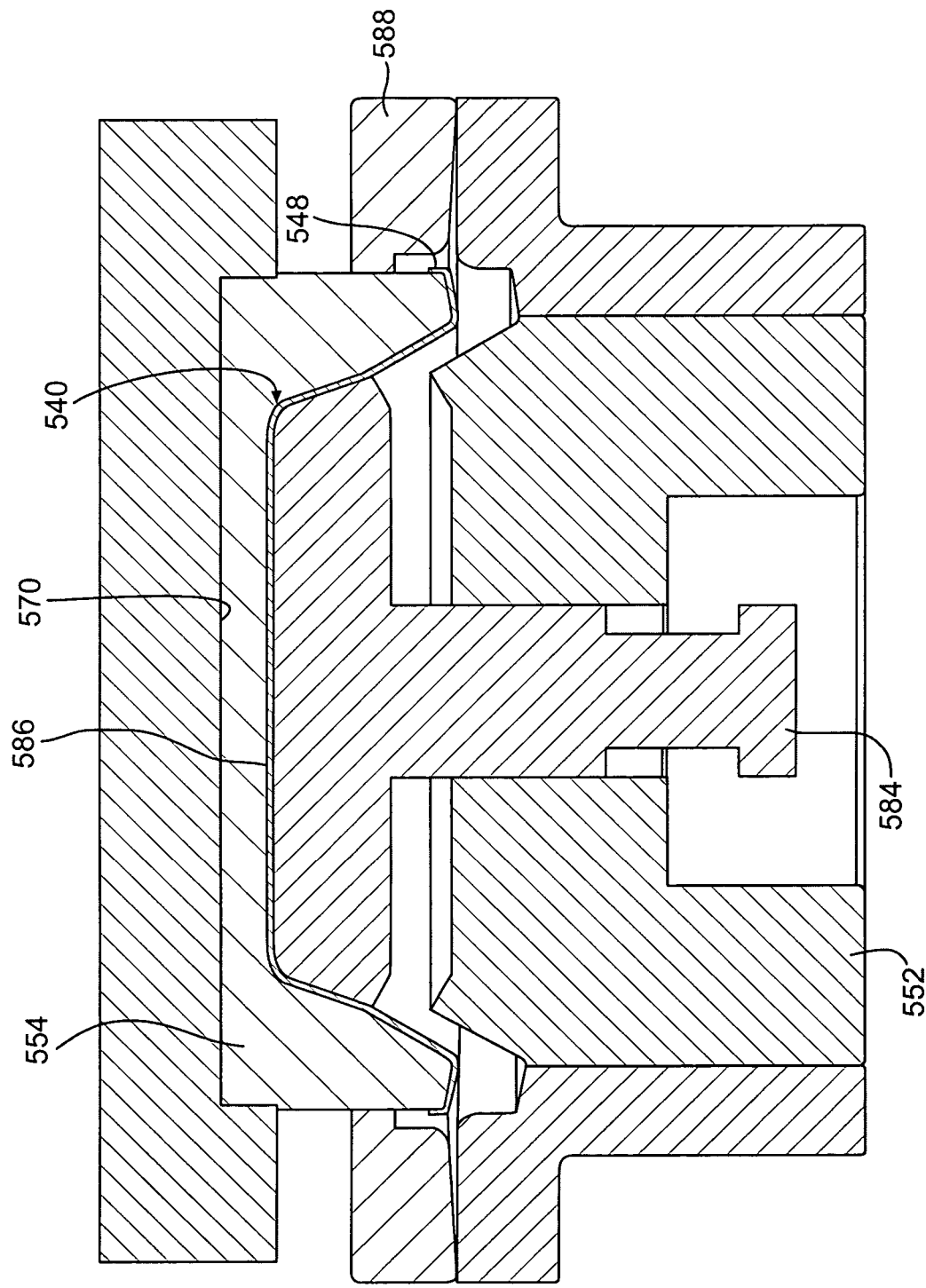
FIG. 48 is a cross-sectional view of the die set of FIG. 46, with the die retracted and a plunger extended.

FIG. 47 illustrates certain elements of the die 554 and punch 552. To form the container 540, first, a circular blank (not shown) is inserted between the punch 552 and die 554, while the die set 550 is open. The blank generally seats in the flat, circular ridge 582 atop the punch 552. Once the blank is seated, the die 554 is lowered onto the punch 552, bending, compressing, and deforming the paperboard blank to form the intermediate container 540 shown in FIG. 46. As the die set 550 closes, the complementary surfaces of the die 554 and the punch 552 generally draw the paperboard blank out of the ridge 582 and deform it into the intermediate container shape. This process also forms the pleats 519 mentioned above, insofar as the flat paperboard blank is at least partially folded upon itself and pressed flat to achieve the three-dimensional shape of the intermediate container 540. Each such fold and pressing form a pleat 519. Further, the closing of the die set 550 aligns the first die sidewall 574 with the first angled sidewall 566 of the punch 552, and the second die sidewall 576 with the second angled sidewall 568. Accordingly, the intermediate container sidewall 546 is compressed to form a ridge 545, a lower sidewall 547, and an upper sidewall 549 at the angles described above.

The general operating conditions of the die set 550 operate at or around the temperatures and force ranges of the die sets described in other embodiments detailed in the disclosure herein. The moisture content in the paperboard blank may also be in the same range as the embodiments discussed herein.

FIG. 47 is an enlarged, fragmentary, cross-sectional view of the portions of the punch 552 and die 554 forming the downturned portion 544 and perpendicular portion 548 of the intermediate container 540. As shown in FIG. 47, the combination of upwardly angled die shoulder 578 and angled shoulder 562 cooperate to form the downturned portion 544 of the intermediate container's flange 542. Similarly, as the die set 550 closes, a portion of the blank is drawn into the void space between the punch's edge wall 564 and the die edge wall 580 to form the perpendicular portion 548 of the intermediate container 540. Both the downturned portion 544 and the perpendicular portion 548 of the flange 542 run along the entire circumference of the intermediate container 540.

After the punch 552 and the die 554 cooperate to form the blank into the intermediate container 540, the die 554 retracts. This operation is generally shown in the cross-sectional view of FIG. 48. Simultaneously, a plunger 584 rises from the punch, holding the base 586 of the intermediate container form 540 against the top wall 570 of the die. An outer punch ring 588 does not retract, but instead remains at least partially in contact with the punch 552.

As the die 554 and plunger 584 move, the perpendicular portion 548 of the container 540 moves. If the perpendicular portion's edge contacts the shoulder of the outer punch ring 588, the downward force exerted against the container 540 may facilitate removing the container from the die 554.

Figure 49:
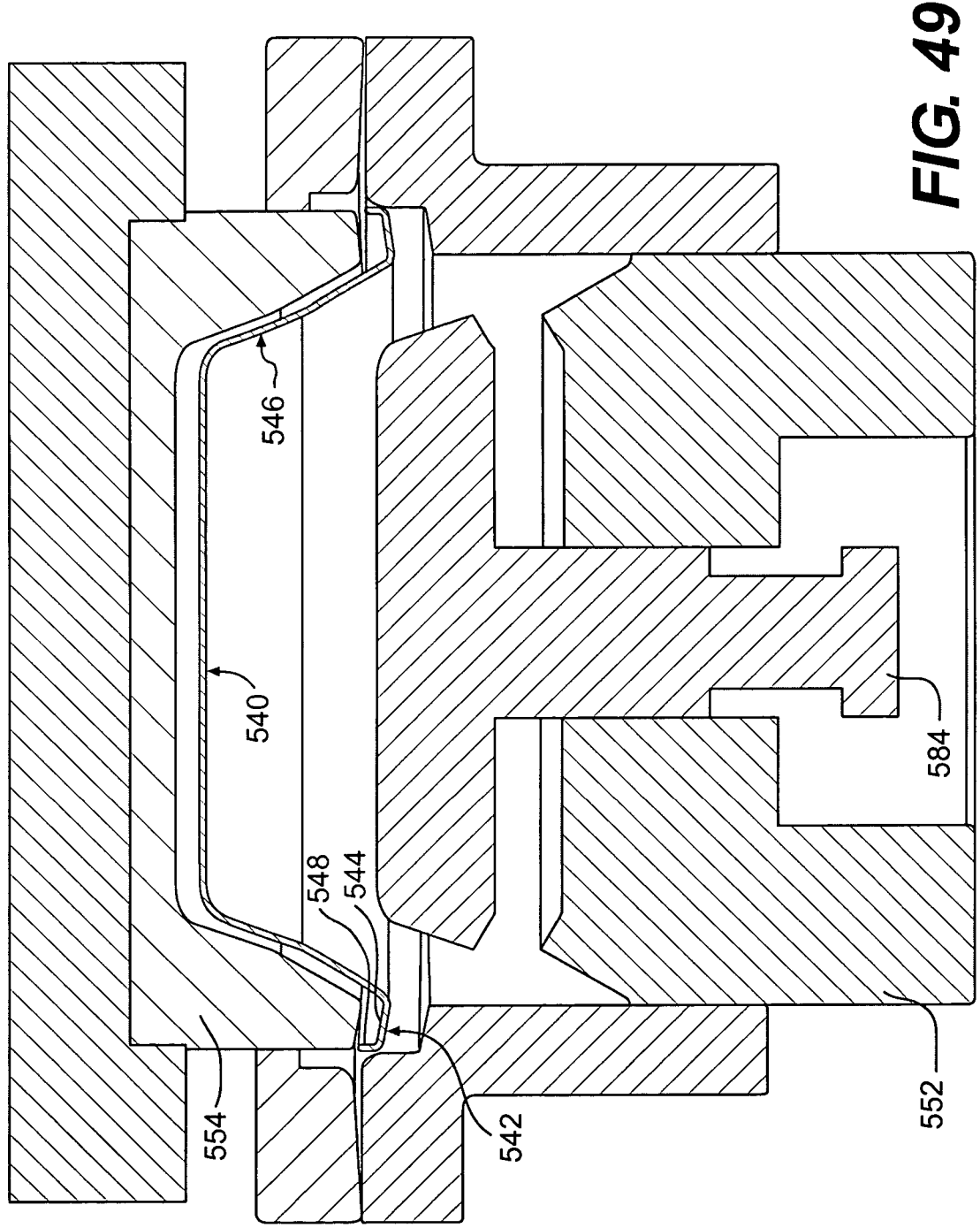
FIG. 49 is another cross-sectional view of the die set of FIGS. 46 and 48, with the die, plunger, and punch retracted.

Once the die 554 and plunger 584 have moved to bottom out and compress the paperboard blank, the plunger 584 and the punch 552 retract and the intermediate container 540 moves downward, ejecting itself from the die 554, as shown in the cross-sectional view of FIG. 49. At least two factors facilitate the ejection of the intermediate container 540 from the die 554. First, the paperboard of intermediate container 540 is at least somewhat naturally resilient. This tends to force the sidewall 546 against the sidewall of the die 554, which in turn levers the intermediate container 540 out of the die. Second, placing the die 554 above the punch 552 (i.e., upside-down with respect to conventional punch-and-die placement) ensures gravity acts to pull the intermediate container form 540 out of the die 554. Airjets or ejector pins may optionally be employed to force the container form 540 out of the die 554, as described above with respect to previous die embodiments. These ejection assists may also be used to eject the intermediate container forms from the punches used in other embodiments.

Figure 50:
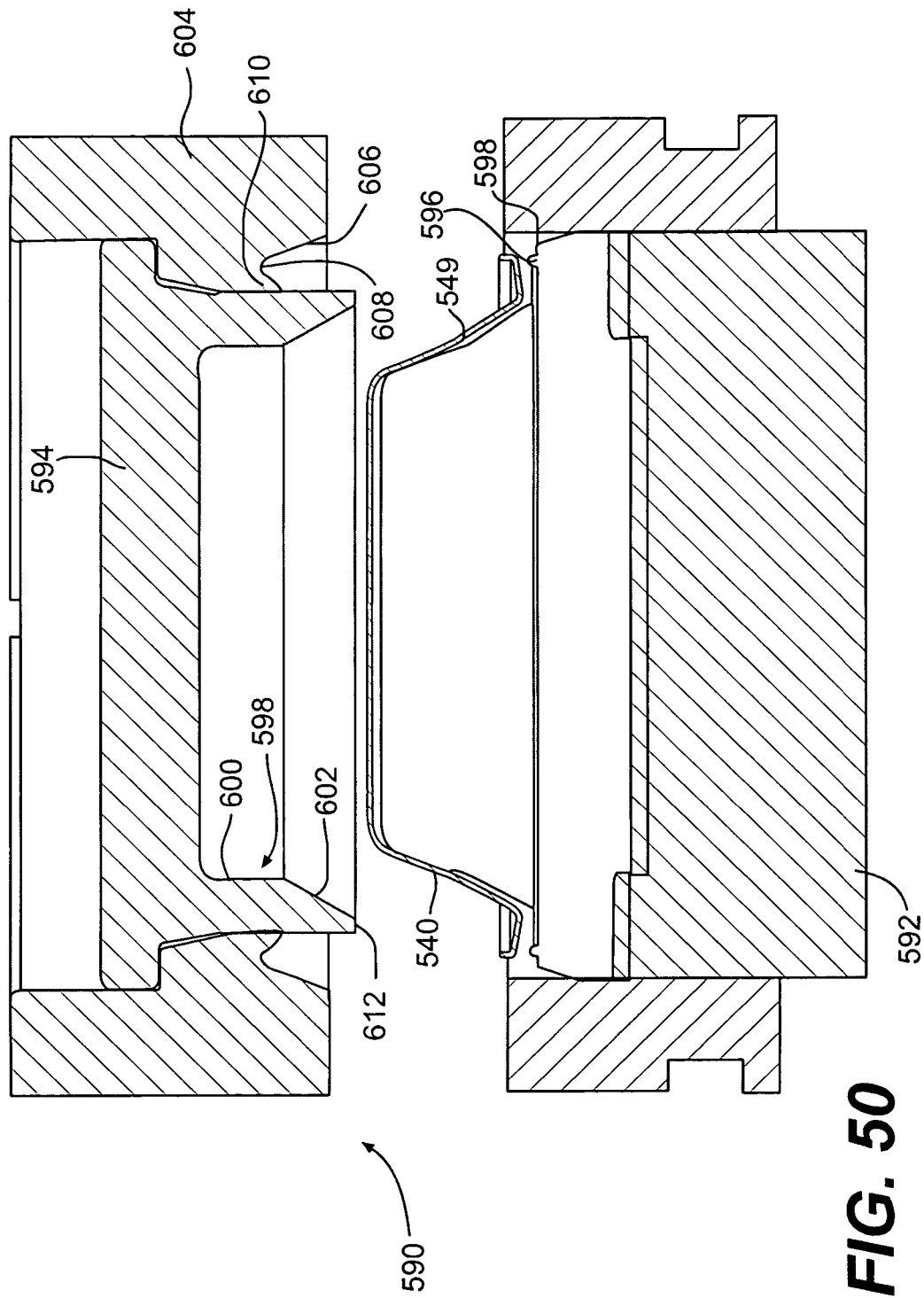
FIG. 50 is a cross-sectional view of a second die set used to form a final pressed container from an intermediate tray form.
Figure 51A:
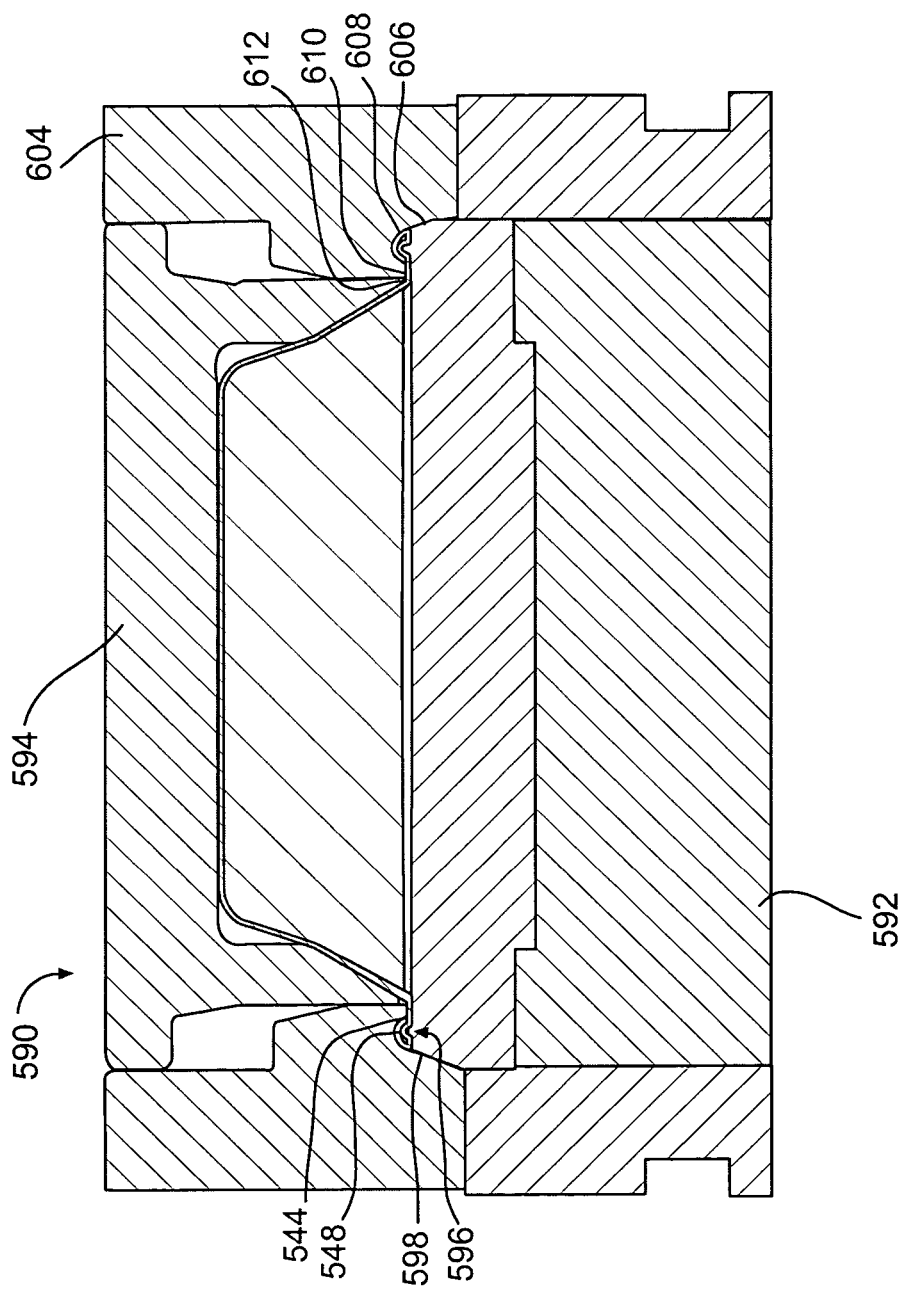
FIG. 51A is a cross-sectional view of the second die set of FIG. 50 in a closed position.
Figure 51B:
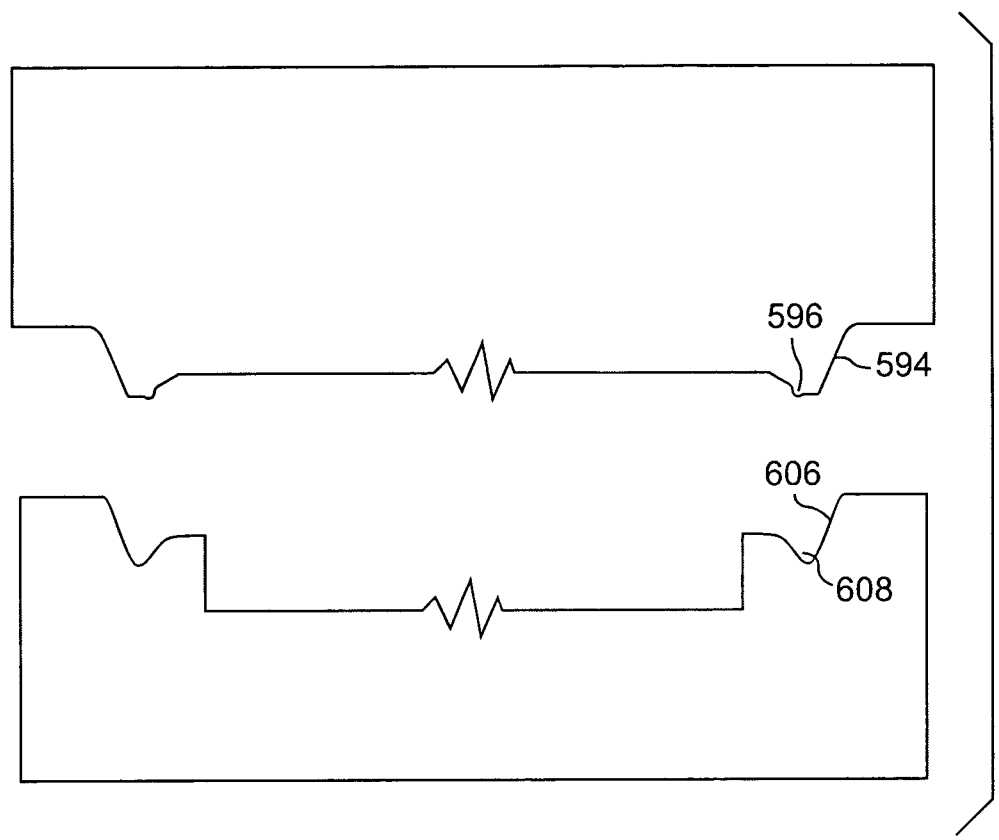
FIG. 51B is an enlarged view of a flange formation element and protrusion shown in FIG. 51A, with the second die set in a partially-open position.
Figure 51C:
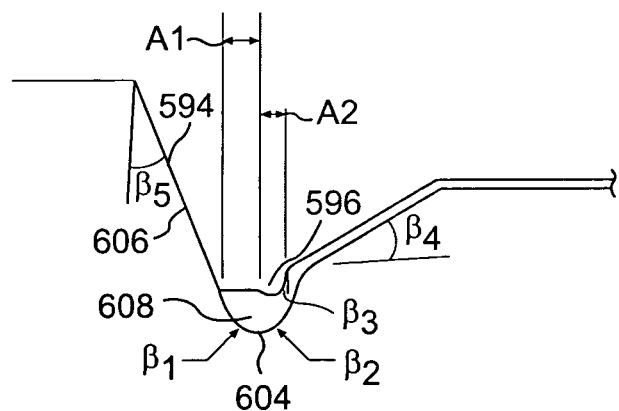
FIG. 51C is an enlarged view of the flange formation element and protrusion of FIG. 51B in a closed position.

FIGS. 50-51C illustrate a second stage of manufacturing the container 500. Referring to FIG. 50, after forming the intermediate container form 540, the intermediate container 540 may be placed within, or otherwise transferred to, a second die set 590 to form the final container 500. The second die set 590 also has a punch 592 and a die 594, with the punch 592 being located beneath the die 594. The punch 592 includes a male protrusion 596 running circumferentially along a flat, outer container 598 of the punch 592, with the intermediate container form 540 being placed on the punch 592 in FIG. 50. The physical characteristics of the punch 592 and die 594 of the second die set 590 may generally match those of the punch 552 and die 554 of the first die set 550, albeit with some structural variations described below.

The punch 592 is raised into the die 594, with the intermediate container form 540 resting on the punch 592. As the punch 592 enters the die 594, the container sidewall 546 contacts the die sidewall 598. As can be seen in FIGS. 50 and 51A, the die sidewall 598 is formed of a vertical sidewall segment 600 and an angled sidewall segment 602. The angled sidewall segment 602 extends at an angle of approximately 30 degrees, matching the angle of the upper sidewall formed in the first die set 550.

FIG. 51A shows the die set 590 when fully closed on the intermediate container form 540. Even when the second die set 590 is fully closed, the intermediate container form's lower sidewall 547 does not contact the vertical sidewall segment 600 of the die 594. This permits the container to enter the die 594 without impacting, or potentially being crushed or deformed by, the die sidewall. In the event the intermediate container form 540 is off-center on the punch 592, the intermediate container form 540 is centered as its upper sidewall 549 comes into contact with the angled sidewall segment 602 of the die 594 during closure of the die set 590. When desirable to operate the second die set 590 and the first die set 550 simultaneously, forces applied to the first die set 550 will be available to the second die set 590 for deformation and/or shaping of the container. Suitable operating temperature ranges of the second die set 590, including the punch 594 and the die 592, may be analogous to other embodiments described above.

When the first die set 550 and the second die set 590 are interlinked and operate simultaneously, an additional force may be applied to the second die set 590 during closure thereof, in order to equalize the closing force of the first die set 550. The equalizing force may ensure the die sets 550, 590 close substantially simultaneously, and prevent either die set from cocking or closing unevenly. Thus, the equalizing force may further prevent uneven pressing of a paperboard blank or container in either die set.

Once the punch 592 completely enters the die 594, stabilizing, centering, and immobilizing the intermediate container form 540 therebetween, a circular flange formation element 604 is lowered. FIG. 50 depicts the flange formation element 604 retracted from the die 594, with the bottom surface of the formation element 604 being higher than the lower surface of the die, while FIG. 51A depicts the formation element 604 lowered around the die 594, with the bottom surface of the formation element 604 being lower than the bottom surface of the die 594. The flange formation element 604 is generally continuous and encircles the entirety of the die 594.

The flange formation element 604 includes a formation sidewall 606, sloping inwardly to a formation cavity 608. The formation cavity 608 is bounded on its inner edge (the edge closest to the die 594) by a formation shoulder 610. As the flange formation element 604 descends around the die 594, the distal edge of the container perpendicular portion 548 impacts the formation sidewall 606. Upon initial impact, and after the intermediate container form 540 centers on the punch 592, the downturned portion 544 of the intermediate container is held against the outer container 598 by a lip 612 of the die 594, as shown in FIG. 51A. This prevents the downturned portion 544 from moving when the distal edge of the perpendicular portion 548 impacts the formation sidewall 606.

FIG. 51B is an enlarged view of the protrusion 596 and the flange formation element 604 in a partially open state. As shown, the formation cavity 608 (measured from the end to the point at which the formation cavity 608 impacts the outer container 598) is larger than the protrusion 596. The formation sidewall 606 has a 20-degree slope. The outer ring 598 may be divided into an inner ring portion 599 and outer ring portion 601, each on a different side of the protrusion 596. The protrusion 596 is approximately 0.05 to 0.062 inches wide. The flat section is shown as 0.075 inches wide. The protrusion 596 is approximately 0.015 to 0.035 inches high, while the formation cavity 608 is approximately 0.0538 inches deep. These measurements may vary in alternate embodiments. The elements 381, 278, and 383 lie in a flat, horizontal plane. However, they may be deformed at a slight angle to create the finished flange.

As shown in FIGS. 51A and 51C, the formation sidewall 606 is sloped inwardly, towards the die 594, at an approximate 20 degree angle. The flange formation element's 604 downward motion rolls the distal edge of the perpendicular portion 548 inward, towards the die 594 and punch 592 and into the formation cavity 608. Since the paperboard is at least somewhat flexible, it rolls rather than crumples. This flexibility is aided by enhancing the paperboard moisture, raising it to, for example, about 8% to 10% by weight. The overall moisture content of the paperboard may be in the range of about 2% to 13%, or more particularly in the range of about 8% to 10%. The rolling of the perpendicular portion 548 forms the rolled portion 504 of the finished flange 510. The formation shoulder 610 bounds the formation cavity 608, and ensures the perpendicular portion 548 does not extend too far towards the die 594 as the formation element 604 closes.

In addition to rolling the perpendicular portion 548, the flange formation element 604 generally presses the downturned portion 544 of the intermediate container form 540 against the outer container 598 of the punch 592. As the formation element 608 lowers and the perpendicular portion 548 is forced under the downturned portion 544 (see FIG. 51A), a force is also vectored parallel to the outer container's surface. Thus, two force vectors act upon the downturned portion 544: a first force vector presses the downturned portion 544 against the outer container 598 and perpendicular to the circumferential protrusion 596, while a second force vector presses the downturned portion 544 laterally to the outer container 598 and against an outer edge of the protrusion. The combination of forces causes the downturned portion 544 to "wrap" around the protrusion 596, conforming thereto. Thus, even though the formation cavity 608 is substantially larger than the protrusion 596 and lacks a completely complementary female surface, the downturned portion 544 nonetheless is pressed fully about the protrusion. This is due to two paperboard/film thickness of approximately 0.036 inches being compressed into a closed gap of 0.030-0.033 inches. Alternate embodiments may have different measurements for the gap or paperboard/film material.

The formation shoulder 610, in combination with the now-rolled perpendicular portion 548, forces the inner section of the container's downturned portion 544 against the inner edge of the protrusion 596. When the formation element 604 is completely lowered about the die 594, the now-rolled perpendicular portion 548 occupies substantially all available area between the inner edge of the protrusion 596 and the formation shoulder 610. This prevents the downturned portion 544 of the intermediate container form 540 from buckling upwardly and into the formation cavity 608. The resulting forces create the aforementioned "wrapping" effect, conforming the downturned portion 544 to the profile of the protrusion 596. This forms the depression/groove 514 described above with respect to FIGS. 42-44.

The relatively small space in the formation cavity 608, coupled with the pressure applied to the section of the downturned portion 544 wrapped around the male protrusion 596 to form the top, flat portion of the finished flange (i.e., the outer wall of the depression 504 of the finished container 500), deforms the perpendicular portion 548. This deformation resists decoupling or expansion of the flange 510 in the final, formed container 500 and additionally may impart structural strength to the container 500. Additionally, the pressure substantially straightens the downturned portion 544, so that the finished flange 510 is essentially parallel to the bottom surface of the container 500, and sufficiently deforms the paperboard to minimize springback or unrolling of the finished flange 510. The perpendicular portion 548 may also be bonded to the downturned portion 544 by the aforementioned combination of pressure and small space in some embodiments. FIG. 51C depicts an enlarged view of the protrusion 596 and formation cavity 608, with the die set 590 closed. In FIG. 51C, the cavity 608 extends approximately 0.078 Rad. until reaching formation element 604, which extends at 0.093 Rad. to mesh with protrusion 596, which extends at 0.031 Rad. By way of example, in FIG. 51C, A1=0.075 in., A2=0.062 in., β1=0.078 Rad., β2=0.093 Rad., β3=0.031 Rad., β4=30 deg., and β5=20 deg.

Throughout FIGS. 42-51, the dimensions shown are exemplary. Alternate embodiments may employ different dimensions without departing from the spirit or scope of the present invention. Thus, different sized containers, having the form of, for example, plates or trays, may have different dimensions. The method of forming the container 500 described above produces containers 500 of substantially uniform shape and dimension, increasing container denestability and reproducibility. The finished outer diameters of the containers 500, for example, can be substantially equal and can include additional strength enhancing features, such as grooves and can accommodate lids or other attachments to seal the interior of the container.

The aforementioned manufacturing process for a container 500 has been described as a two-stage process. Accordingly, a first die set 550 and second die set 590 have been discussed. In the process, the first and second die sets 550, 590 may be part of a single apparatus, or may be separate from one another. Further, the first and second die sets may be interlinked such that both die sets close and open on the same motion. If the die sets 550, 590 are mounted on an inclined surface, gravity (optionally with an air-assist or ejector pin) may be used to transfer containers 500 between the first and second die sets 550, 590. Optionally, a chute, conveyor belt, or other mechanism may convey the intermediate container form 540 from the first die set 550 to the second die set 590 for further forming. The conveyor belt may be, for example, a vacuum belt.

The plates described herein, such as those shown in FIGS. 42-51, can be used in a variety of applications, including home/take out containers.

FIGS. 52A-52C illustrate a tenth embodiment of a pressed container 600. The container 600 includes a flange 610 extending outwardly from the entirety of the container sidewall 612. An upwardly concave groove or depression 614 is formed in the flange 610, at a distance of approximately three-quarters of the width of the flange's top surface 616 from the joinder of the flange 610 and the sidewall 612. The depression 614 runs along the circumference of the flange 610, and is generally U-shaped in cross-section. The flange 610 itself is preferably roughly 0.3275 inches wide along its top surface 616, and divided by the depression 614 into an inner flange segment 620 and outer flange segment 622. In the illustrated embodiment, the outer diameter Φ1 of the flange 610 is 4.995 inches, the inner diameter Φ2 is 4.34 inches, and the height H1 of the container 600 is 1.078 inches. The distance L4 from the center of the depression 614 to the edge 624 of the flange 610 is 0.095 inches, and the thickness t1 of the flange 610 is 0.090 inches. Alternate embodiments may have varying dimensions. For example, the placement of the depression 614 on the surface of the flange 610, the depression 614 thickness or width, and/or the overall flange dimensions may all vary.

Referring to FIG. 52A, the sidewall 612 may be at an angle μ of about 120 degrees relative to the container base 630, or 30 degrees from vertical. The container 600 may alternatively include two or more sidewall sections disposed at an angle to one another, as shown in FIG. 29.

The container 600 typically also has multiple pleats 634 radially extending from the container base 630 along the sidewall 612. The pleats 630 are similar to those discussed in more detail above with respect to FIG. 1. Approximately 40 to 80 score lines may be present in the blank used to form the container 600, or more particularly between 60 to 72 score lines. The exact number of pleats formed in an embodiment may vary with the outer diameter, depth, and shape of the container.

A portion 640 of the flange 610 rolls underneath the flange top surface 616 and at least partially beneath the depression 614. This aspect is shown in FIG. 52B, which is an enlarged, fragmentary, cross-sectional view of the flange 610. The rolled portion 640 extends from the flange's outer rim 624 under the outer segment 622, and at least partially along the under-surface 650 of the depression 614. The rolled portion 640 may extend along approximately 20% to 75% of the depression's circumference before terminating, although this distance may vary in alternate embodiments. For example, in some embodiments the rolled portion 640 may extend along the entirety of the depression's circumference. The rolled portion 640 generally increases the thickness of the flange 610. In the present embodiment, the flange 610 thickness is approximately 0.090 inches, with a tolerance range of plus or minus 0.01 inches.

An inner surface 652 of the rolled portion 640 abuts an under-surface 650 of the depression 294. During forming of the container 600, the inner surface 652 and under-surface 650 may be pressure bonded to one another. This may, for example, create a cross-linking of fibers between these paperboard layers of the container 600. The pressure bond generally assists in maintaining the curvature of the rolled portion 640 by maintaining contact between the rolled portion's inner surface 652 and the depression's under-surface 650. This, in turn, prevents the flange 610 from deforming with time or use. The inner surface 652 of the rolled portion 644 and the underside 650 of the outer segment 622 also define a void space 660.

As also shown in FIG. 52C, the flange 610 and the sidewall 612 meet in a circumferential curved edge 670, which may have a radius of 0.045 inches, although this dimension may change in alternate embodiments.

FIG. 52C illustrates a section of multiple containers 600. Referring to FIGS. 52B and 52C, when containers 600 are stacked, the rolled portion 640 of a top container 600 rests upon the top surface 616 of a bottom container's flange 610. The base of the top container's rolled portion 640 may rest at least partially within the bottom container's depression 614. However, the radius of the rolled portion 640 is generally greater than the radius of the depression 614. Thus, although the bottom container's depression 614 may partially accept the base of the top container's rolled portion 640, the rolled portion 640 extends upwardly to space the top container's flange 610 from the bottom container 600. The spacing permits a knife edge of a denesting apparatus to move between adjacent containers 600.

FIGS. 53A-53C are sectional views illustrating an eleventh embodiment of a container 700. The container 700 includes a flange 710 extending outwardly from the entirety of the container sidewall 712. An upwardly concave groove or depression 714, at a distance of approximately two-thirds of the width of the flange's top surface 716 from the joinder of the flange 710 and a sidewall 712. The depression 714 runs along the circumference of the flange 710, and is generally U-shaped in cross-section. The flange 710 may be about 0.3275 inches wide along its top surface 716, and divided by the depression 714 into an inner flange segment 720 and an outer flange segment 722.

The container 700 typically also has multiple pleats 734 radially extending from the container base 730 along the sidewall 712. The pleats 730 are similar to those discussed in more detail above with respect to FIG. 1. The exact number of pleats employed in an embodiment may vary with the outer diameter, depth, and shape of the container.

A portion 740 of the flange 710 rolls underneath the flange top surface 716 and at least partially beneath the depression 714. This aspect is shown in FIG. 53B, which is an enlarged, fragmentary, cross-sectional view of the flange 710. The rolled portion 740 extends from the flange's outer rim 724 under the outer segment 722, and at least partially along the under-surface 750 of the depression 714. The rolled portion 740 generally increases the thickness of the flange 710. In the present embodiment, the flange 710 thickness is approximately 0.098 inches, with a tolerance range of plus or minus 0.01 inches.

The rolled portion 740 has an undersection 742 that extends a long a radius of curvature R7, and which further extends under the depression 714, so that an inner surface 752 of the rolled portion 740 may abut the under-surface 750 of the depression 714 at one or more annularly-shaped locations. The inner surface 752 of the rolled portion 744 and the underside 750 of the outer segment 722 define a void space 770. The radius R7 illustrated in FIG. 53B is about 0.128 inches, while the radius of the bottom of the depression 714 is about 0.025 inches.

FIG. 53C illustrates a section of multiple containers 700. Referring to FIGS. 53B and 53C, when containers 700 are stacked, the rolled portion 740 of a top container 700 rests upon the top surface 716 of a bottom container's flange 710. The base of the top container's rolled portion 740 may rest at least partially within the bottom container's depression 714. However, the radius of the rolled portion 740 is generally greater than the radius of the depression 714. Thus, although the bottom container's depression 714 may partially accept the base of the top container's rolled portion 740, the rolled portion 740 extends upwardly to space the top container's flange 710 from the bottom container 700. The spacing permits a knife edge of a denesting apparatus to move between adjacent containers 700.

FIGS. 54A-54C are sectional views illustrating a twelfth embodiment of a container 800. The container 800 includes a flange 810 extending outwardly from the entirety of the container sidewall 812. An upwardly concave groove or depression 814, at a distance of approximately three-quarters of the width of the flange's top surface 816 from the joinder of the flange 810 and a sidewall 812. The depression 814 runs along the circumference of the flange 810, and is generally U-shaped in cross-section. The flange 810 itself is preferably roughly 0.3285 inches wide along its top surface 816, and divided by the depression 814 into an inner flange segment 820 and outer flange segment 822.

The container 800 typically also has multiple pleats 834 radially extending from the container base 830 along the sidewall 812. The pleats 830 are similar to those discussed in more detail above with respect to FIG. 1. The exact number of pleats employed in an embodiment may vary with the outer diameter, depth, and shape of the container.

A portion 840 of the flange 810 rolls underneath the flange top surface 816 and at least partially beneath the depression 814. This aspect is shown in FIG. 54B, which is an enlarged, fragmentary, cross-sectional view of the flange 810. The rolled portion 840 extends from the flange's outer rim 824 under the outer segment 822, and at least partially along the under-surface 850 of the depression 814. The rolled portion 840 generally increases the thickness of the flange 810. In the present embodiment, the flange 810 thickness is approximately 0.073 inches, with a tolerance range of plus or minus 0.01 inches.

The rolled portion 840 extends under the depression 814 so that an inner surface 852 of the rolled portion 840 abuts the under-surface 850 of the depression 814. The inner surface 852 contacts a bottom 854 of the groove 814 over a distance of at least half of the width of the groove 814, and may contact the groove 814 over a distance of at least three quarters of the width of the groove 814. The extended contact between the under-surface 850 and the inner surface 852 increases the strength of paper bonding between the rolled portion 840 and the under-surface 850. The inner surface 852 of the rolled portion 844 and the underside 850 of the outer segment 822 define a void space 860. The radius R1 illustrated in FIG. 54B is 0.050 inches, while the radius of the bottom of the depression 814 is 0.034 inches.

FIG. 54C illustrates a section of multiple containers 800. Referring to FIGS. 54B and 54C, when containers 800 are stacked, the rolled portion 840 of a top container 800 rests upon the top surface 816 of a bottom container's flange 810. The base of the top container's rolled portion 840 may rest at least partially within the bottom container's depression 814. However, the radius of the rolled portion 840 is generally greater than the radius of the depression 814. Thus, although the bottom container's depression 814 may partially accept the base of the top container's rolled portion 840, the rolled portion 840 extends upwardly to space the top container's flange 810 from the bottom container 800. The spacing permits a knife edge of a denesting apparatus to move between adjacent containers 800.

Figure 55A:
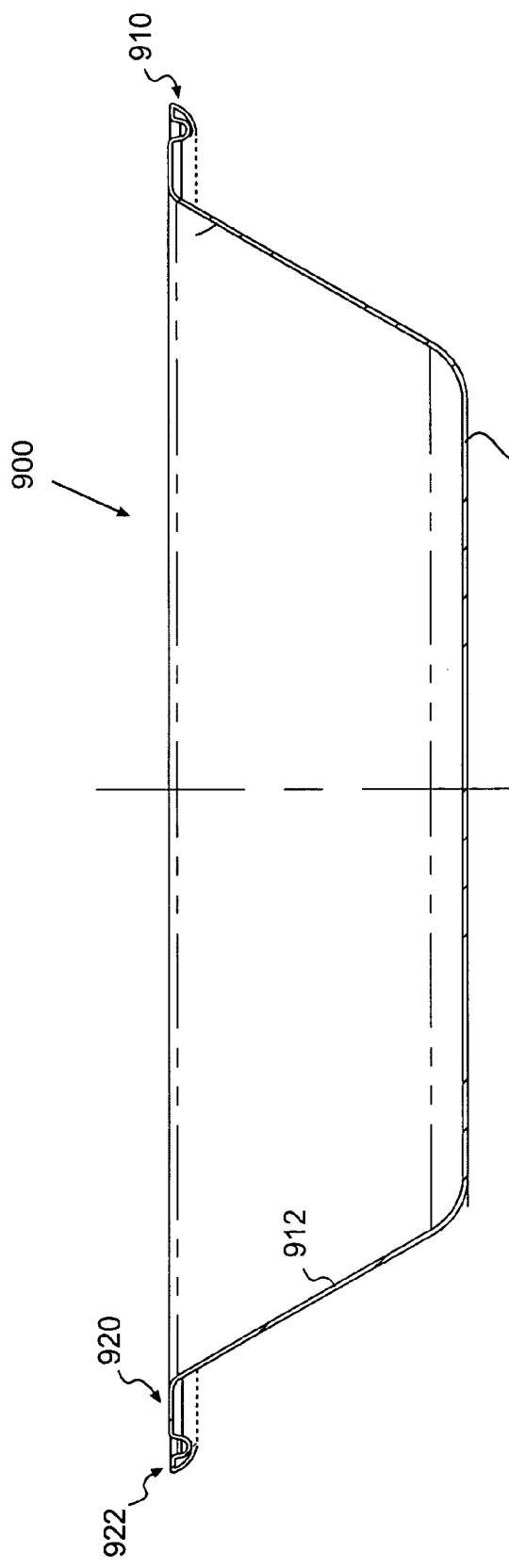
FIG. 55A is a sectional view of a container according to a thirteenth embodiment.
Figure 55C:
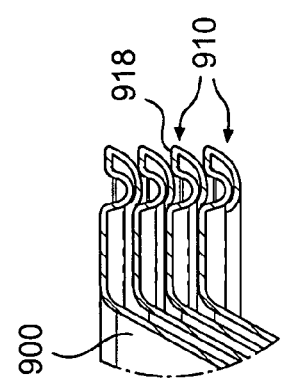
FIG. 55C illustrates the flanges of stacked containers according to the thirteenth embodiment.
Figure 55B:
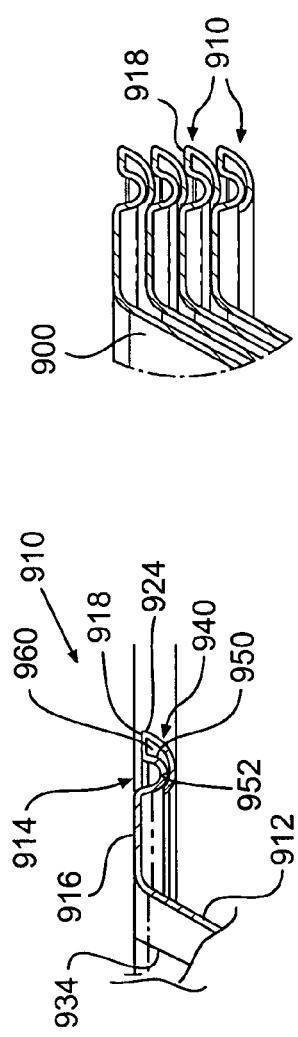
FIG. 55B is an enlarged fragmentary section of the flange of the container of FIG. 55A.

FIGS. 55A-55C are sectional views illustrating a thirteenth embodiment of a container 900. FIGS. 55A-55C illustrate yet another embodiment of a pressed container 900. The container 900 includes a flange 910 extending outwardly from the entirety of the container sidewall 912. An upwardly concave groove or depression 914 is disposed at a distance of approximately three-quarters of the width of a first top surface 916 from the joinder of the flange 910 and a sidewall 912. The depression 914 runs along the circumference of the flange 910, and is generally U-shaped in cross-section. The flange 910 may be about 0.3295 inches wide along its top surface 916, and divided by the depression 914 into an inner flange segment 920 and outer flange segment 922. The container 900 has multiple pleats 934 radially extending from a container base 930 along the sidewall 912. The pleats 934 are similar to those discussed in more detail above with respect to FIG. 1.

The flange 910 also includes a second top surface 918 that is offset in height from the first top surface 916. The offset can be at least 0.1 inches, and enhances the denestability of container 900.

A portion 940 of the flange 910 rolls underneath the first flange top surface 916 and the second top surface 918, the depression 914 and the second flange top surface 918. This aspect is shown in FIG. 55B, which is an enlarged, fragmentary, cross-sectional view of the flange 910. The rolled portion 940 extends from the flange's outer rim 924 under the outer segment 922, and at least partially along the under-surface 950 of the depression 914. The rolled portion 940 generally increases the thickness of the flange 910. In the present embodiment, the flange 910 thickness is approximately 0.073 inches, with a tolerance range of plus or minus 0.01 inches.

The rolled portion 940 extends under the depression 914 so that an inner surface 952 of the rolled portion 940 abuts the under-surface 950 of the depression 914. The inner surface 952 may contact a bottom 954 of the groove 914 over a distance of at least half of the width of the groove 914, and may further contact the groove 914 over a distance of at least three quarters of the width of the groove 914. The extended contact between the under-surface 950 and the inner surface 952 increases the strength of paper bonding between the rolled portion 940 and the under-surface 950. The inner surface 952 of the rolled portion 944 and the underside 950 of the outer segment 922 define a void space 960.

FIG. 58C illustrates a section of multiple containers 900. Referring to FIGS. 55B and 55C, when containers 900 are stacked, the rolled portion 940 of a top container 900 rests upon the first top surface 916 of a bottom container's flange 910, without touching the second top surface 918. The base of the top container's rolled portion 940 may rest at least partially within the bottom container's depression 914. However, the radius of the rolled portion 940 is generally greater than the radius of the depression 914. Thus, although the bottom container's depression 914 may partially accept the base of the top container's rolled portion 940, the rolled portion 940 extends upwardly to space the top container's flange 910 from the bottom container 900. The spacing permits a knife edge of a denesting apparatus to move between adjacent containers 900.

While the containers discussed herein could be made of many different materials, and while the present application has referenced specifically an unlaminated paperboard material, many times the paperboard material has a moisture impervious plastic film thereon to protect the underlying paperboard from moisture that might be in the air, food products in the container, or the like. If the upper surface of the container 242 illustrated in FIG. 26, for example, has such a moisture-impervious film thereon, the film will wrap around the top and bottom surfaces of the flange 248 so as to protect the flange 248 from moisture, which might otherwise have a deteriorating effect on the paperboard material in the flange 248. The other embodiments discussed herein can include a similar film.

The containers according to the present invention may also include a single film covering the top and bottom of the container, or two films—one covering the top and the other covering the bottom surface of the container. Additionally and/or alternatively, the containers may be clay-coated, and may optionally include an overprint coating. Generally, film laminates may be used to create a moisture-, vapor-, or gas-impervious barriers, preventing transmission of such elements between a container interior and exterior, and thus potentially sealing container contents. Films, for example, may prevent transmission of oxygen, nitrogen, and/or carbon dioxide. In yet other embodiments, containers may be microwaveable, ovenable, or both ("dual-ovenable"), and may form a retortable container.

The flanges illustrated in FIGS. 24, 25, 28, 29, 40, 41-45 and 52-55 are of double thickness, which render them stronger and therefore capable of supporting a taller and heavier stack of containers without deforming. The flanges may also be stronger due to paper bonding of the rolled portions with upper portions of the flanges. Paper bonding in the flanges increases the stability of the resultant containers, which may be stored in various temperatures and humidities.

Figure 56:
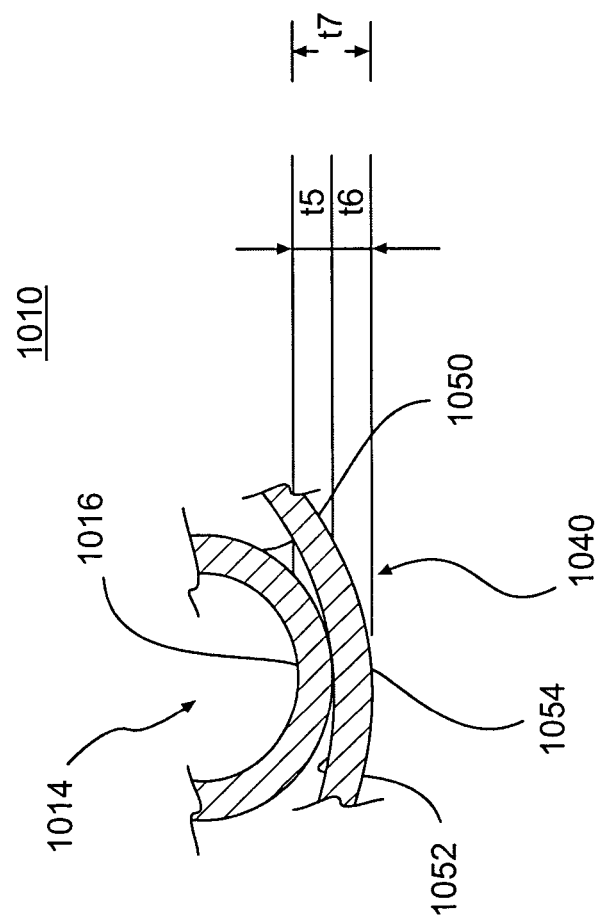
FIG. 56 illustrates paperboard compression in a rolled section of a flange.

In forming the abovementioned embodiments, the thickness of the paperboard sections of the flange can be formed to any desired value. For example, FIG. 56 illustrates a section of a flange 1010 in which the thickness of paperboard sections in the flange 1010 are compressed during forming. The flange has a depression 1014 which may be an annular ring as described in the embodiments discussed above. The flange 1010 includes a depression bottom 1016 having an undersurface 1050 that contacts an upper surface 1052 of a compressed section of a rolled portion 1040. The paperboard used to form the flange 1010 may be of a specified caliper. During processing, the paperboard may be compressed such that the sum t7 of the thickness t5 and t6 may be less than about 1.7 times the original caliper. In other embodiments, the thickness may be less than 1.5 the original caliper, or even as low as 1.3 times the original caliper. These thickness t7 values represent relatively high compression of the flange 1010 because the paperboard blank used to form the container is pleated during forming. Therefore, up to four layers of paperboard may be compressed to a relatively thin thickness. High compression of the flange 1010 sections also results in high paper bonding strength. The principles discussed with reference to FIG. 56 can be applied to any of the flanges discussed above having rolled sections.

A variety of alternate films or laminates may be added to the various containers of the present invention. For example, any of the containers discussed herein may be provided with a microwave susceptor layer, or a PET or CPET film. The specific films, laminations, or coatings used in a given container may vary, depending on the intended use of the container.

The denesting characteristics of the various containers described herein render such containers particularly suitable for a variety of applications, such as consumer use, food services, storage, and so forth. Further, while the embodiments disclosed herein are described and depicted with respect to a screw denester, the embodiments may operate equally well with other forms of denesting equipment.

While circular blanks are used to make the containers discussed in this specification, other blank forms may be used to form differing container shapes. For example, a rectangular blank having radiused corners can be used to form a container having a rectangular shape. Another blank having a triangular shape with radiused corners can be used to form a container having a triangular shape. Such variations in blank and container shape are within the scope of the invention.

In furtherance thereof and with regard to any of the afore-described embodiments, depending upon the depth of the stack of containers that are being denested, the weight of the stack can become significant enough to cause the flanges to flex and thereby slope radially upwardly at the bottom of the stack. This can make it difficult for the knife edge 92 in the denester 68 to be inserted between adjacent trays, both because the opening between the flanges of adjacent trays is angled upwardly and not in alignment with the knife edge 92, and also because the opening becomes more narrow with an increase in the slope of the flange. To avoid the denesting problems that might be associated with large stacks of such containers, the flange of the containers can be formed so as to initially slope slightly downwardly and outwardly but not so much as to prevent the knife edge from being inserted therebetween. Therefore, as the weight of the stack increases, the flanges begin to flex upwardly but with reasonable numbers of trays in a stack, the flanges would never slope upwardly and outwardly enough to inhibit a reliable relationship with the knife edge of the denester.

There are other methods for successfully stacking large numbers of containers that might contain sufficient weight to flex the flange of the lowermost containers into a position from which they do not reliably engage with a denester. For example, the stack could be mechanically separated into smaller numbers of containers that are vertically aligned but wherein the entire weight of the composite stack is not on the lowermost container in the stack. This approach can be accomplished, for example, by providing additional knife edge denesters upon which a portion of the stack is supported at spaced locations along the vertical height of the stack of containers so as to effectively divide the stack into smaller sections of predetermined weight. In other words, there may be one, two, or more denesting apparatuses vertically superimposed at predetermined spaced intervals or the denesting apparatuses would not have to necessarily be vertically superimposed but could be vertically spaced and circumferentially displaced so as to engage the containers at different locations around their perimeter.

Problems associated with the weight of a stack of containers can also be dealt with by establishing a greater gap between the flanges of adjacent containers. This could be accomplished by exaggerating the techniques described above for creating a gap between the flanges of adjacent containers.

Although the present invention has been described in the context of a variety of embodiments all taking the form of generally circular or cylindrical containers, it should be understood that the present invention encompasses containers of any shape, depth, flange thickness or outer diameter, or size. For example, a square or rectangular container may be manufactured with a flange having a depression running substantially along the entire flange, as well as a rolled portion extending thereunder. Similarly, a square, oval, or rectangular container may be manufactured with angled sidewalls as described herein. Additionally, various tolerances and relative dimensions may differ from embodiment to embodiment. For example, one embodiment may take the form of a serving or heating tray having a relatively large (for example, nine inch) diameter and relatively short or low sidewalls. Yet another example is a paper plate. Nonetheless, such a heating tray may include any of the flange embodiments described herein, as well as the afore-discussed angled sidewalls. Accordingly, it is contemplated that the various features and enhancements of the present invention disclosed above may be used with any size or shape of container, manufactured from any suitable material.

Trays or other containers may be manufactured with two or more compartments, for example to store different foodstuffs or other items in each compartment. Such containers may be provided with a flange in accordance with the embodiments discussed herein.

The container embodiments discussed in this specification may have various dimensions. For example, the general container outside diameters, heights, and sidewall angles in each container embodiment may be applied to the other embodiments. Each container embodiment discussed herein may also be formed with two sidewall sections, as shown in FIG. 42.

Although the present invention has been described with a certain degree of particularity, it is understood the disclosure has been made by way of example, and changes in detail or structure may be made without departing from the spirit of the invention as defined in the appended claims.

What is claimed is:

1. A nestable paperboard container, comprising:
   a base;
   a sidewall attached to the base;
   a flange extending outwardly from an upper perimeter of the sidewall; and
   a denesting feature formed in the flange, the denesting feature enhancing denestability of the container;
   wherein the denesting feature comprises an inner peripheral portion of the flange that is adjacent to the sidewall and that is thicker than an outer portion of the flange, the thicker inner peripheral portion extending a majority of the distance around the flange.

2. The container of claim 1, wherein the thicker inner peripheral portion extends substantially completely around the flange.

3. The container of claim 1, wherein an upper peripheral area of the sidewall adjacent to the flange is thicker than a lower portion of the sidewall.

4. The container of claim 1, wherein the flange has a width, extending radially outwardly from the sidewall, of at least 1/8 inch.

5. The container of claim 4, wherein the flange width is at least 1/4 inch.

6. The container of claim 1, wherein the sidewall is substantially frustoconical and extends at an angle of at least 110 degrees relative to the base.

7. The container of claim 1, wherein the container comprises laminated paperboard.

8. The container of claim 1, comprising a plurality of pleats radiating outwardly from the base.

9. The container of claim 1, wherein the container is one of a plate or a tray.

10. The container of claim 1, wherein the container is formed from a substantially flat circular paperboard blank.

* * * * *